United States Patent [19]
Whitener

[11] Patent Number: 4,679,160
[45] Date of Patent: Jul. 7, 1987

[54] ULTRASONIC DEPTH MEASUREMENT APPARATUS AND METHODS

[75] Inventor: Miles B. Whitener, St. Louis County, Mo.

[73] Assignee: Surface Systems, Inc., St. Louis, Mo.

[21] Appl. No.: 681,602

[22] Filed: Dec. 13, 1984

[51] Int. Cl.[4] .................... G01B 17/02; G01S 15/02
[52] U.S. Cl. .................... 364/563; 340/621; 73/632
[58] Field of Search .......... 364/563, 564; 73/632, 73/633, 615, 195, 149; 340/621, 618, 600

[56] References Cited

U.S. PATENT DOCUMENTS

| | | | |
|---|---|---|---|
| 3,115,615 | 12/1963 | Saper | 340/621 |
| 3,267,416 | 8/1966 | Morse | 73/615 |
| 3,656,134 | 4/1972 | Brown | 340/621 |
| 3,986,110 | 10/1976 | Overall et al. | 324/61 R |
| 4,135,151 | 1/1979 | Rogers et al. | 324/61 R |
| 4,229,798 | 10/1980 | Rosie et al. | 364/564 |
| 4,281,286 | 7/1981 | Briggs | 324/61 R |
| 4,335,613 | 6/1982 | Luukkala | 73/599 |
| 4,461,178 | 7/1984 | Chamuel | 73/599 |

OTHER PUBLICATIONS

"Aquaplaning Risk on Runways is Measured" *Airport Services Management*, Nov. 1970, p. 31.

J. E. Forbat, "An Operational Aid for Warning of Aquaplaning Conditions", *Interavia Aviation, Astronautics, Electronics*, No. 2, 1971, 4 pages.

L. C. Lynnworth, "Industrial Applications of Ultrasound—A Review: II. Measurements, Tests, and Process Control Using Low Intensity Ultrasound", *IEEE Trans. Sonics and Ultrasonics*, vol. SU-22, No. 2, Mar. 1975, pp. 71-101.

C. S. Desilets et al., "The Design of Efficient Broad-Band Piezoelectric Transducers", *IEEE Trans. Sonics and Ultrasonics*, vol. SU-25, No. 3, May 1978, pp. 115-125.

Primary Examiner—Errol A. Krass
Assistant Examiner—Thomas G. Black
Attorney, Agent, or Firm—Senniger, Powers, Leavitt and Roedel

[57] ABSTRACT

Apparatus for determining the depth of precipitation accumulating on the surface of a pathway, such as an airport runway or the like, includes a sensor having electrical transducer means for emitting and sensing ultrasonic energy and having a body of material adapted to be embedded in the pathway with the top surface of the body being substantially flush therewith and exposed to the precipitation, the transducer means being physically coupled to the body. A circuit causes the transducer means to emit pulses of ultrasonic energy, which are reflected as first and second reflections from the top surface of the body and from the upper surface of an accumulation of precipitation on the top surface of the body and are respectively returned to the transducer which, in response to the reflected pulses, produces corresponding first and second electrical signals. An amplifier is connected to the transducer means for amplifying the first and second electrical signals corresponding to the first and second reflections, thereby to produce an amplifier output. Another circuit is connected to the amplifier for initiating a first timing signal upon the occurrence of the first electrical signal. A further circuit compares the amplifier output with a threshold level which has a magnitude that decreases with time, the operation of the comparing circuit being started upon an occurrence of the first timing signal, the comparing circuit initiating a second timing signal when the amplifier output reaches the threshold level. Still another circuit in the apparatus generates a third electrical signal representing the depth of the precipitation as a function of the time interval between occurrences of the first and second timing signals. Other circuits and methods for depth and related measurements are also described.

70 Claims, 31 Drawing Figures

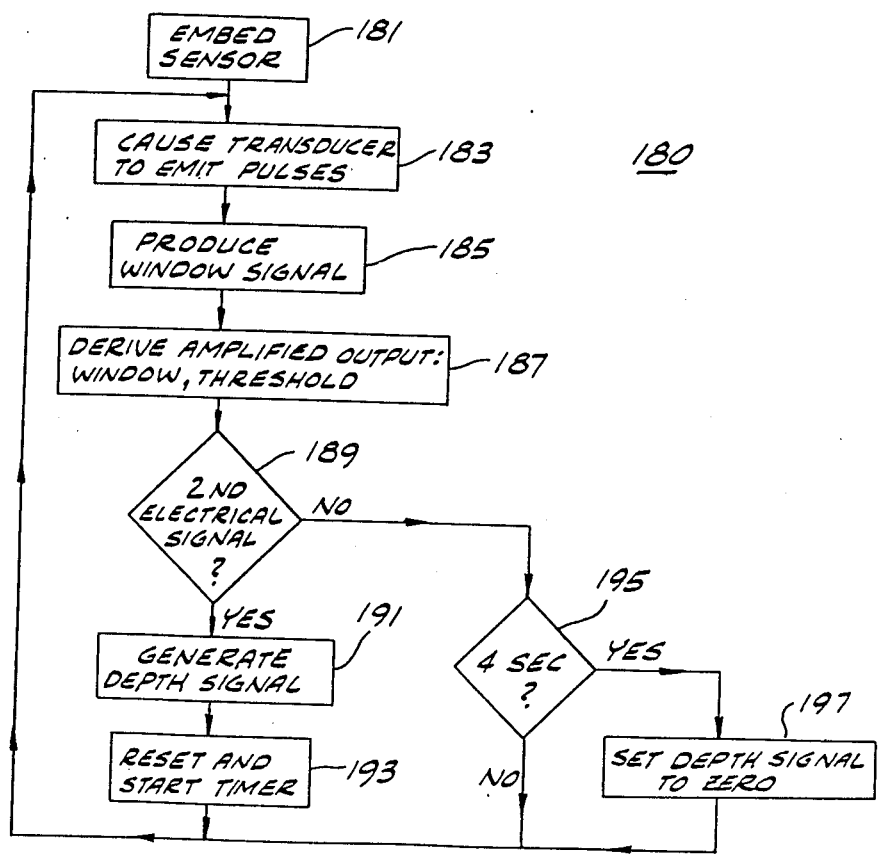

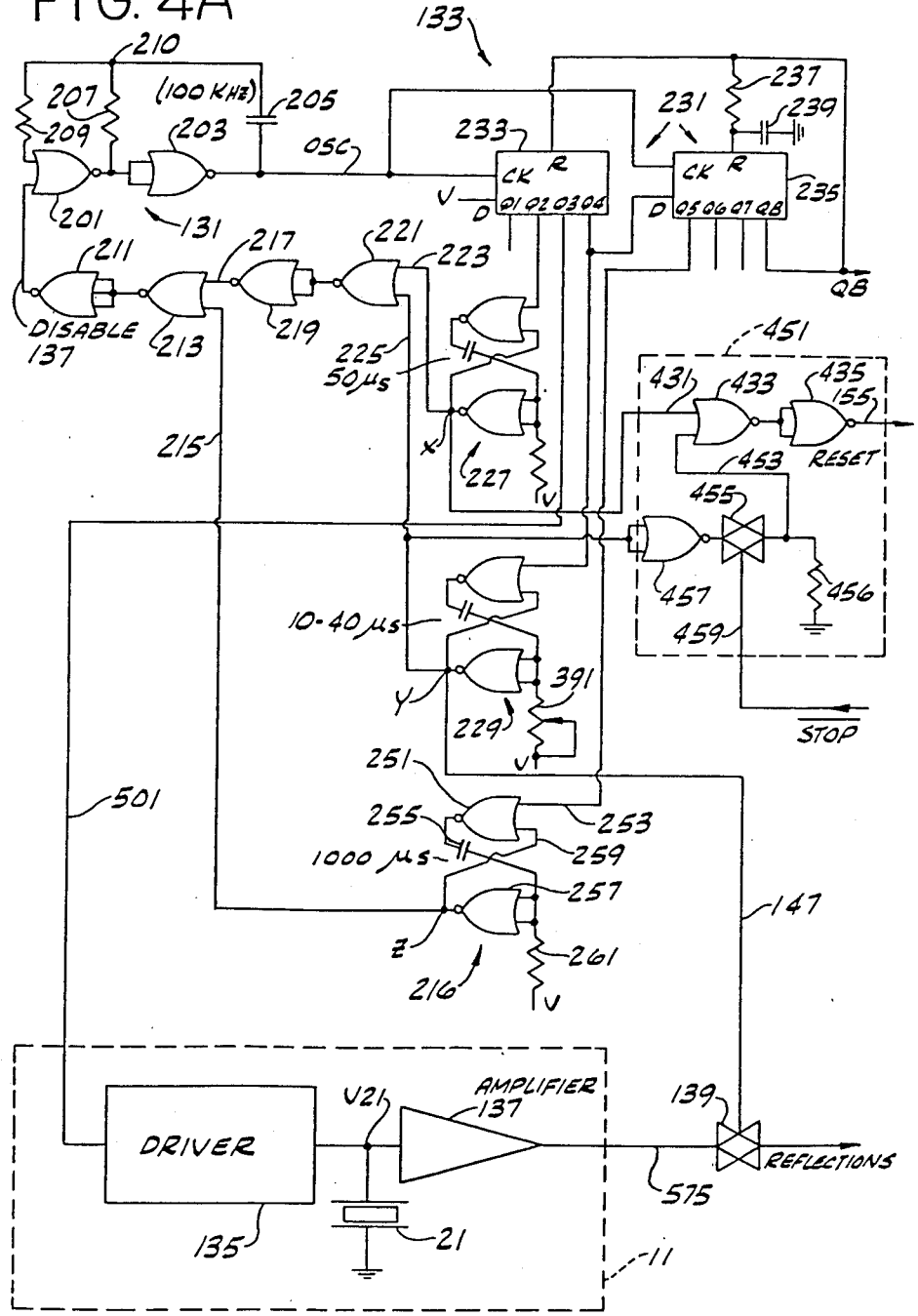

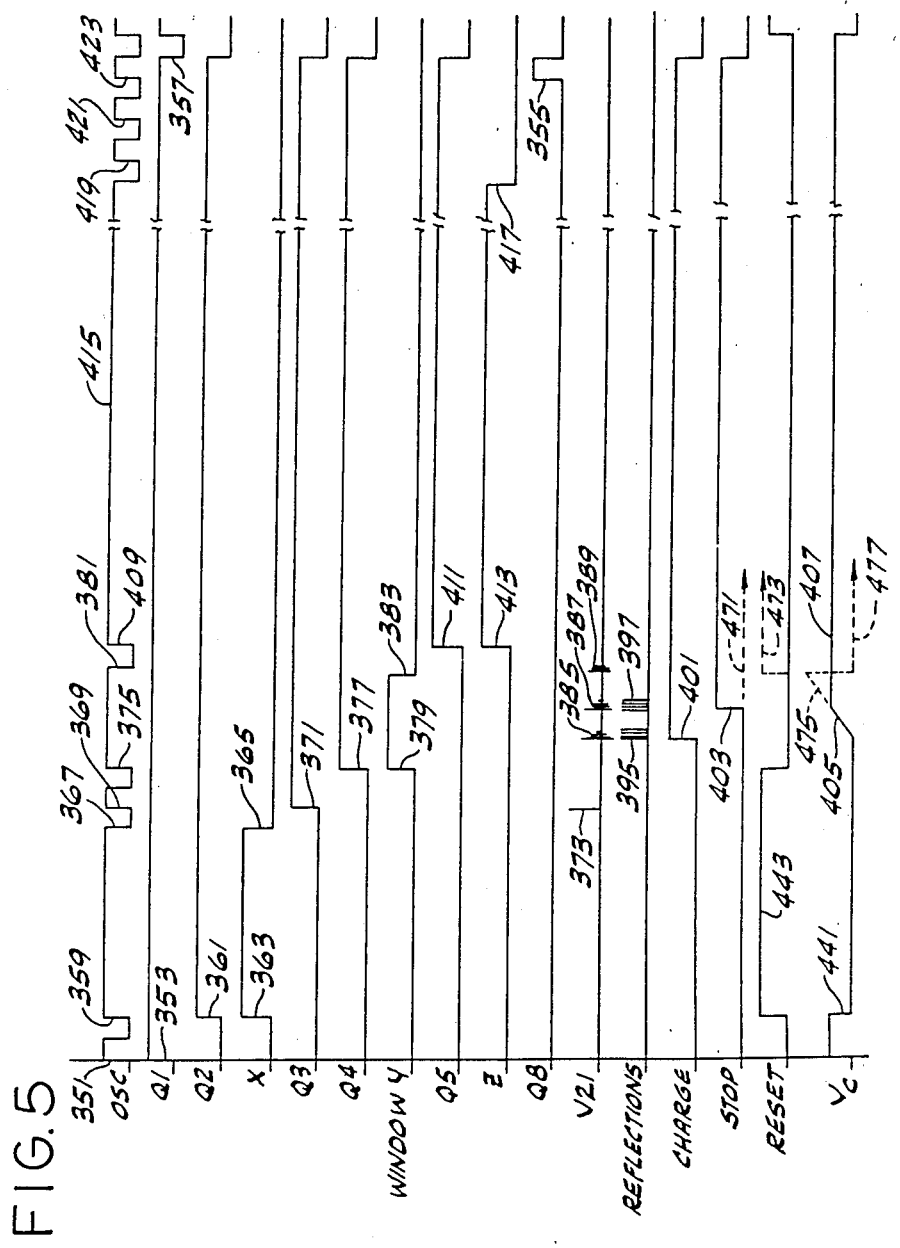

FIG.10A

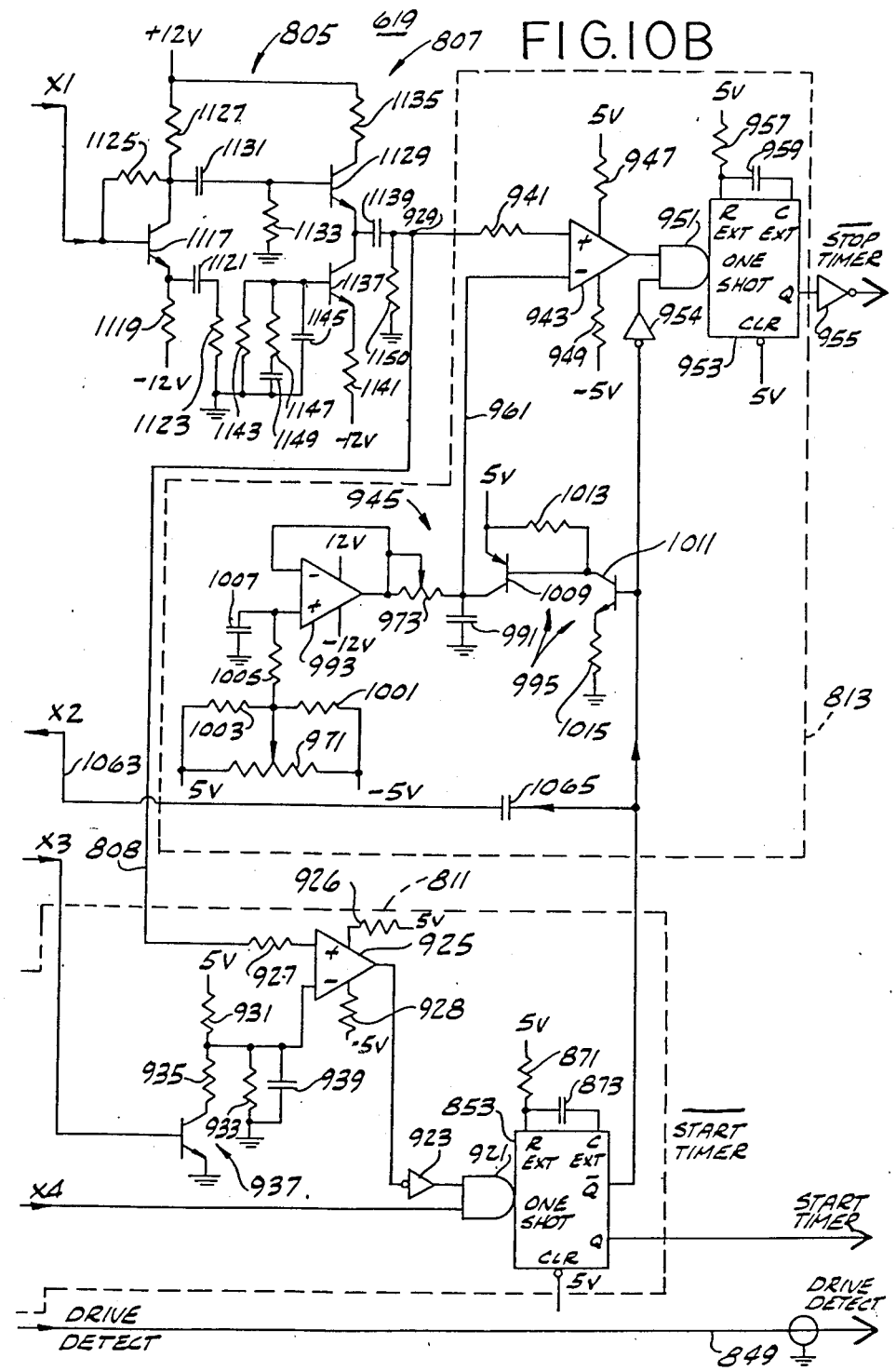

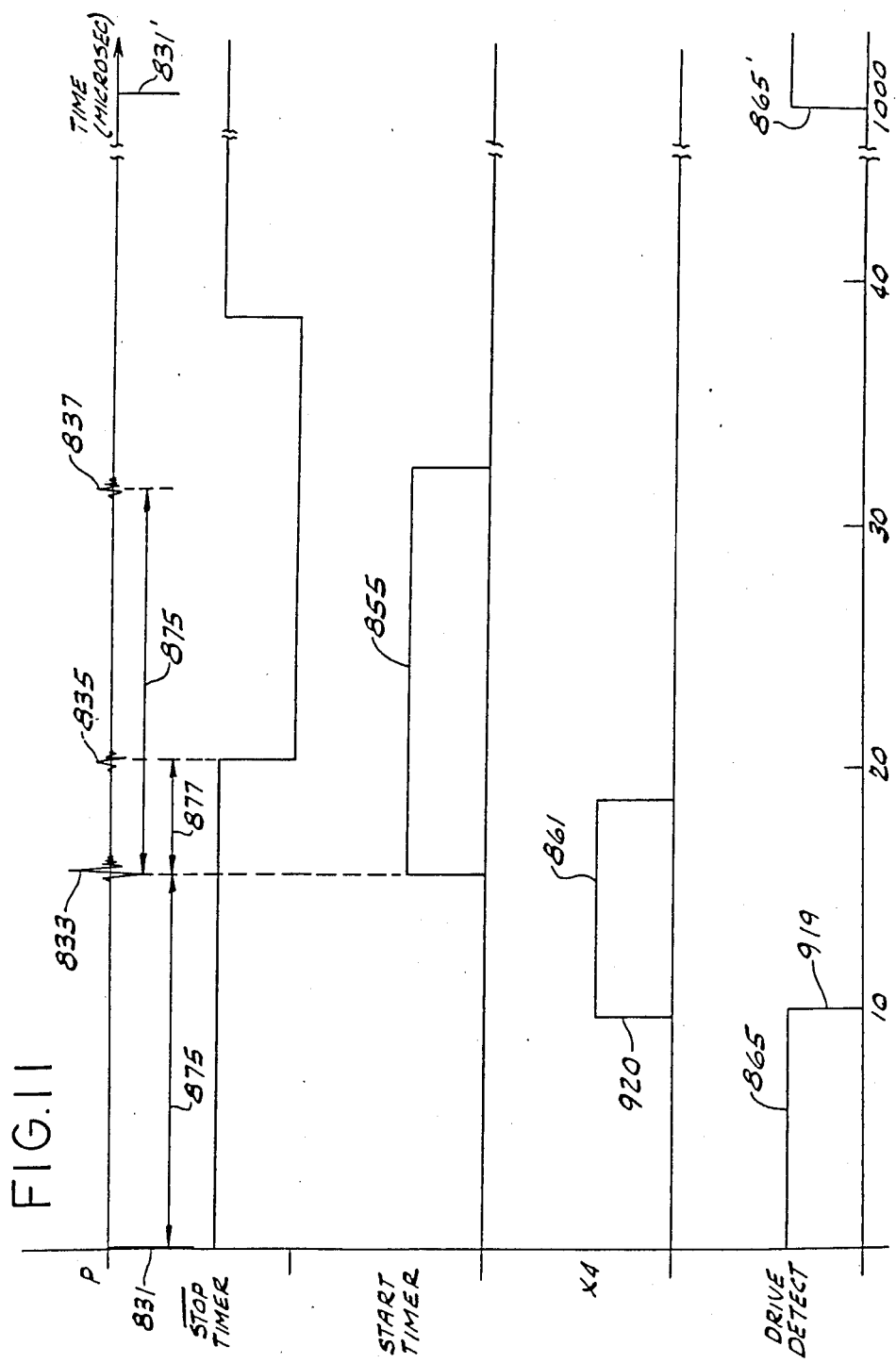

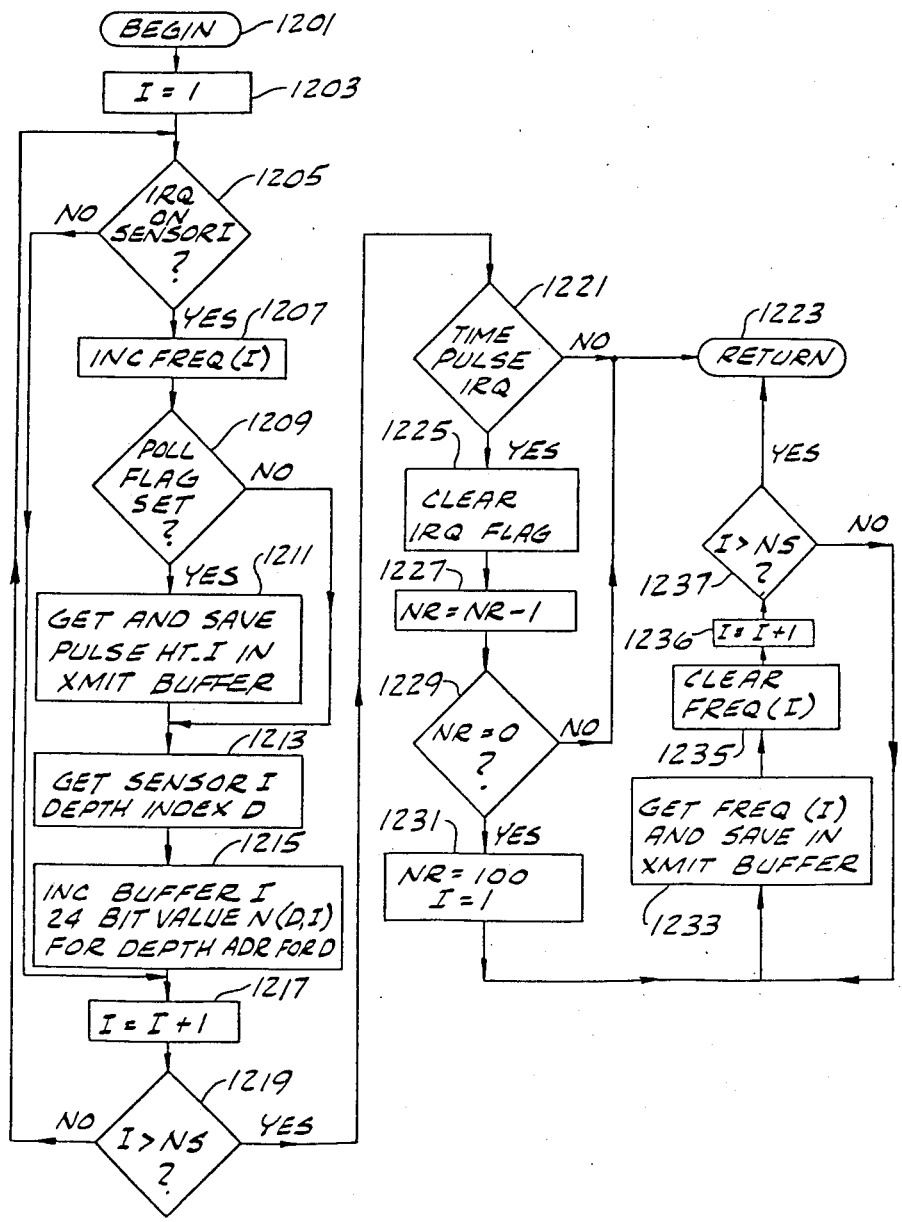

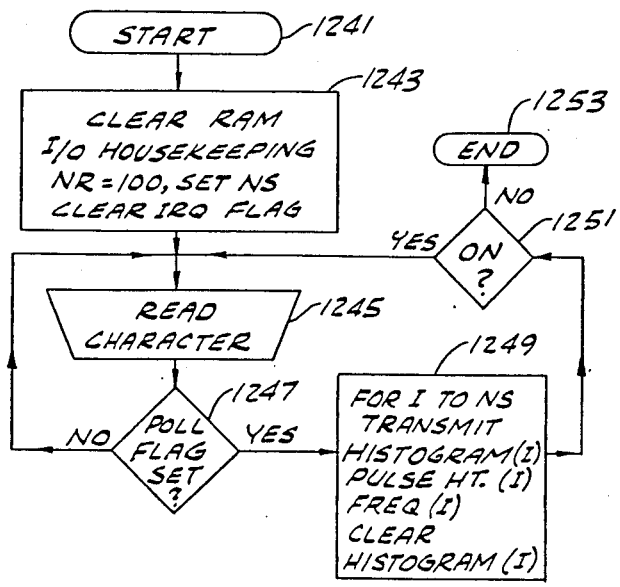
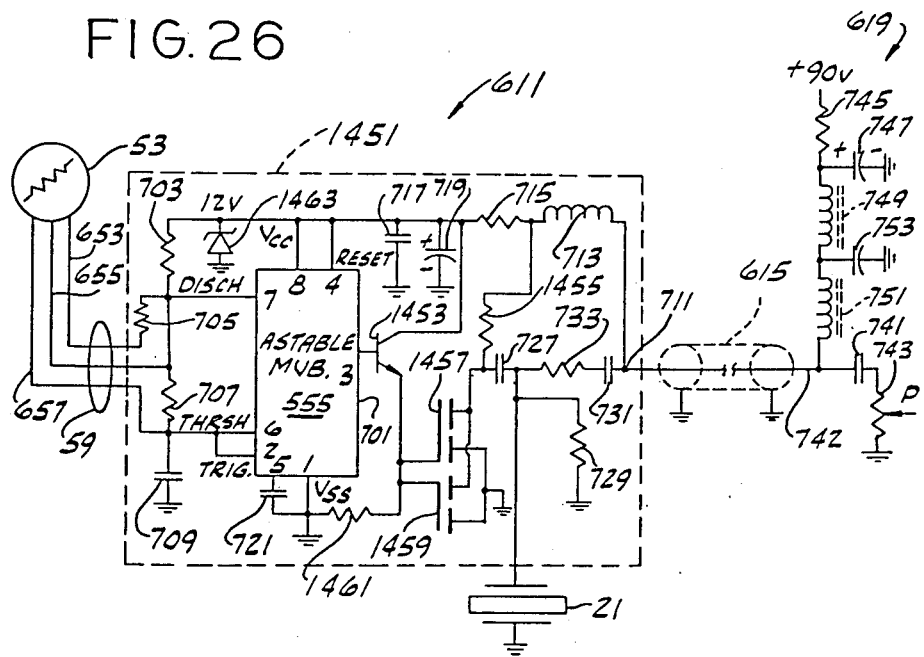

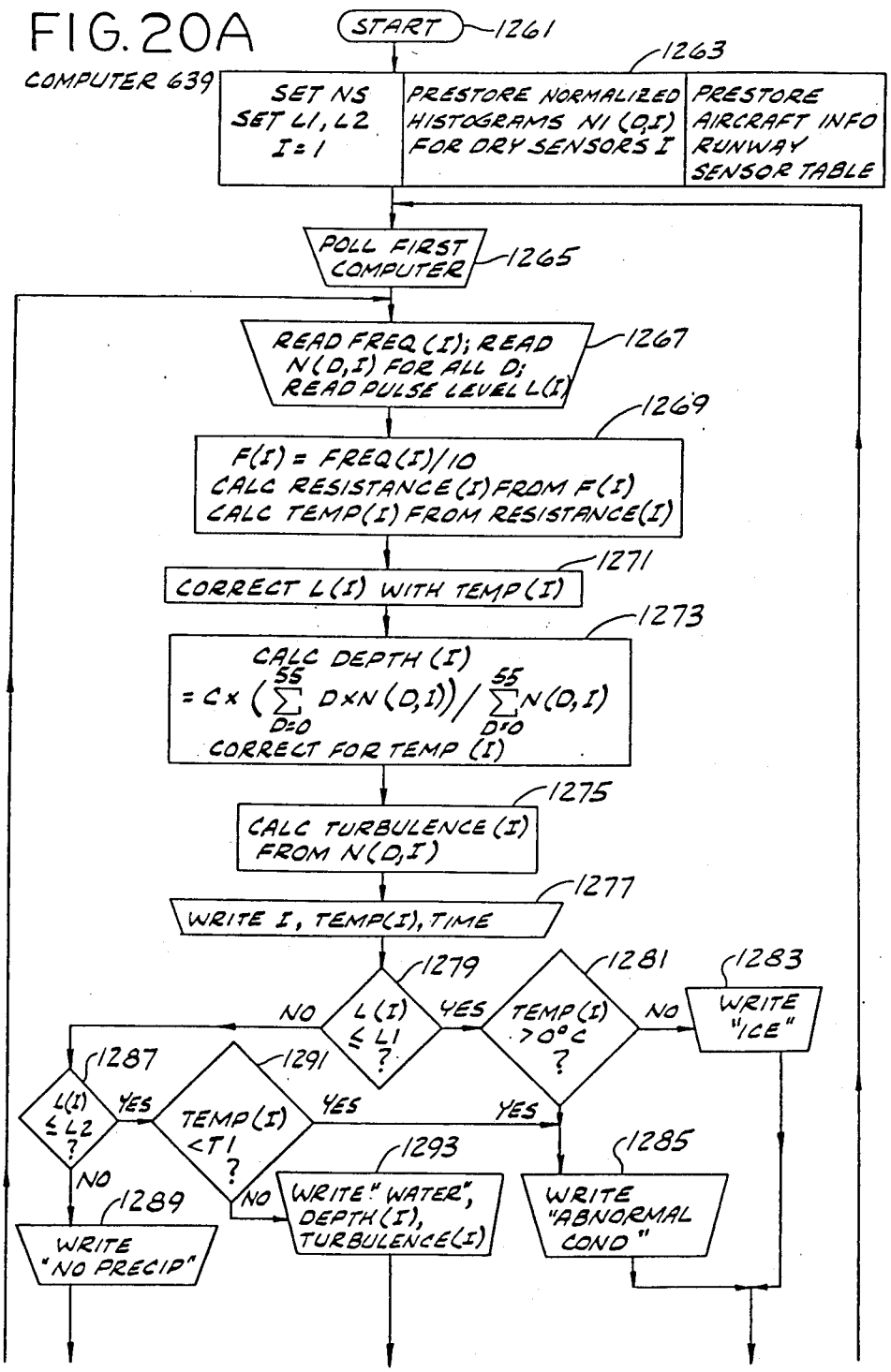

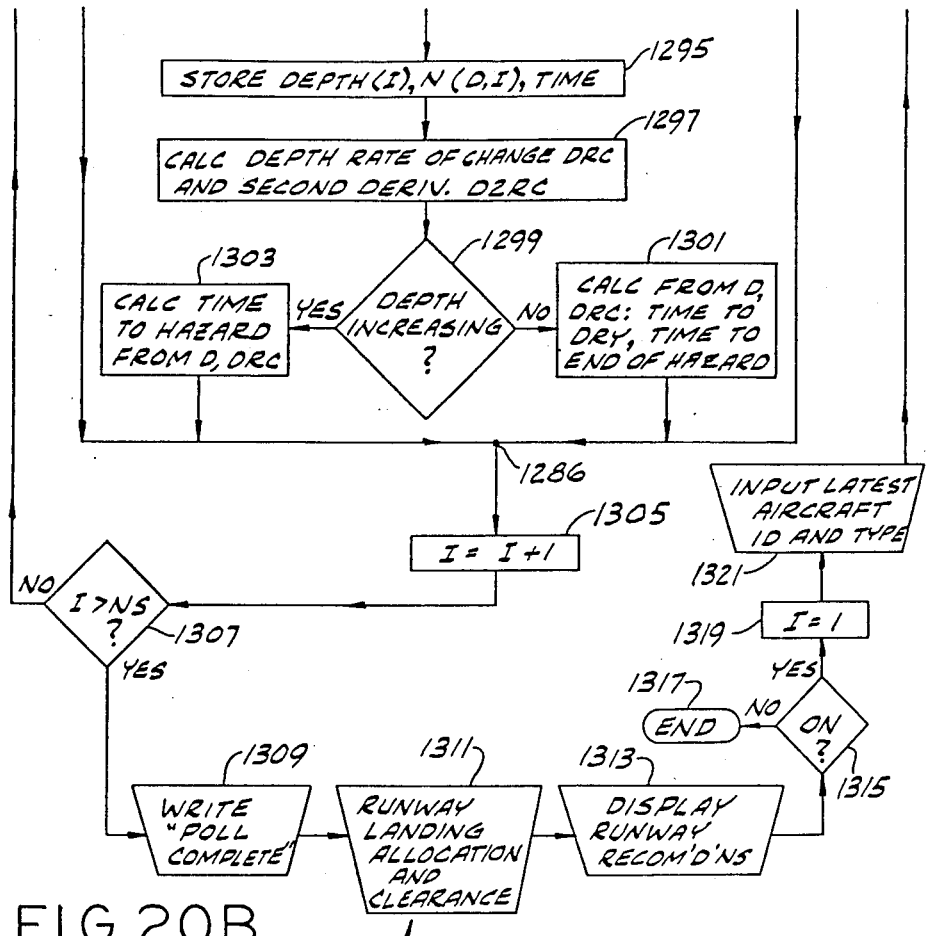
FIG. 20B
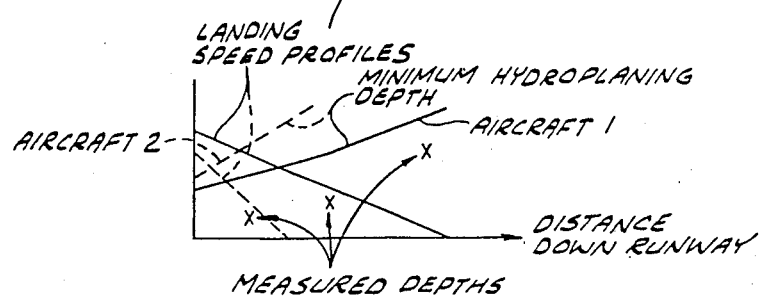

ULTRASONIC DEPTH MEASUREMENT APPARATUS AND METHODS

BACKGROUND OF THE INVENTION

The present invention relates to apparatus and methods for ultrasonically measuring the depth of precipitation accumulating on the surface of a pathway, such as a highway, a bridge, an airport runway, or a building floor. More specifically, the present invention relates to apparatus and methods for measuring the depth of precipitation on a surface of a sensor embedded in the pathway by emitting pulses of ultrasonic energy which are reflected as first and second reflections from the surface of the sensor and from the upper surface of the accumulation of precipitation respectively.

Easily ascertainable and accurate knowledge of the depth of water accumulating on the surfaces of airport runways, for example, is very useful and can be indispensable. When an aircraft lands on a runway covered with water, a condition called hydroplaning can occur and cause a dangerous skid. The minimum depth of water at which hydroplaning first occurs is inversely related to the landing speed of the aircraft, generally speaking.

During a rainstorm hundreds of lives can depend on deciding which runways are safe to use and which are not, because aircraft certainly should not be allowed to land on runways which are unsafe for them. The safety problem is complicated, however, because the aircraft should not be unnecessarily detained in the air in bad weather either. In other words, attention to safety by unnecessarily closing runways keeps aircraft in the air longer in bad weather, can congest the available airspace, and unnecessarily jeopardizes the level of safety in the air. Consequently, only those runways should be closed which are actually hazardous to the particular aircraft requesting clearance to land.

Whether a hydroplaning hazard exists depends on variables such as water depth, landing speed, wind direction and speed, and the weight of the aircraft. Although water depth is an important variable in determining whether hydroplaning is likely, accurate water depth information for airport runways has not generally been available.

The airport operations manager should be able to discern, at a glance, runways or portions thereof on which the danger of hydroplaning actually exists for particular aircraft in order to select other runways for landing. Also, it should be possible to determine when a given runway is hazardous for all aircraft so that it can be closed. Similarly, warning information is needed as soon as a wet runway is becoming icy.

Coassigned U.S. Pat. No. 4,986,110, describes a water depth measuring device which utilizes capacitance and conductance properties of water in detecting its presence. Also, circuitry is described therein for producing indications of depth as being less than 0.05 inch, between 0.05 inch and 0.10 inch, or greater than 0.10 inch.

In coassigned U.S. Pat. No. 4,135,151, precipitation on the sensor is identified as water, slush, or ice by a capacitance and conductance approach. In coassigned U.S. Pat. No. 4,281,286 at least two different frequencies are used in a capacitance and conductance approach, depending on whether impurities are or are not present in the precipitation.

Accurate measurement of values in a substantially continuous range of precipitation depth has not been possible in that the capacitance and conductivity of the precipitation vary considerably with impurity type and concentration, and with temperature. Accurate measurements of very small depths on the order of 1/32 inch are also needed.

Because of practical problems of surface turbulence and roughness due to wind, snow, and pelting precipitation, the problem of depth measurement is further complicated. One reference "Industrial Applications of Ultrasound—A Review: II. Measurements, Tests, and Process Control Using Low-Intensity Ultrasound," by L. C. Lynnworth, IEEE Transactions on Sonics and Ultrasonics, Vol. SU-22, No. 2, March, 1975 at page 89, only mentions ultrasonic measurements of thickness in the industrial environment, and only recognizes rough surface and poorly defined thickness conditions as being special problems.

Measurement of precipitation depth is frought with difficulties because it must be performed out-of-doors under windy and rainy or snowy conditions when the measurements are most needed. Even defining precipitation depth under such conditions is troublesome, and any raw data even if accurate can be expected to be only obtainable sporadically and erratically. Practical application of depth measuring equipment also demands that it require but little and infrequent adjustment and have a minimum of down-time for maintenance and calibration.

SUMMARY OF THE INVENTION

Among the objects of the present invention are to provide improved ultrasonic depth measurement apparatus and methods for accurately measuring the depth of very thin layers of precipitation; to provide improved ultrasonic depth measurement apparatus and methods for making each of many depth measurements more reliable and independent of manufacturing and temperature variations; to provide improved ultrasonic depth measurement apparatus and methods for utilizing as a whole the large number of depth data which can be generated in ultrasonic depth measurement apparatus to improve accuracy and stability in depth measurement; to provide improved ultrasonic depth measurement apparatus which can automatically adjust itself for optimum performance; to provide improved ultrasonic depth measurement apparatus and methods for measuring trends and displaying predictions; to provide improved ultrasonic depth measurement apparatus and methods for simultaneously measuring depth and temperature; to provide improved ultrasonic depth measurement apparatus and methods for accurately measuring depth in windy, rainy, and other turbulent conditions; to provide improved ultrasonic depth measurement apparatus and methods for providing a measure of turbulence; to provide improved ultrasonic depth measurement apparatus and methods for accurate depth measurements in the presence of electrical noise and interference; and to provide improved ultrasonic depth measurement apparatus and methods which can be readily modified to suit changing user needs.

Other objects and features will be in part apparent and in part pointed out hereinafter.

Generally, and in one form of the invention, apparatus for determining the depth of precipitation accumulating on the surface of a pathway, such as an airport runway or the like, includes a sensor having electrical transducer means for emitting and sensing ultrasonic energy and having a body of material adapted to be embedded in the pathway with the top surface of the body being substantially flush therewith and exposed to the precipitation, the transducer means being physically coupled to the body. A circuit causes the transducer means to emit pulses of ultrasonic energy, which are reflected as first and second reflections from the top surface of the body and from the upper surface of an accumulation of precipitation on the top surface of the body and are respectively returned to the transducer means which, in response to the reflected pulses, produces corresponding first and second electrical signals. An amplifier is connected to the transducer means for amplifying the first and second electrical signals corresponding to the first and second reflection, thereby to produce an amplifier output. Another circuit is connected to the amplifier for initiating a first timing signal upon the occurrence of the first electrical signal. A further circuit compares the amplifier output with a threshold level which has a magnitude that decreases with time, the operation of the comparing circuit being started upon an occurrence of the first timing signal, the comparing circuit initiating a second timing signal when the amplifier output reaches the threshold level. Still another circuit in the apparatus generates a third electrical signal representing the depth of the precipitation as a function of the time interval between occurrences of the first and second timing signals.

Generally, and in another form of the invention, apparatus for determining the depth of precipitation accumulating on the surface of a pathway, such as an airport runway or the like, includes a sensor having electrical transducer means for emitting and sensing ultrasonic energy and having a body of material adapted to be embedded in the pathway with the top surface of the body being substantially flush therewith and exposed to the precipitation, the transducer means being physically coupled to the body. A circuit causes the transducer means to emit pulses of ultrasonic energy, which are reflected as first and second reflections from the top surface of the body and from the upper surface of an accumulation of precipitation on the top surface of the body and are respectively returned to the transducer means which, in response to the reflected pulses, produces corresponding first and second electrical signals. An amplifier is connected to the transducer means for amplifying the first and second electrical signals corresponding to the first and second reflections, thereby to produce an amplifier output. Another circuit generates a third electrical signal representing the depth of the precipitation as a function of the time interval between occurrences of the first and second electrical signals. A further circuit periodically adjusts the degree of amplification provided by the amplifier so that the peak value of the first electrical signal in the amplifier output is maintained substantially constant and produces a fourth electrical signal representing the peak value prior to amplification of the first electrical signal from the transducer means.

In general, and in an additional form of the invention, apparatus for determining the depth of precipitation accumulating on the surface of a pathway, such as an airport runway or the like, includes a sensor having electrical transducer means for emitting and sensing ultrasonic energy and having a body of material adapted to be embedded in the pathway with the top surface of the body being substantially flush therewith and exposed to the precipitation, the transducer means being physically coupled to the body. A circuit causes the transducer means to emit pulses of ultrasonic energy, which are reflected as a plurality of reflections from the top surface of the body and from the upper surface of an accumulation of precipitation on the top surface of the body and are respectively returned to the transducer means which, in response to the reflected pulses, produces corresponding electrical signals. Another circuit generates a third electrical signal representing the depth of the precipitation as a function of the time interval between occurrences of at least two of the electrical signals. A further circuit accumulates respective totals of the number of times the third electrical signal represents a value of depth lying within each one of a series of depth intervals, and computes precipitation depth as a function of the totals. A device is provided for displaying the computed value of precipitation depth.

Generally, one method form of the invention involves a method for determining the depth of precipitation accumulating on the surface of a pathway, such as an airport runway or the like, with a sensor having ultrasonic transducer means physically coupled to a body of material having a top surface. The method includes the steps of embedding the body of material and the ultrasonic transducer means in the pathway with the top surface of the body being substantially flush therewith and exposed to the precipitation, and causing the ultrasonic transducer means to emit pulses of ultrasonic energy, which are reflected as first and second reflections from the top surface of the body and from the upper surface of an accumulation of precipitation on the top surface of the body and are respectively returned to the transducer means which, in response to the reflected pulses, produces corresponding first and second electrical signals. A third electrical signal is generated representing the depth of the precipitation as a function of the time interval between occurrences of the first and second electrical signals. Respective totals are accumulated which are totals of the number of times the third electrical signal represents a value of depth lying within each one of a series of depth intervals. The precipitation depth is computed as a function of the totals, and the computed value of precipitation depth is displayed.

BRIEF DESCRIPTION OF THE DRAWINGS

FIG. 3A is a flow diagram of a method performed by the apparatus of FIG. 3;

FIGS. 4A and 4B are both halves of a schematic diagram of the apparatus of FIG. 3;

FIG. 5 is a waveform timing diagram of electrical waveforms occurring in the circuitry of FIGS. 4A and 4B;

FIGS. 10A and 10B are both halves of a schematic diagram of part of a pulse decoder of the inventive apparatus of FIG. 8, FIG. 10A showing automatic gain control circuitry with peak measurement and FIG. 10B showing a comparing circuit having an exponentially decaying threshold;

FIG. 11 is a waveform timing diagram of electrical waveforms occurring in the circuitry of FIGS. 10A and 10B;

FIGS. 18 and 19 are respective flowcharts of operations according to an inventive method in an interrupt routine and a main routine of the first commputer of FIG. 8;

FIGS. 20A and 20B are both halves of a flowchart of operations according to an inventive method in a second computer of FIG. 8 for interpreting the data gathered by the first computer;

FIG. 26 is a schematic diagram of another ciruit for a precipitation depth sensor subassembly for the inventive embodiment of FIG. 8.

Corresponding reference characters indicate corresponding parts throughout the several views of the drawings.

DETAILED DESCRIPTION OF PREFERRED EMBODIMENTS

Figure 1:
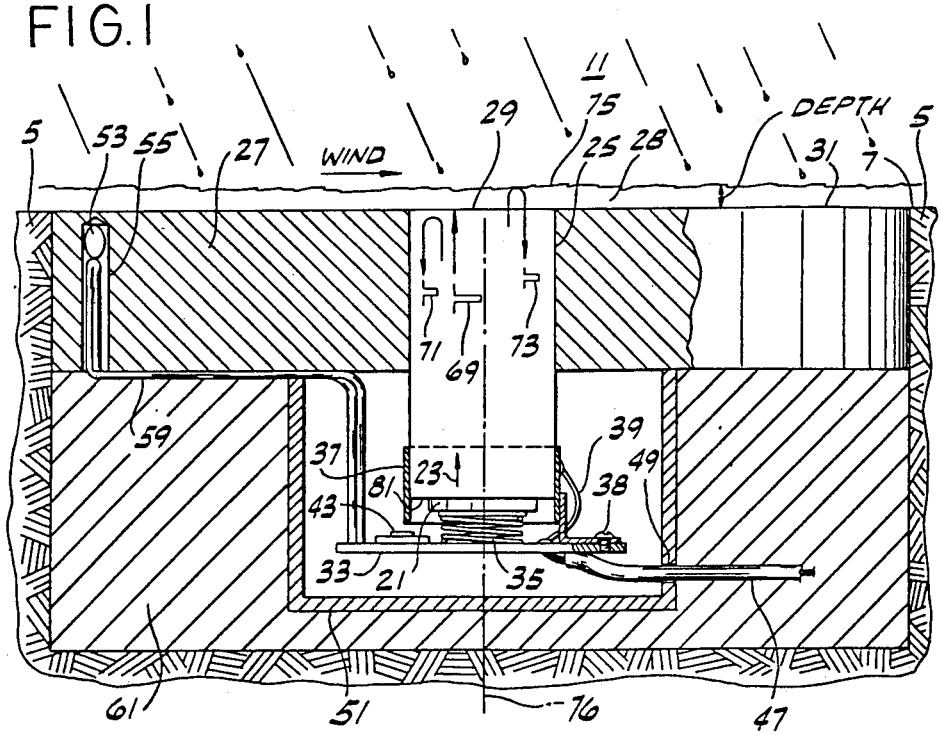
FIG. 1 is a cross section of a precipitation depth sensor subassembly of the ultrasonic depth measurement apparatus of the present invention.

In FIG. 1 a pathway 5 having a surface 7, such as an airport runway, highway, bridge, or building floor, has at least one water depth sensor 11 embedded therein. Sensor 11 has an electrical transducer 21 for emitting and sensing ultrasonic energy 23 and has a body of material comprising a cylindrical aluminum rod 25 which is physically coupled to the transducer 21. A circular mounting block 27 of sand epoxy matrix is molded around aluminum rod 25. Wind and precipitation 28 such as rain, sleet and snow impinge upon a top surface 29 of rod 25, which is exposed to the precipitation 28 and is substantially flush with the surface 7 of pathway 5. The mounting block 27 surrounds rod 25 and has a flat surface 31 which is also flush with the flat end surface constituting the top surface 29 of the rod 25.

Sensor 11 also has a printed circuit board 33, a chromed coil spring 35 soldered to the circuit board 33, and an electrically conductive U-clamp 37 grasping the electrically conductive aluminum rod 25. The transducer 21 is a thin disk-shaped wafer of piezoelectric crystal which is held between spring 35 and aluminum rod 25. Silicone grease applied to the spring 35 prevents corrosion. U-clamp 37 is physically attached to circuit board 33 by a screw and nut 38, and holds circuit board 33 in a fixed position relative to rod 25. U-clamp 37 is also electrically connected to circuit board 33 by a wire 39 at a circuit point distinct from spring 35. An electronic circuit 43 is mounted on circuit board 33 and is electrically connected to the transducer 21 by the spring 35 and the U-clamp 37.

A multiwire cable 47 connects circuit board 33 to remote electronic circuitry. Cable 47 extends through a hole 49 in a chassis 51. A thermistor 53 is adhesively affixed in a cavity 55 drilled in the mounting block 27 to within approximately ¼" of surface 31. Wires 59 extend from the thermistor 53 to circuit board 33 through chassis 51. A potting compound 61 protectively surrounds chassis 51.

Transducer 21 is caused to emit pulses 69 of ultrasonic energy which are reflected as first and second reflections 71 and 73 from the top surface of the rod 25 and from an upper surface 75 of an accumulation of the precipitation 28 on the top surface 29 of the rod. Rod 25 is cylindrical with a 1" diameter and a 2" length. The diameter of rod 25 is selected large enough to minimize side-of-rod effects which could produce extraneous reflections. Reflections 71 and 73 are respectively returned to transducer 21 which in response to the reflected pulses produces corresponding first and second electrical signals. The difference in the times of reflections 71 and 73 is proportional to the precipitation depth D.

When a voltage is applied across metallized flat surfaces of the piezoelectric crystal, it mechanically deforms by expanding or contracting along an axis 76. If the voltage applied is a very narrow pulse on the order of 200 nanoseconds or less in duration, or suddenly changes from one voltage value to another, the crystal mechanically oscillates for several cycles. This short burst of ultrasonic oscillation is the actual pulse 69, which is communicated to aluminum rod 25 as a compression wave. Pulse 69 propagates to the top surface 29 where a partial reflection 71 and partial transmission into precipitation 28 occur. The partial reflection 71 travels back down the rod 25 and is received by the piezoelectric crystal, which now acts as a sonic-to-electric transducer and has a short burst of voltage induced across its surfaces.

Meanwhile, the ultrasonic energy which was partially transmitted at the top surface 29 travels through precipitation 28 and is reflected at the precipitation upper surface 75. The energy then returns to top surface 29 of rod 25, where it is again partially reflected and partially transmitted. The latter partially transmitted part is the second reflection 73, which travels back down through rod 25 and then induces a second short burst of voltage across the piezoelectric crystal surfaces. There is a time difference t between the occurrences of the two voltage bursts across the piezoelectric crystal. The precipitation depth is calculated as $$D = v_p t / 2 \tag{1}$$

where $v_p$ is the velocity of propagation of the ultrasonic energy in the precipitation layer 28. Division by 2 is performed because the energy travels both up and down in precipitation 28.

It was said in the last paragraph that the ultrasonic energy which is reflected at the upper surface 75 of precipitation 28 returns to top surface 29 of rod 25, where it is again partially reflected and partially transmitted. The partially reflected part of that energy again travels upward through the precipitation and is reflected again at the upper surface 75 of the precipitation layer 28. As a result, additional weaker precipitation reflections occur and can be received at transducer 21. The preferred embodiments detect the very first precipitation reflection 73 and not the additional precipitation reflections for depth measurement purposes. However, more complex depth measuring apparatus can utilize the additional weaker precipitation reflections in various ways for depth detection.

When the top surface 29 is dry, essentially 100% of the ultrasonic energy is directly reflected back as reflection 71 and there is no reflection 73. When the top surface 29 has precipitation 28 on it, the energy in pulse 69 is coupled into whatever precipitation substance covers top surface 29, to an extent determined by the acoustical similarity (acoustic impedance match) of the rod material and the type of precipitation 28. In the case of liquid water or slush on an aluminum rod 25, about 80% of the amplitude is reflected as reflection 71. When ice is on aluminum rod 25, about 64% of the amplitude is reflected as reflection 71. By detecting the level of the first electrical signal induced by the reflected pulse 71, air, liquid water, and ice can be identified.

The aluminum rod 25 acts as a delay line coupling the pulse 69 into the precipitation 28 and coupling reflections 71 and 73 back into the crystal 21. It is to be understood that the aluminum rod 25 is but one example of a body of material for use in the invention wherein the body is adapted to be embedded in the pathway with the top surface of the body being substantially flush therewith and exposed to the precipitation. Such a body can also be a hard plastic such as plexiglass, or another metal such as steel, for example.

Reflection 71 travels back and forth between the top surface 29 and a lower surface 81 of rod 25 not once but several times. Accordingly, the transducer 21 can sense not only the first arrival of the reflection 71 but also subsequent arrivals (called second, third, etc., "rod reflections" herein) after it has made one or more additional round trips between lower surface 81 and top surface 29. Since the length of rod 25 introduces a significant delay, any reflection sensed by the transducer 21 between arrivals of the rod reflection 71 can be regarded as a reflection from the upper surface 75 of the precipitation 28. On this basis, electronics to implement precipitation depth measurement between the first and second rod reflections can be made relatively uncomplicated. It is to be understood that electronics can additionally be provided for taking subsequent rod reflections into account because of their predictable times of arrival.

The velocity of sound in aluminum is about ¼ inch per microsecond, so the roundtrip time is about 16 microseconds in a 2" long aluminum rod 25. The velocity of sound in water is about 1/16 inch per microsecond, and a 1/32 inch depth corresponds to a 1/16 inch long path. The maximum water depth which can be measured without having to take the second rod reflection into account is about equal to a half inch, which is quite adequate for depth measurements to detect hydroplaning hazards. In general, the maximum precipitation depth $D_o$ which can be measured without having to take the second rod reflection into account is given by the formula $$D_o = L \times v_p / v_b \tag{2}$$

where L is the distance between the top surface 29 and lower surface 81 of a body such as rod 25, $v_p$ is the velocity of sound in the precipitation substance (e.g. water or ice), and $v_b$ is the velocity of sound in the body such as rod 25.

Depth resolution at small depths should also be considered, because when the depth to be measured is relatively small, the first rod reflection 71 will overlap in time with the second reflection 73 from the precipitation unless pulses 71 and 73 are relatively narrow in width. Although small depths can be resolved in some embodiments even when there is some overlapping (see discussion of FIG. 10B), resolution still should be kept in mind. To resolve a 1/32" water depth calls for pulses 69 shorter in width than about 1 microsecond. With pulses at least as short as a microsecond, the first rod reflection 71 arrives and ends at transducer 21 before the precipitation reflection 73 (second reflection) arrives. This is because the ultrasonic energy propagating in the water consumes 1 microsecond of additional travel time compared to the ultrasonic energy which is reflected in the aluminum at top surface 29 directly back to transducer 21.

Transducer 21 is supplied with an electrical drive pulse which generally coincides in width and shape with a first half-cycle of oscillation of transducer 21 at its resonant frequency. In this way transducer 21 is efficiently excited. The resolution in depth measurement is determined by the length of time occupied by the original burst of damped oscillation produced in the transducer. This length of time is governed by electrical drive pulse width, the crystal resonant frequency and the damping effect on the crystal exerted by its driving circuit and mechanical mounting structure. In a preferred embodiment, the electrical drive pulse width is generally about 1/15 microsecond and the resonant frequency of the transducer 21 is about 7.6 MHz. A low quality factor Q of about eighty (80) for the crystal and less than about 10 for the circuit as a whole damps the oscillations rapidly.

The crystal material is a piezoelectric ceramic such as lead titanate zirconate, available as type PZT5-A, part No. 8010 from Vernitron, Inc. of Bedford, Ohio. Other piezoelectric or magnetostrictive transducers may also be used. The appropriate thickness of a disk of the ceramic is given by the expression 75/F(kHz) inches. In words, the thickness of the disk in inches is 75 divided by the desired resonant frequency in kiloHertz. For a 7600 kHz. resonant frequency (7.6 MHz), the thickness is about 10 mils or one-hundredth of an inch.

The ceramic disk for transducer 21 is bonded to the lower surface 81 of aluminum rod 25 with an adhesive such as cyanoacrylic cement, applied under pressure.

The adhesive has a dielectric constant of approximately four. Two examples of useful cyanoacrylic adhesives are "Loctite Super Bonder Thermal Cycling Resistant Instant Adhesive", Item No. 49850, from Loctite Corporation, Newington, Conn., and Krazy Glue, code number 1145, from Krazy Glue, Inc., Itasca, Ill. Epoxy adhesives may also be used. Effective electrical connection of the ceramic disk to rod 25 occurs both through ohmic contact and capacitive coupling through the adhesive. The capacitive coupling is maximized by making the adhesive as thin as possible. Proper mounting of the transducer 21 as is next described avoids oscillation in undesired modes.

Acoustic impedance matching can be important to efficiently couple ultrasonic energy produced by the transducer 21. Making the adhesive as thin as possible provides good coupling even when the impedances are not matched.

Rod 25 is machined flat at both ends to a length of 2 inches. Care should be used in mounting the transducer 21 to the rod 25, and the surfaces of each should be flat to within several thousandths of an inch. A piece of emery cloth is placed on a flat surface, and rod 25 is rubbed on the emery cloth until the rod surfaces 29 and 81 are smooth to the naked eye. The ceramic disk for transducer 21 is rubbed on both sides over a very fine crocus cloth. The rod and disk are cleaned with acetone and wiped off.

Preparatory to applying the adhesive under pressure, a conventional C-clamp is mounted in a vise. A stack of pieces, which is to be held in the C-clamp, is assembled as follows. Place aluminum rod 25 on a ¼ inch thick one-inch-square slab of plexiglass. Deposit a drop of the adhesive on the opposite end surface of rod 25. Gently position the ceramic disk for transducer 21 on the adhesive on the end of rod 25. Apply an oily mold-release preparation (such as is conventionally used to keep a molded plastic article from adhering to a mold) to one side of a second ¼ inch thick one-inch-square slab of plexiglass. Place the second plexiglass slab with its oily side on the ceramic disk. In this way the second plexiglass slab will not stick to any of the adhesive which escapes from between the aluminum rod and the ceramic disk. A stack of pieces having the first and second plexiglass slabs at bottom and top is thus formed.

Place the stack of pieces between the jaws of the C-clamp. Screw the C-clamp down manually tight on the stack, thereby applying a very substantial pressure to the stack. The plexiglass slabs protect the rod 25 and the transducer 21 from abrasion. Curing of the adhesive takes about one minute. The stack is still kept in the C-clamp under pressure for about 24 hours, a period which is not critical. Remove the stack from the C-clamp, and gently take away the plexiglass slabs. Install rod 25 with the bonded ceramic disk in sensor 11.

The foregoing procedure is conveniently performed at room temperature. If the adhesive is cured at 75° F., the bond is durable and does not form microcracks in the bond at normally encountered out-of-doors temperatures. However, if the temperature is increased above 160° F., microcracks in the bond can occur and affect the performance of sensor 11. When operation above 160° F. is desired, the adhesive should be cured at a temperature higher than room temperature, such as 160°. This is conveniently accomplished by preheating the aluminum rod 25 to the higher temperature just prior to assembling the stack, and the heat capacity of the rod maintains the high temperature during the one-minute curing of the adhesive.

In an alternative permanent-pressure construction (not shown in FIG. 1) for transducer 21 and rod 25, rod 25 has screw threads machined on part of its cylindrical exterior near lower surface 81. A stack is assembled using the rod 25, silicone oil for ultrasonic coupling instead of adhesive, and the ceramic disk for transducer 21. A single ⅛inch thick one-inch-square dry plexiglass slab is made to have a foilcovered (or metallized) smooth side which is placed on the ceramic disk, the other side being shallowly drilled with ⅛ inch diameter randomly positioned depressions to minimize reflections back to transducer 21. A wire is connected to the foil or metallization on the plexiglass. An internally threaded metal cup-shaped pressure mounting piece is matably screwed manually tight onto the threads of the rod 25, placing the transducer 21 under permanent pressure against rod 25. The cup-shaped pressure mounting piece has a center hole in the bottom through which the wire extends. The cup-shaped piece is then put in the U-clamp 37 of sensor 11. The wire is soldered to printed circuit board 33 in place of spring 35.

Figure 2:
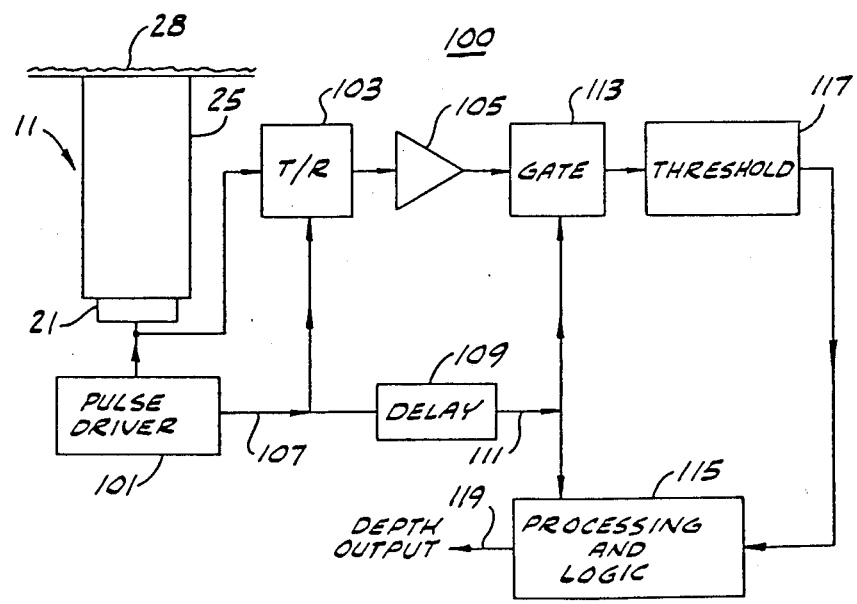
FIG. 2 is a block diagram of one form of ultrasonic depth measurement apparatus.

FIG. 2 shows a block diagram of a precipitation depth measuring apparatus 100 including the sensor 11 of FIG. 1 with its transducer 21 and rod 25 overlain with accumulated precipitation 28. A pulse driver circuit 101 supplies electrical drive pulses about every millisecond to transducer 21. The circuitry of FIG. 2 assumes that the electrical drive pulses will be far greater in magnitude than the first and second reflections 71 and 73 of FIG. 1. To prevent the electrical drive pulses from overloading the rest of the circuitry, a transmit/receive (T/R) switch 103 is connected between the transducer 21 and a high gain wideband amplifier 105. T/R switch 103 is supplied with a signal on a separate line 107 from pulse driver circuit 101 shortly before the electrical drive pulse is sent to the transducer 21. In response, T/R switch 103 isolates transducer 21 from amplifier 105 for the duration of the electrical drive pulse, and couples transducer 21 to amplifier 105 at all other times.

The signal on line 107 is also supplied to a delay circuit 109 which in turn generates a window pulse defining a time period in which the first and second electrical signals corresponding to the first and second reflections from transducer 21 are expected to occur. The window pulse is supplied on a line 111 to a gate circuit 113 and to a processing and logic circuit 115. Gate circuit 113 couples the output of the amplifier 105 to a threshold circuit 117 only during the width of the window pulse. The threshold circuit 117 is connected between gate circuit 113 and the processing and logic circuit 115. The gate circuit 113 and threshold circuit 117 cooperate to couple the output from amplifier 105 to processing and logic circuit 115 during the window pulse when the output of the amplifier 105 exceeds a predetermined threshold level. In this way noise is ignored. Processing and logic circuit 115 generates on a line 119 a third electrical signal, which is a depth output signal representing the depth of the precipitation as a function of the time interval between occurrences of the first and second electrical signals.

Figure 3:
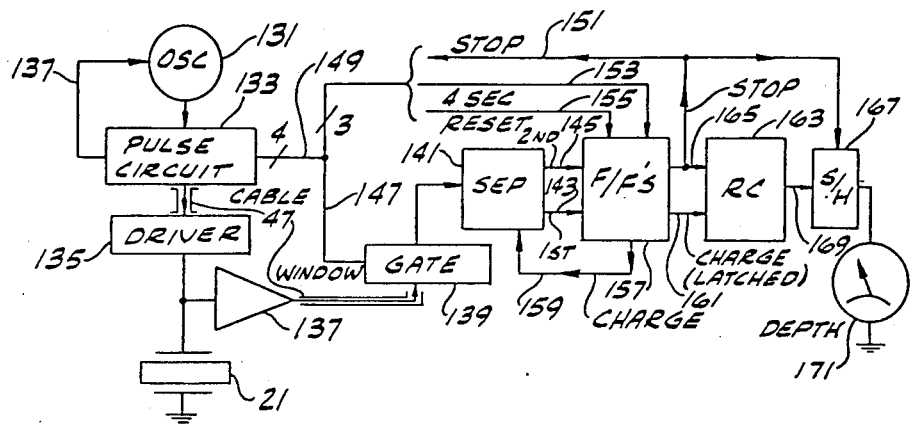
FIG. 3 is a block diagram of another form of ultrasonic depth measurement apparatus.

FIG. 3 is a block diagram of another embodiment which recognizes that when the transducer 21 is efficiently coupled to rod 25 the electrical drive pulses do not need to be orders of magnitude greater in intensity than the first and second electrical signals from the ultrasonic reflections. Thus, the apparatus does not require a T/R switch. An oscillator 131 is connected to a pulse supplying circuit 133 which derives its timing from the oscillator 131 and sequentially supplies several pulses of different widths to other parts of the circuitry.

One of the pulses is supplied along a conductor of cable 47 of FIG. 1, which is a multiwire cable, to a driver circuit 135 on printed circuit board 33 of FIG. 1. Driver circuit 135 causes a piezoelectric crystal for transducer 21 to emit ultrasonic energy. The first and second electrical signals from transducer 21 are directly coupled to an amplifier 137 with a constant threshold. Amplifier 137 together with driver circuit 135 comprise the electronic circuitry 43 on circuit board 33 of FIG. 1 when the circuit of FIG. 3 is implemented, and the output of amplifier 137 is supplied along another conductor of cable 47 back to the rest of the circuitry.

A gate 139 couples amplifier 137 to a circuit 141 for separating the first and second electrical signals onto separate lines 143 and 145. Pulse circuit 133 is connected by a line 137 to oscillator 131 and disables oscillator 131 for the duration of a window pulse which is also supplied by pulse circuit 133 on a control line 147 to the gate 139. Control line 147 is one of four lines which are collectively designated 149 on FIG. 3. The other 3 lines are a STOP line 151, a "4 SEC" line 153, and a RESET line 155.

A circuit 157 having a set of flipflops is used to temporarily latch the first and second electrical signals arriving on lines 143 and 145 and issue control signals. When the first electrical signal (first rod reflection) occurs on line 143, circuit 157 supplies a signal designated "CHARGE" on a line 159 to cause separating circuit 141 to divert the next signal from gate 139 to the line 145. Circuit 157 also latches the CHARGE signal and supplies it on a line 161 to an RC charging circuit 163 which is used as a time-to-voltage converter.

In response to the arrival of the second electrical signal on line 145, circuit 157 supplies a STOP signal on a line 165 to stop the charging of the RC circuit 163. In this way the amount of charge on a capacitor in the RC circuit 163 represents the time between the first and second reflections in rod 25 and thus is proportional to the depth of the precipitation 28. The STOP signal enables a sample-and-hold circuit 167 to sample the capacitor voltage from circuit 163 on a line 169 and to hold the sampled voltage and supply it as a third (depth) electrical signal to a voltmeter 171 calibrated in units of depth.

Circuits 157, 163 and 167 constitute a generating means which includes a capacitor, means for initiating the charging of the capacitor upon an occurrence of the first electrical signal corresponding to the first reflection, means for terminating the charging upon an occurrence of the second electrical signal corresponding to the second reflection, and means responsive to the occurrence of the second electrical signal for sampling and holding a voltage proportional to the charge on the capacitor, the voltage so held being the third electrical signal representing the depth of the precipitation. The depth meter 171 constitutes means, responsive to the third electrical signal, for displaying a measured depth of precipitation.

The stop signal is also fed back to pulse circuit 133 along line 151 in order to reset a counter therein, because the second electrical signal which caused the STOP signal indicates the presence of precipitation. If the STOP signal does not occur during a predetermined time interval, such as 4 seconds, the counter times out and issues a "4 SEC" signal on line 143 to cause the circuit 157 to issue a fictitious STOP signal and make depth meter 171 read a value indicative of zero depth. When another cycle of depth measurement begins after about a millisecond, pulse circuit 133 provides a RESET signal on line 155 to the flip-flops in circuit 157. It should be understood that circuit 157 can equivalently be made self-resetting by the use of single-shot multivibrators instead of flip-flops.

The circuit of FIG. 3 is operated according to a method 180 which includes the steps shown in the flow diagram of FIG. 3A. In an initial step 181 the rod 25 and the transducer 21 of FIG. 1 are embedded in the pathway 5 with the top surface 29 of the rod 25 flush with surface 7 and exposed to the precipitation 28. Then in a step 183 transducer 21 is caused to emit pulses of ultrasonic energy, which are reflected as first and second reflections from the top surface 29 of the rod 25 and from the upper surface 75 of the precipitation 28 and are respectively returned to the transducer 21 which, in response to the reflected pulses, produces corresponding first and second electrical signals.

A step 185 is accomplished by producing a "window signal" which defines a predetermined time interval during which the first and second reflections are expected to occur after each pulse so emitted in step 183. Then in another step 187 an amplified output is derived corresponding to the first and second electrical signals only when their voltage exceeds a predetermined threshold value during the predetermined "window" time interval. As a result the amplified output corresponds to the first and second reflections.

If a second electrical signal occurs, operations proceed according to a decision step 189 to a step 191 for generating a third electrical signal representing the depth of the precipitation as a function of the time interval between occurrences of the first and second electrical signals. There is also performed a step 193 for resetting and starting a timer, whence operations branch back to step 183 to perform another cycle of steps 183, 185, 187, 189, 191, and 193.

If a second electrical signal does not occur, however, operations branch from step 189 to a time decision step 195. A second electrical signal may not immediately occur because the surface 75 of the precipitation 28 is very turbulent. In such case operations at step 195 bypass steps 191 and 193 and proceed back to step 183, leaving the most nearly previous depth signal produced in step 191 unchanged and leaving the timer running. As soon as a second electrical signal occurs, a new depth signal is generated at step 191 and the timer is reset at step 193. However, if this does not occur within 4 seconds, operations will branch from step 195 to a step 197 to set the depth signal to zero before returning to step 183. In other words steps 195 and 197 amount to setting the depth signal (third electrical signal) to a predetermined value indicative of zero depth after a plurality of the pulses in excess of a predetermined number have been emitted without an occurrence of the second electrical signal corresponding to the second reflection.

Figure 4B:
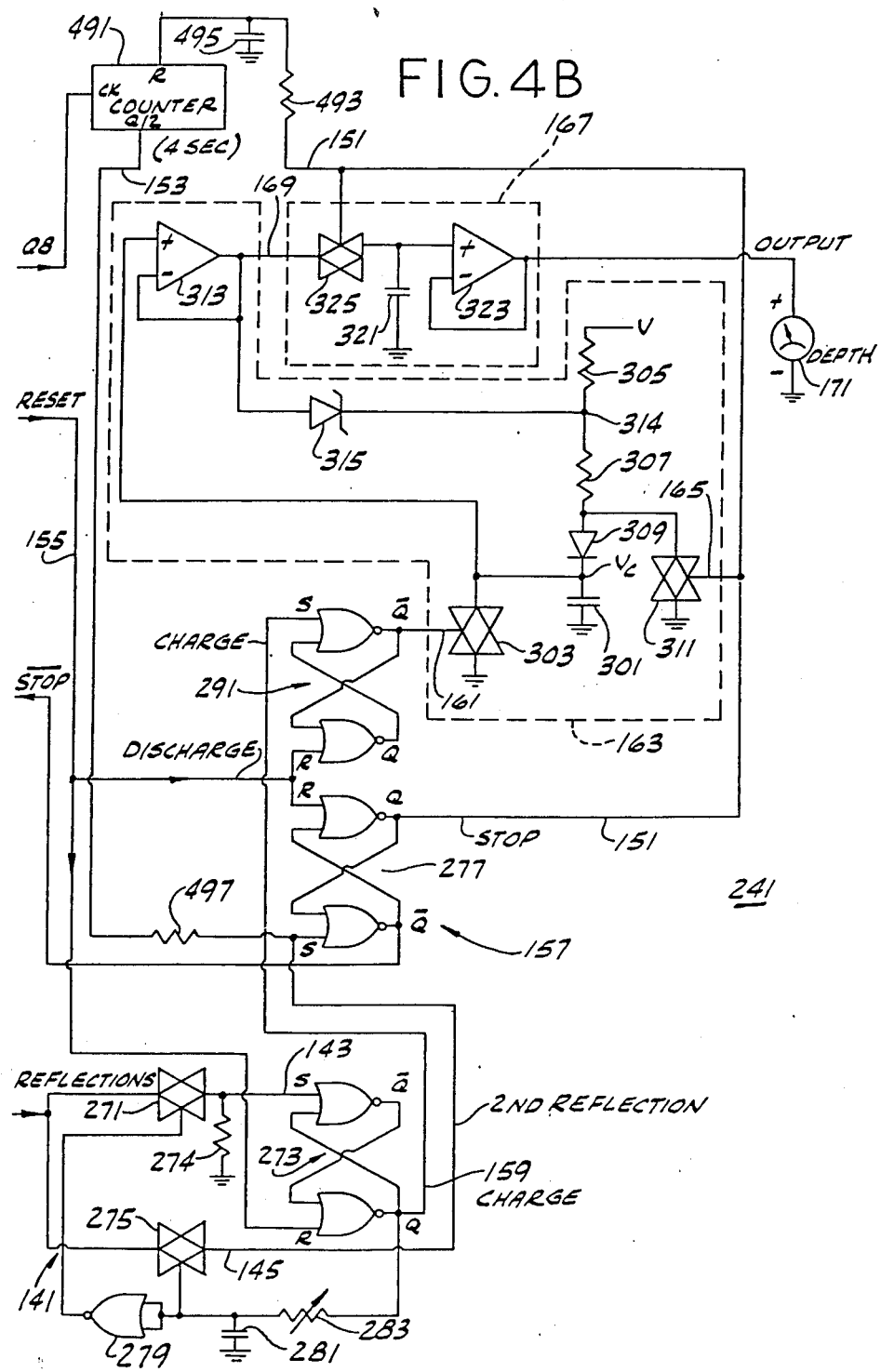

FIGS. 4A and 4B show a schematic for a circuit for implementing the block diagram of FIG. 3 and operating according to the method of FIG. 3A.

In FIG. 4A oscillator 131 has a 2-input NOR-gate 201 feeding a 2-input NOR-gate 203. NOR-gate 203 is wired with both inputs connected together to form an inverter. A capacitor 205, a resistor 207 and a resistor 209 are connected together at a point 210, and the network so formed has the capacitor 205 oppositely connected to the output of NOR-gate 203, the resistor 207 oppositely connected to the output of NOR-gate 201, and the resistor 209 oppositely connected to a first input of NOR-gate 201. Disable line 137 is connected to the second input of NOR-gate 201.

A high on disable line 137 forces the output of NOR-gate 201 low, which in turn forces the output of NOR-gate 203 high. Current flows from the output of NOR-gate 203 to the output of NOR-gate 201 by way of capacitor 205 and resistor 207, charging capacitor 205. When the disable line 137 goes low, the output of NOR-gate 201 goes high and the output of NOR-gate 203 goes low. Because of charged capacitor 205, the voltage at point 210 suddenly goes negative when the output of NOR-gate 203 goes low. Capacitor 205 charges in the opposite direction through resistor 207, and the voltage of point 210 rises positive. NOR-gate 201 then senses the positive voltage at point 210 through resistor 209, and its output goes low. The output of NOR-gate 203 goes high, and because of the charge now on capacitor 205, point 210 suddenly rises to a voltage higher than the NOR-gate 203 output. The voltage at point 210 then falls until it is sufficiently low to cause NOR-gate 201 to produce an output high again, and repeat the cycle of oscillation just described.

Disable line 137 is connected to the output of a NOR-gate 211 wired as an inverter the input of which is connected to the output of a NOR-gate 213 having inputs 215 and 217. Input 215 is connected to the output of a one-shot multivibrator 216. Input 217 is connected to the output of a NOR-gate 219 wired as an inverter the input of which is connected to the output of another NOR-gate 221. NOR-gate 221 has inputs 223 and 225 to which are respectively fed signals designated X and Y from two additional one-shot multivibrators 227 and 229.

An 8 bit shift register 231 has a four stage section 233 and another four stage section 235. The clock inputs (CK) of each section 233 and 235 are connected to the oscillator 131 at the output of NOR-gate 203. The stages have outputs designated Q1 through Q8. Output Q8 is connected directly to a Reset (R) input of section 233. A resistor 237 is connected between Q8 and a Reset (R) input of section 235. A capacitor 239 is connected between the Reset input of section 235 and ground. In this way the output Q8 is connected to reset shift register 231 by resetting section 233 and then section 235 a microsecond later, so that all outputs Q1–Q8 initially have the same logic level (a low). Oscillator 131 is connected to shift register 231 to clock a complementary (e.g., high) logic level of a power supply voltage V from the data (D) input through the shift register. Output Q4 is connected to the data (D) input of section 235 to couple the fourth and fifth stages of the shift register 231.

The three one-shot multivibrators 227, 229 and 216 are respectively activated by outputs Q2, Q4, and Q5 when the complementary (high) logic level reaches the second, fourth and fifth stages in the shift register 231. NOR-gates 211, 213, 219 and 221 are the equivalent of a 3-input OR-gate, to disable oscillator 131 when any one of the one-shot multivibrators 227, 229 and 216 is activated. One-shot 227 provides a 50 microsecond reset pulse signal for a depth signal generating circuit 241 (FIG. 4B), which is comprised of circuits 157, 163 and 167. The shift register 231 has an intermediate stage with output Q3 for initiating the electrical pulses applied to the transducer 21 by means of driver circuit 135. One-shot 229 provides a window pulse signal, which is adjustable in width between 10 and 40 microseconds, for defining a predetermined time interval during which the first and second reflections are expected to occur. One-shot 216 disables the oscillator 131 for a predetermined time period of a little less than a millisecond to lengthen the time period between the electrical pulses applied to the transducer 21. Output Q8 resets the shift register 231 when the complementary (e.g. high) logic level has reached the last stage.

The one-shots 227, 229, and 216 have the same mode of operation and are essentially identical. One-shot 216 is next described, and corresponding descriptions of one-shots 227 and 229 are omitted for brevity without sacrificing completeness of disclosure. One-shot 216 has a two-input NOR-gate 251, one input 253 of which constitutes the input for the one-shot. The output of NOR-gate 251 is connected by a capacitor 255 to the inputs of a NOR-gate 257 which acts as an inverter. The output of the NOR-gate 257 constitutes the output of the one-shot, and is also connected to the other input 259 of NOR-gate 251. The inputs of NOR-gate 257 are connected to power supply voltage V by a resistor 261.

When input 253 goes high even momentarily, the one-shot 216 produces an output pulse of a predetermined width because the output of NOR-gate 251 goes low and capacitor 255 begins to charge from supply voltage V through resistor 261. The output of NOR-gate 257 immediately goes high and supplies the high to input 259 of NOR-gate 251 holding its output low. The output of NOR-gate 257, and thus the output of the one-shot 216 as a whole, remains high until capacitor 255 has charged to a level sufficient to cause the output of NOR-gate 257 to go back low. The values of the resistor and the capacitor in each one-shot 227, 229, and 216 are selected to obtain the desired pulse width for each. The resistor in one-shot 229 is made variable to set the window as long as possible but not quite long enough to include the first rod reflection.

The pulse causing circuit 133 with its shift register 231 and one-shots 227, 229, and 216 thus comprises means for providing a reset signal for the generating means (e.g., circuit 241), means for sending electrical pulses to the transducer means, and means for generating a signal defining a predetermined time interval during which the first and second reflections are expected to occur.

Gate 139 is connected to the output of amplifier 137 and is an electronic analog switch which is rendered conductive when a high is supplied on line 147 from one-shot 229. Amplifier 137 constitutes means connected to transducer 21 for amplifying the first and second electrical signals only when their voltage exceeds a predetermined threshold value. Gate 139 constitutes means for gating the output of the amplifying means to the generating circuit 241 only during a predetermined portion of the time interval between successive ones of the emitted ultrasonic pulses. Shift register 231 constitutes a means for causing the transducer means to emit pulses of the ultrasonic energy. One-shot 229 constitutes means connected to said pulse causing means for producing a signal to define a predetermined time interval during which the first and second reflections are expected to occur. Gate circuit 139 constitutes means connected to the amplifying means and to the interval signal producing means for coupling an output from the amplifying means only in the predetermined time interval during which the first and second reflections are expected to occur so that only the first and second electrical signals are obtained from the amplifying means.

The gate 139 of FIG. 4A is directly connected to separating circuit 141 of FIG. 4B. Separating circuit 141 has a first electronic switch 271 for selectively coupling transducer 21 (through amplifier 137 and gate 139) to a set input on line 143 of a first flipflop 273. A shunt resistor 274 holds the set input low as a precaution against stray noise when the switch 271 is nonconductive. Circuit 141 also has a second electronic switch 275 connected to gate 139 for similarly coupling transducer 21 to a set input on line 145 of a second flip-flop 277. A NOR-gate 279 having its inputs wired together as an inverter, acts as control means responsive to the first flip-flop 273 for making one of the switches (e.g. 271) conductive and the other (e.g. switch 275) nonconductive depending on the state of the first flip-flop 273. An adjustable short delay on the order of one to ten microseconds is provided by an RC delay circuit consisting of a capacitor 281 shunting the inputs of NOR-gate 279 to ground and a variable resistor 283 connected between the Q output of flip-flop 273 and the inputs of NOR-gate 279. The purpose of this RC delay circuit is to prevent switch 275 from becoming conductive before the damped burst of oscillation constituting the actual first rod reflection has died out. Otherwise, the tail end of the first rod reflection could pass through switch 275 as a bogus precipitation reflection.

The first and second flip-flops 273 and 277 are reset by pulse causing circuit 133 of FIG. 4A on line 155 prior to the occurrence of the first electrical signal from transducer 21 corresponding to the first rod reflection, so that the switch 271 is made conductive (e.g. by NOR-gate 279 output going high) and the switch 275 is made nonconductive. The first flip-flop 273 becomes set by the first electrical signal corresponding to the first rod reflection being conducted through the switch 271. The Q output of flip-flop 273 goes high, causing the output of NOR-gate 279 to go low and the switch 271 then to be made nonconductive by the control means (e.g. NOR-gate 279). Simultaneously, switch 275 becomes conductive in response to the first flip-flop 273 becoming set.

The second flip-flop 277 becomes set by the second electrical signal (caused by the precipitation reflection) being conducted through the switch 275. Circuits 163 and 167 then produce an output signal (third electrical signal) for depth meter 171 representing the depth of the precipitation as a function of the time interval between the time when the first flip-flop 273 becomes set and the time when the second flip-flop 277 becomes set. In addition, a third-flop 291 has a set input connected to the Q output of the first flip-flop 273 by CHARGE line 159. Flip-flop 291 also has a reset input connected to RESET line 155 for resetting flip-flop 291 in response to the pulse causing circuit 133.

RC circuit 163 has a capacitor 301 which is kept effectively shorted by an electronic switch 303 when the third flip-flop 291 is reset, because the Q-bar output of flip-flop 291 is connected to the control pin of switch 303 and is high on reset. When flip-flop 291 is set by the arrival of a first electrical signal corresponding to a first rod reflection at flip-flop 273, the short across capacitor 301 is terminated by flip-flop 291 because Q-bar at flip-flop 291 goes low. Then capacitor 301 is charged from supply voltage V through a network consisting of a pair of series resistors 305 and 307 and a forward biased diode 309 connected in series with the resistors to capacitor 301. As such resistors 305 and 307 and diode 309 constitute means for charging the capacitor 301 when the short is terminated.

The second flip-flop 277 terminates the charging of capacitor 301 by the charging circuit by supplying a Q output high to STOP line 151 and to line 165 to the control pin of an electronic switch 311. Electronic switch 311 is made conductive by the Q output high on line 165, and is connected between ground and the junction of resistor 307 and diode 309. When electronic switch 311 is made conductive upon the occurrence of the second electrical signal corresponding to the second reflection, it bypasses to ground any charging current flowing through resistor 307. Diode 309 becomes reverse biased owing to a positive voltage on partially-charged capacitor 301, so that capacitor 301 is not discharged by switch 311.

An operational amplifier 313 is connected at its noninverting input to the capacitor 301. The output of the operational amplifier 313 is connected back to the inverting input to provide unity gain. The output of the operational amplifier 313 consequently has a voltage essentially equal to the voltage across capacitor 301. To make the charging current supplied to capacitor 301 essentially constant when the capacitor 301 is being charged, a zener diode 315 is connected between the output of operational amplifier 313 and a connection 314 between the series-connected resistors 305 and 307. Resistors 305 and 307 are selected in value so that zener diode 315 breaks down and thereby maintains a constant voltage between the capacitor 301 and the connection 314 of resistors 305 and 307. Because of the zener diode 315 maintaining a constant voltage, an essentially constant current flows in resistor 307 by Ohm's law. This constant current flows into the capacitor 301 upon the occurrence of the first electrical signal corresponding to the first rod reflection, and the current ceases flowing into the capacitor 301 upon the occurrence of the second electrical signal corresponding to the precipitation reflection. The capacitor 301 has a voltage proportional at all times to the charge on it. The charge is equal to the time integral of the constant current, which means that the capacitor voltage is proportional to the time interval between the first and second electrical signals. Since the time interval between the first and second electrical signals is proportional to precipitation depth, the capacitor voltage is also proportional to the preciptitation depth.

The output of operational amplifier 313 is connected by line 169 to sample-and-hold circuit 167. A capacitor 321 is connected from the noninverting terminal of a unity gain operational amplifier circuit 323 to ground. An electronic switch 325 is connected between the capacitor 321 and the line 169. When a high occurs on the switch 325 control pin connected to STOP line 151, switch 325 is made conductive and the voltage at the output of operational amplifier 313, which is essentially equal to the voltage across capacitor 301, is supplied to capacitor 321. Switch 325 performs a sampling function and capacitor 321 and amplifier 323 perform a voltageholding function. Sample-and-hold circuit 167 thus constitutes means for sampling and holding a voltage proportional to the charge on the capacitor when the charging is terminated. The output of amplifier 323 is supplied to depth meter 171.

FIG. 5 shows a waveform timing diagram for illustrating the operations of the circuitry of FIGS. 4A and 4B. When the oscillator waveform OSC first goes high at time 351, it clocks a high into the first stage of shift register 231 and output Q1 goes high as indicated by numeral 353. Output Q1 remains high until the high has reached the last stage causing Q8 to go high after 1000 microseconds (1 millisecond), see time 355. Q8 going high resets shift register 231, causing Q1 to temporarily go low at time 357, and beginning the measurement cycle all over again.

Returning to the beginning of the cycle at time 351, the oscillator 131 executes a full clock cycle after time 351, and at time 359 again clocks shift register 231 by rising high. This clocks the high from the first to the second stage of the shift register, causing output Q2 to go high as indicated by numeral 361. The one-shot 227 is activated and its output X goes high, see numeral 363. Output X remains high for a preset time interval of about 50 microseconds for one-shot 227, and then goes back low at a time 365. While output X is high, oscillator 131 is disabled and its output from NOR-gate 203 remains high. When output X goes back low at time 365, oscillator 131 output goes back low at numeral 367. Then on the next rising transition 369, oscillator 131 clocks shift register 231 so that output Q3 goes high, see numeral 371, and causes driver circuit 135 to produce an electrical drive pulse 373 across transducer 21. The voltage across transducer 21 is generally designated V21. Oscillator 131 continues to run, and its rising transition 375 clocks shift register output Q4 high, see numeral 377. Now the one-shot 229 is activated and its window pulse output Y goes high, see numeral 379. Output Y disables oscillator 131, holding the oscillator output high until point 381 at time 383 when output Y goes back low.

As shown on the FIG. 5 part of the diagram for transducer voltage V21, an electrical drive pulse 373 is followed by a first electrical signal 385 corresponding to the first rod reflection, a second electrical signal 387 corresponding to a precipitation reflection, and a signal 389 corresponding to the second rod reflection. An adjustable resistor 391 in one-shot 229 is set so that the width of window pulse output Y is such that the output Y terminates at time 383 just before the signal 389 commences. This setting is readily accomplished by adjusting resistor 391 to its high resistance extreme when the sensor 11 is dry. Depth meter 171 will read a high value of depth because the signal 389 is within the window and is interpreted as a precipitation reflection. Slowly reduce the resistance of adjustable resistor 391 until the depth meter 171 reading falls to zero. At this point, the window pulse has been reduced in width just enough to exclude the signal 389. As a result, during the interval of time defined by the window pulse output Y between the times indicated by numerals 379 and 383, only the first rod reflection and the precipitation reflection are sensed by the circuit.

The waveform entitled "REFLECTIONS" shows the output of amplifier 137 as windowed by gate 139. This waveform consists of a first closely spaced series 395 of high frequency pulses and a second such series 397 respectively resulting from the amplification of the damped first and second electrical signals 385 and 387. As discussed in connection with FIG. 4B, flip-flop 273 sets CHARGE line 159 high in response to the first electrical signal 385. This occurs because the first pulse in series 395 sets flip-flop 273 at time 401 as shown by the waveform "CHARGE" in FIG. 5. Similarly, the first pulse in series 397 sets flip-flop 277 STOP line 151 high at time 403 as illustrated by the waveform "STOP" in FIG. 5.

Waveform VC for the voltage across capacitor 301 is a linear ramp 405 which commences at time 401 and terminates at time 403. It is to be emphasized that unlike the CHARGE and STOP waveforms which are digital, the ramp 405 is analog. This means that the voltage level 407 reached by the ramp is any analog level (as distinguished from a digital high or low).

After time 383 the window interval is over and oscillator 131 is enabled. Oscillator 131 goes low and then rises high at time 409 clocking output Q5 high, see numeral 411. Output Q5 activates one-shot 216, causing output Z to go high, see numeral 413. The purpose of output Z is to disable the oscillator 131 and thereby lengthen the time for the measurement cycle to 1000 microseconds. The oscillator 131 output OSC from NOR-gate 203 remains high as indicated by numeral 415 until output Z goes back low at time 417. Unused outputs Q6 and Q7 of shift register 231 are clocked high by oscillator 131 at times 419 and 421, after oscillations resume at time 417. Output Q8 is clocked high at time 355 as previously stated, when a rising transition 423 from the oscillator 131 occurs.

Now the operation of reset circuitry in FIGS. 4A and 4B is discussed with the help of FIG. 5.

When output Q2 of shift register 231 goes high at time 359, output X of one-shot 227 goes high (see numeral 363). The output X high is conducted to one input 431 of a two-input NOR-gate 433 which in turn has its output connected to both inputs of a NOR-gate 435 connected as an inverter. The output of NOR-gate 435 is forced high by the output X high and supplied to RESET line 155. The RESET high on line 155 resets all of the flip-flops 273, 277, and 291 of FIG. 4B. As a result, line 161 goes high and makes electronic switch 303 conduct to discharge any voltage on capacitor 301. The discharging action is shown by portion 441 of waveform $V_C$ in FIG. 5.

As long as output X is high, RESET on line 155 is high, see FIG. 5. However, output X goes low before the beginning of the window period at time 377. Since it is desirable to keep the circuit reset until the window period begins at time 377, as a precaution against noise, the RESET high is lengthened by additional components in a reset circuit portion 451 (FIG. 4A) of the apparatus. Another input 453 of NOR-gate 433 is connected to an electronic switch 455. A resistor 456 is connected between input 453 and ground as a protection against noise when switch 455 is open. A NOR-gate 457 is con nected as an inverter between output Y of the one-shot 229 and the electronic switch 455 so that when the switch 455 is made conductive, the output of NOR-gate 457 is connected to input 453 of NOR-gate 433. A control pin 459 of switch 455 is connected to the Q-bar output of flip-flop 277 of FIG. 4B. This STOP-bar line to control pin 459 of switch 455 is labelled STOP-bar because it carries the logical complement of the STOP signal of line 151. Control pin 459 of switch 455 is high and switch 455 is conductive unless flip-flop 277 is signalling circuit 163 to stop charging capacitor 301. The switch 455 and NOR-gate 457 act as means for extending the reset pulse provided by the first one-shot multivibrator 227 until the second one-shot multivibrator 229 is activated. This is because one-shot 229 has an output Y low between time 365 and time 379. This output Y low is inverted by NOR-gate 457 and supplied as a high through switch 455, which is conductive, to NOR-gate 433 to keep the RESET line 155 high until output Y goes high.

The switch 455 and NOR-gate 457 in the reset circuit 451 just described also operate advantageously when no precipitation reflection occurs in a given 1000 microsecond cycle of operation of the precipitation depth measurement apparatus. When no precipitation reflection occurs, the flip-flop 277 does not become set, so the STOP waveform continues as a dashed continuing low 471 in FIG. 5 instead of going high. Consequently, STOP-bar remains high instead of going low at control pin 459 of switch 455 and keeps the switch conductive. As soon as the window is over, one-shot 229 output Y goes back low, and causes the RESET signal on line 155 to immediately go back high, as illustrated by dashed RESET waveform portion 473 in FIG. 5, by action of the reset circuit 451 of FIG. 4. During the window period capacitor 301 continued charging, as indicated by a dashed portion 475 of ramp 405, in anticipation of a coming STOP signal. The STOP signal does not come when there is no precipitation reflection, however. Consequently, there is no STOP to trigger a sample-and-hold operation by circuit 167 during the measurement cycle. Instead, RESET goes back high and discharges the capacitor 301 as indicated by the dashed zero voltage level 477 for $V_C$. In this way the pulse causing circuit 133 by including reset circuit 451 has means for also initiating the reset signal immediately after the predetermined (window) time interval has elapsed unless the precipitation (second) reflection has occurred during the time interval.

In FIG. 4B a binary counter 491 which is able to count up to $2^{12}$ (4096) has its clock (CK) input connected to output Q8 from shift register 231 of FIG. 4A. Counter 491 has its reset (R) input connected by a resistor 493 to STOP line 151 and also has the R input connected by a capacitor 495 to ground. Resistor 493 and capacitor 495 constitute a delay circuit providing an approximately 1 microsecond delay after STOP line 151 goes high before the counter 491 is reset. After each measurement cycle every 1000 microseconds, counter 491 is incremented by 1. If a first rod reflection and a precipitation reflection are received (electrical signals 385 and 387 of FIG. 5) then a STOP high occurs and resets counter 491 to zero.

The counter 491 is not reset to zero if no STOP high occurs, as when precipitation is absent or when the surface turbulence of precipitation is such that a precipitation reflection is not detected. In the case of precipitation turbulence, however, a precipitation reflection will ordinarily be detected on a subsequent measurement cycle and the counter is reset to zero. When precipitation is absent, or if for any other reason no precipitation reflection is detected after 4096 measurement cycles (4096 milliseconds or about 4 seconds), then output Q12 goes from a low to a high state on "4 SEC" line 153. The output Q12 high is supplied through a resistor 497 to the set (S) input of flip-flop 277, which causes flip-flop 277 to latch the STOP line 151 high. Since the STOP signal has previously been low, the reset circuit 451 has previously discharged capacitor 301 as indicated by dashed line 477 of FIG. 5. When the STOP line 151 now goes high, zero volts is coupled to sample-and-hold circuit 167 and read out on depth meter 171. The STOP high is coupled back through the delay circuit having resistor 493 and capacitor 495 to reset counter 491 back to zero. In this way counter 491 constitutes means for signaling the sampling and holding means to sample and hold the capacitor voltage when the capacitor voltage has a value indicative of zero depth after a plurality of the pulses in excess of a predetermined number have been emitted and no second electrical signal has occurred. In other words counter 491 acts as means connected to the generating means for setting the third electrical signal to a predetermined value indicative of zero depth after a plurality of the pulses in excess of a predetermined number have been emitted without an occurrence of the second electrical signal corresponding to the second reflection.

Figure 6:
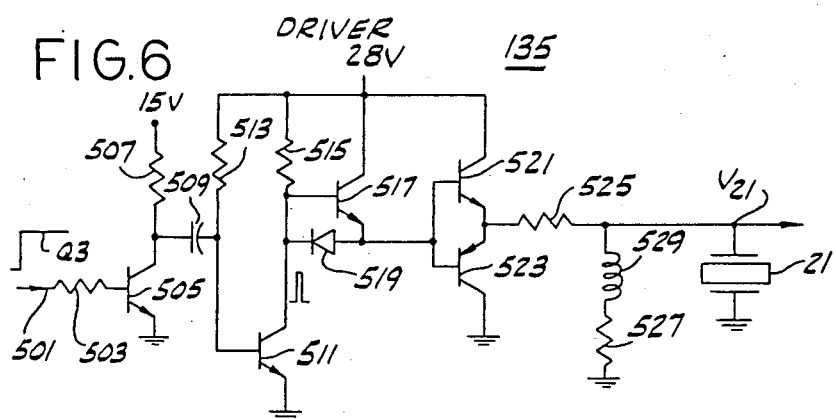
FIG. 6 is a schematic diagram of a driver circuit shown as one of the blocks in FIG. 4A.

A schematic diagram of driver circuit 135 is shown in FIG. 6. Output Q3 (see also FIG. 4A), which is essentially a step function for the present purposes, is supplied on a line 501 through a resistor 503 to the base of an NPN transistor 505, turning it on. Transistor 505 has its collector connected through a resistor 507 to a nominally 15 volt supply voltage, and through a capacitor 509 to the base of another NPN transistor 511. The emitters of transistors 505 and 511 are grounded. A resistor 513 is connected between the base of transistor 511 and a nominally 28 volt supply voltage biasing transistor 511 on in the steady state. However, when the transition in output Q3 occurs, the collector voltage of transistor 505 suddenly goes low, diverting the transistor 511 base current flowing in resistor 513 into capacitor 509 and turning off transistor 511 for a short time programmed by the time constant of resistor 513 and capacitor 509. This time constant is on the order of a microsecond or less for good resolution by the depth measuring apparatus as a whole.

The collector of transistor 511 is connected through a resistor 515 to the 28 volts. The collector voltage of transistor 511 is a short, sharp pulse amounting to the time derivative of the step in output Q3. The collector of transistor 511 is also directly connected to the base of another NPN transistor 517, and connected to the cathode of a diode 519, the anode of which is connected to the emitter of transistor 517. The collector of transistor 517 is directly connected to the 28 volts. The emitter of transistor 517 is connected directly to the base of an NPN transistor 521 and to the base of a PNP transistor 523. Transistor 521 has its collector connected to the 28 volts, and has its emitter connected to the emitter of transistor 523. The collector of transistor 523 is connected to ground. The emitters of transistors 521 and 523 are connected to a 47 ohm resistor 525, the opposite end of which is connected to transducer 21. A 4.7 ohm resistor 527 is connected in series with a 3-turn, ¼ inch diameter, inductor 529 between the transducer 21 end of resistor 525 and ground. This latter resistor 527 and inductor 529 provide damping for the transducer 21.

When the positive pulse in collector voltage of transistor 511 occurs, a pulse of current passes into the base of transistors 517 and 521, turning them on. Diode 519 is reversed biased at this time, and so is the base-emitter circuit of transistor 523. Transistors 517 and 521 provide a high current gain in the connection arrangement shown, so that an amplified pulse of current flows into resistor 525 to excite transducer 21 with V21 pulse 373 of FIG. 5. As soon as the positive pulse in collector voltage of transistor 511 is over, transistor 511 is turned on by base current through resistor 513. Transistors 517 and 521 are turned off. During a brief period when transducer 21 "rings" or oscillates in a highly damped manner in response to the excitation, any current which flows back through resistor 525 toward transistor 523 is shunted to ground by transistor 523. The base current path for transistor 523 is completed by diode 519 which is now forward biased, and the now-conductive collector-emitter path through transistor 511. Transistor 511 advantageously remains conductive when input Q3 goes back low at the end of the measurement cycle, so that transducer 21 is not excited at time 357.

Figure 7:
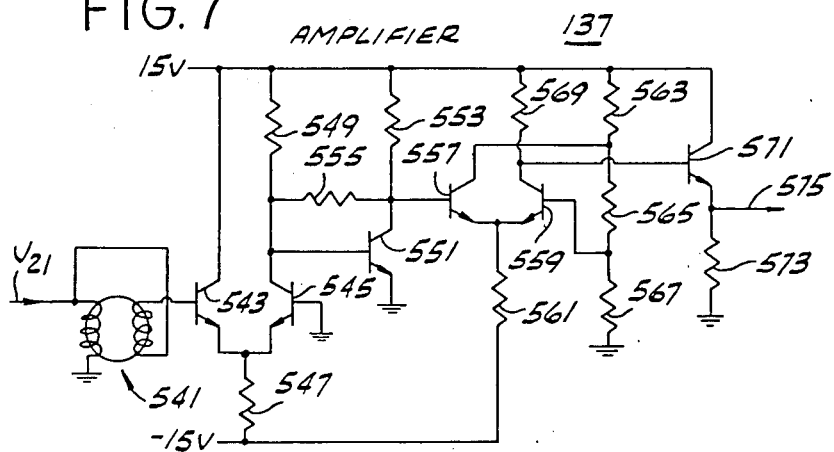
FIG. 7 is a schematic diagram of an amplifier circuit shown as another one of the blocks in FIG. 4A.

FIG. 7 shows a schematic diagram of the amplifier circuit 137. A radio frequency autotransformer 541 is connected between the base of an NPN transistor 543 and ground. The voltage V21 from transducer 21 is coupled to a tap on the radio frequency autotransformer 541. Transistor 543 and another NPN transistor 545 are connected in a differential amplifier circuit in which their emitters are connected together and to a resistor 547 to a minus (−) 15 volt line. Transistor 543 has its collector directly connected to a plus (+) 15 volt line, and transistor 545 has its collector connected through a resistor 549 to the +15 volt line. The transistor 545 collector voltage is fed to the base of another NPN transistor 551. Transistor 551 has a resistor 553 connected between its collector and the plus 15 volt line, and has another resistor 555 connected between its collector and base. The collector voltage of transistor 551 is fed to another differential amplifier having two NPN transistors 557 and 559. The base of transistor 557 is connected to transistor 551 collector. The emitters of transistors 557 and 559 are connected together and to a resistor 561 which is connected at its opposite end to the minus 15 volt line. The base of transistor 559 is biased to a predetermined positive threshold voltage set by a voltage divider connected between the plus 15 volt line and ground. The voltage divider has three series connected resistors—a resistor 563 connected between the plus 15 volt line and transistor 557 collector, a resistor 565 connected between transistor 557 collector and transistor 559 base, and a resistor 567 connected between transistor 559 base and ground. The collector of transistor 559 is connected by a resistor 569 to the plus 15 volt line and is also connected directly to the base of an NPN transistor 571 in an emitter follower circuit wherein transistor 571 collector is connected directly to the plus 15 volt line and transistor 571 emitter is connected by a resistor 573 to ground. The output of the amplifier is supplied from the transistor 571 emitter on a line 575.

In the operation of amplifier 137, a positive voltage due to the electrical drive pulse supplied by driver circuit 135 turns transistor 543 on and turns transistor 545 off, causing the collector voltage of transistor 545 to go high. The high collector voltage of transistor 545 is supplied to the base of transistor 551, turns transistor 551 on, and causes the collector voltage of transistor 551 to fall low. The low transistor 551 collector voltage is coupled to the base of transistor 557 but there is negligible effect on transistor 559 because the voltage at the base of transistor 557 is below the threshold voltage at the base of transistor 559. The collector voltage of transistor 559 remains low, causing the amplifier output voltage on line 575 to remain low. In this way the electrical drive pulse has no effect on the rest of the apparatus. Then the first and second electrical signals arrive, corresponding to the first rod reflection and the precipitation reflection. Since these are each a damped burst of oscillation, they have both positive and negative peaks. The negative side or peak is now discussed. The negative peak makes transistor 543 less conductive and makes transistor 545 more conductive, causing the collector voltage of transistor 545 to fall in voltage from its quiescent value. The fall in collector voltage of transistor 545 is supplied to the base of transistor 551, makes transistor 551 less conductive, and causes the collector voltage of transistor 551 to rise. The rise in transistor 551 collector voltage is coupled to the base of transistor 557 which causes transistor 557 to become more conductive when the collector voltage of transistor 551 rises above the threshold voltage established at the base of transistor 559. Then transistor 559 is made less conductive. The collector voltage of transistor 559 rises causing the amplifier output voltage on line 575 to rise. By contrast, noise which does not rise above the threshold does not cause the amplifier output voltage on line 575 to rise. The level to which the amplifier output voltage rises when the threshold is exceeded depends on the component values used in the amplifier and should be high enough so that the first rod reflection and the precipitation reflection can respectively set the flip-flops 273 and 277 of FIG. 4B. In this way amplifier 137 constitutes means connected to said transducer means for amplifying said signals only when their voltage exceeds a predetermined threshold value.

Driver circuit 135 of FIG. 6 and amplifier 137 of FIG. 7 are mounted on printed circuit board 33 of FIG. 1 when the circuit of FIGS. 4A and 4B is used. Cable 47 of FIG. 1 is implemented as a multiwire cable having 6 conductors—for line 501 to the driver circuit 135, for line 575 from the amplifier 137 output, for +15 volts, for −15 volts, for +28 volts, and for ground. A power supply (not shown) for plus and minus 15 volts and plus 28 volts is located remote from the sensor 11 and is of conventional construction requiring no further discussion. The depth measuring apparatus thus includes a multiwire cable having conductors respectively connected at one end to the pulse causing means (e.g. circuit 133) and to the generating means (e.g. circuit 241), the electronic circuit 43 including means connected to the other end of the multiwire cable for driving the transducer means in response to electrical pulses from the pulse causing means sent along the multiwire cable, the electronic circuit further including means for amplifying the first and second electrical signals from the transducer means and supplying the amplified signals along the multiwire cable to the generating means.

Figure 8:
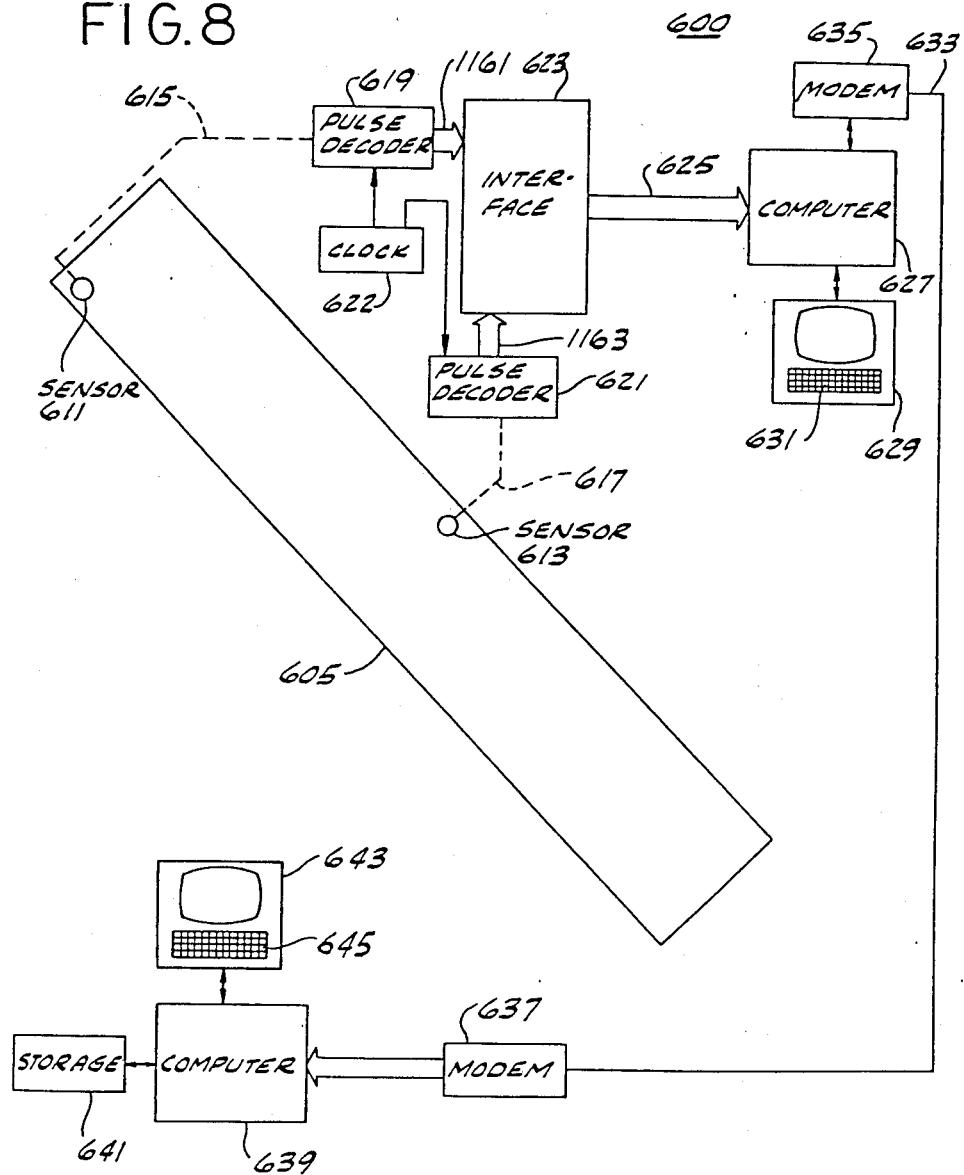
FIG. 8 is a block diagram of ultrasonic depth sensing apparatus of the present invention.

FIG. 8 shows another depth measuring apparatus 600 of the invention. A pathway 605, such as an airport runway, is provided with two identical embedded precipitation depth sensors 611 and 613, which are respectively connected by two buried coaxial cables 615 and 617 to two identical pulse decoders 619 and 621. The pulse decoders 619 and 621 share a clock circuit 622 and provide precipitation depth data in parallel digital form to an interface unit 623, which sends the data along a bus 625 to a first computer 627. Associated with the first computer 627 is a disconnectable video display unit 629 including a keyboard 631 for system maintenance purposes. The computer 627 and display unit 629 are suitably located within a few hundred yards of the sensors 611 and 613, such as on the grounds of an airport, for instance. It is also contemplated that the data be organized by computer 627 and then sent along a serial line such as a telephone line 633 by means of a modulator/demodulator (modem) 635. The data is received by another modem 637 associated with a second computer 639. Second computer 639 is supplied with the data from modem 637 and processes the data into a suitable form for display, human interpretation, and storage. Computer 639 stores the data as appropriate on hard disk or other mass storage 641. A video display unit 643 with a keyboard 645 is connected to the second computer 639 for operator access and control, and display purposes.

Figure 9:
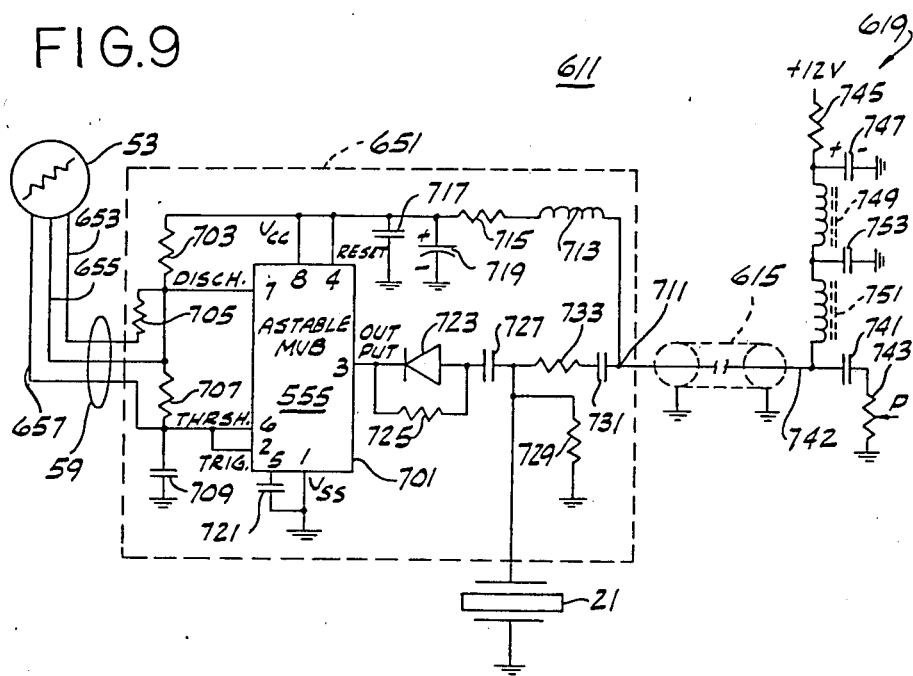
FIG. 9 is a schematic diagram of a circuit for a precipitation depth sensor subassembly for the inventive apparatus of FIG. 8.

FIG. 9 shows a schematic for a circuit 651 of sensor 611. The general physical arrangement of the sensor 611 with transducer 21 is the same as in sensor 11 of FIG. 1. A portion of the circuit of pulse decoder 619 is shown connected by coaxial cable 615 to the sensor 611. Coaxial cable 615 is the counterpart of cable 47 of FIG. 1. Sensor 611 has the electronic circuit 651 instead of circuit 43 of FIG. 1 wired on printed circuit board 33. Precision thermistor 53 of FIG. 1 is connected to circuit 651 by three wires 653, 655, and 657. Electronic circuit 651 includes an astable multivibrator 701 such as a type 555 integrated circuit which supplies pulses at an OUTPUT pin 3 with a duty cycle of about 50% and a repetition period of 1000 microseconds.

Thermistor wire 657 is connected both to THRESHOLD pin 6 and TRIGGER pin 2 of the multivibrator 701. A precision resistor 703 (10100 ohm, 0.1%) is connected between $V_{CC}$ pin 8 and DISCHARGE pin 7. Two precision resistors 705 and 707 have values recommended for use with thermistor 53 which is a YSI 44018 thermistor (available from Yellow Springs Instruments, Yellow Springs, Ohio), for instance. Wire 655 from the thermistor 53 is connected directly to DISCHARGE pin 7. Precision resistor 705 is connected between wire 653 and DISCHARGE pin 7. Precision resistor 707 is connected at one end to DISCHARGE pin 7 and at the other end to both THRESHOLD pin 6 and TRIGGER pin 2. A capacitor 709 (0.068 microfarad, 1%) is connected between wire 657 and ground. Capacitor 709, thermistor 53 and resistors 703, 705, and 707 comprise an RC network that controls the repetition period of multivibrator 701. Since the thermistor 53 is part of the network, temperature influences the repetition period of multivibrator 701.

Coaxial cable 615 (type RG8X) has a 50 ohm characteristic impedance and is advantageously used to provide 12 volts DC, which is supplied from pulse decoder 619, and to convey 200 nanosecond wide pulses generated by the sensor 611 to the pulse decoder. Since the pulses are superimposed on the 12 volts DC at a connection point 711 of cable 615, the DC is filtered for multivibrator 701 by means of a filter network having a 10 microhenry inductor 713 and a 100 ohm resistor 715 connected in series between point 711 and $V_{CC}$ pin 8. For bypassing purposes, a 0.01 microfarad capacitor 717 and a 22 microfarad capacitor 719 are connected in parallel with each other and are connected between $V_{CC}$ pin 8 and ground. A 0.1 microfarad capacitor 721 is also provided between an unused CONTROL pin 5 and ground. A RESET pin 4 of multivibrator 701 is connected to $V_{CC}$ pin 8. A $V_{SS}$ pin 1 is connected to ground.

The 1 KHz. output from pin 3 of multivibrator 701 is applied through a network consisting of a type 1N4148 diode 723, a resistor 725, and a capacitor 727 to transducer 21. Pin 3 is connected to the cathode of diode 723. Resistor 725 is about 47000 ohms and is connected in parallel with diode 723. The capacitor 727 is about 1800 picofarads and is connected between the anode of diode 723 and transducer 21. Transducer 21 is oppositely connected to ground. A 22 ohm resistor 729 is connected in parallel with transducer 21 and provides a good match thereto at the resonant frequency of the transducer. A 0.1 microfarad capacitor 731 connected to point 711 is connected in series with a 36 ohm resistor 733 between transducer 21 and connection point 711. (A low loss RF toroid transformer can be substituted for resistor 733.) Capacitors 727 and 731 provide DC isolation but permit the pulse output of the sensor 611 to flow through resistor 733. The transducer 21 and the resistor 729 together present about 11 ohms of resistance at 7.6 MHz and together with the 36 ohm resistor 733 present 47 ohms to cable 615. In this way, the output impedance of the sensor 611 is matched to the nominally 50 ohm characteristic impedance of cable 615.

In operation, OUTPUT pin 3 of the multivibrator 701 goes high for about 500 microseconds. Diode 723 is reverse biased at this time, so the charging current flows through resistor 725 and charges capacitor 727. The RC time constant of resistor 725 and capacitor 727 is about 85 microseconds, so capacitor 727 is fully charged to about 8 volts at the end of 500 microseconds. The current into capacitor 727 is limited in magnitude by resistor 725. This current also flows through the 22 ohm resistor 729 and develops a negligible voltage drop of less than a tenth of a volt positive. As a result the transducer 21 is not excited during this time.

When OUTPUT pin 3 of the multivibrator 701 goes low, it acts as a current sink of about 30 ohms which is current-limited to about 200 milliamperes. As soon as pin 3 goes low, which takes about 100 nanoseconds (0.1 microsecond), capacitor 727 discharges through a series circuit consisting of diode 723, which is now forward biased, multivibrator 701 from pin 3 to ground, and resistor 729. A negative voltage having a peak value of about 2 volts is developed across resistor 729 and applied to the transducer 21, causing it to emit a pulse of ultrasonic energy. The voltage falls exponentially with a time constant of about 70 nanoseconds (0.07 microseconds), which is equal to the product of the 1800 picofarad capacitance of capacitor 727 and the effective resistance (30 ohms plus 11 ohms=41 ohms) of the series circuit through which it discharges. Consequently, a pulse waveform about 200 nanoseconds long (100 nanoseconds rise time plus somewhat more than 70 nanoseconds fall time) is supplied to transducer 21. 200 nanoseconds is 3 half-periods at 7.6 MHz. so that the rising and falling portions of the waveform interact constructively in driving transducer 21. OUTPUT pin 3 remains low for a temperature dependent nominal time period of 500 microseconds and then goes back high for another temperature dependent nominal time period of 500 microseconds, whence another drive pulse is applied to transducer 21, and so on.

Circuit 651 of FIG. 9 thus constitutes means for causing the transducer means to emit pulses of ultrasonic energy which are reflected as first and second reflections from the top surface of the body (e.g. rod 25) and from the upper surface of an accumulation of precipitation on the top surface of the body and are respectively returned to the transducer which, in response to the reflected pulses, produces corresponding first and second electrical signals.

The cable 615 is terminated in matching impedances at both ends with the circuitry as shown. At the decoder 619 end of cable 615, a 0.01 microfarad coupling capacitor 741 is connected between the center conductor 742 of cable 615 and a potentiometer 743. Potentiometer 143 is oppositely connected to ground and provides a 50 ohm termination for cable 615. The wiper of potentiometer 743 makes available a signal P that is comprised of the electrical drive pulse and the first and second electrical signals corresponding to the first and second reflections sensed by transducer 21. A 12 volt supply voltage at pulse decoder 619 is isolated from signal variations on conductor 742 by means of a 100 ohm resistor 745, a 100 microfarad capacitor 747, two 10 microhenry ferrite inductors 749 and 751 and a 0.1 microfarad bypass capacitor 753. Resistor 745 is connected to the 12 volt supply, and inductors 749 and 751 are connected in series with each other and with resistor 745 between the 12 volt supply and conductor 742. Capacitor 747 is connected between ground and the junction of resistor 745 and inductor 749; and capacitor 753 is connected between ground and the junction of the inductors 749 and 751. In this way the low impedance of the 12 volt supply does not load down cable 615, and the signals on conductor 742 do not get on the 12 volt supply line.

Figure 10A:
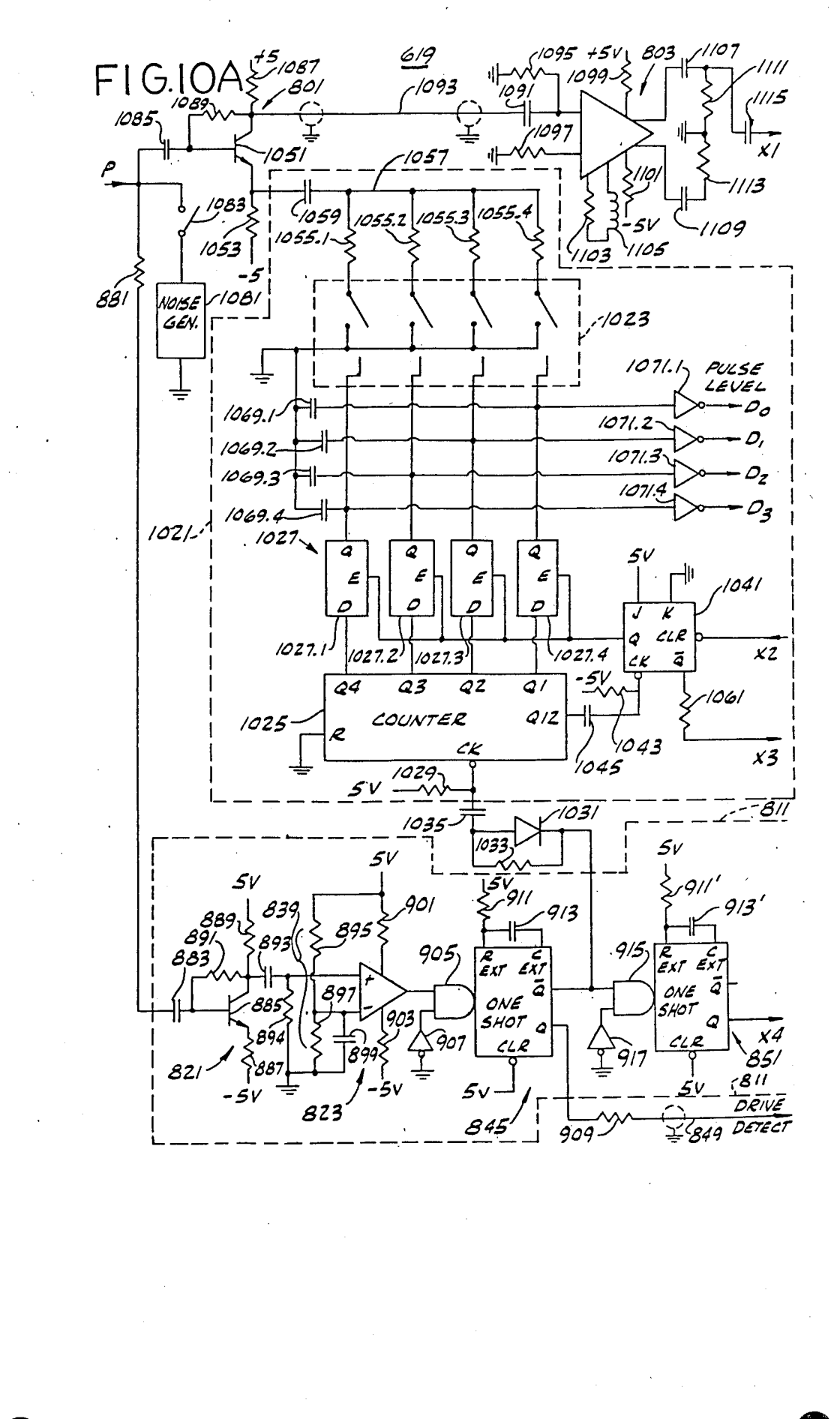

Detection and timing circuits are included in the identical pulse decoders 619 and 621, as described more fully in connection with FIGS. 10A and 10B. Their function is to detect and discriminate between electrical drive pulses to transducer 21 and the first electrical signal corresponding to the first rod reflection and the second electrical signal corresponding to the second (precipitation) reflection. This is accomplished with high speed comparators and a variable threshold generating circuit.

Each pulse decoder defines predetermined acceptance windows for the first rod reflection and the precipitation reflection respectively. In response to the first rod reflection, the detection circuitry outputs a high pulse (START TIMER), which signals a digital counter (see FIG. 13) in each pulse decoder to begin counting up. Then in response to the precipitation reflection, the detection circuitry outputs an active-low pulse (STOP TIMER-bar) which signals the counter to stop. The value in the counter when it is stopped is proportional to a value of precipitation depth. This process is repeated at a nominal rate of one thousand times per second, the actual repetition rate varying with sensor body temperature. The apparatus is capable of measuring rain water depths in a range at least as wide as 0.03 to 0.45 inches with an accuracy at least as good as ±0.01 inch. The 0.03 minimum depth measurement capability is well under the 0.05 inch to 0.15 inch values at which hydroplaning first becomes a hazard for various aircraft and vehicle speeds.

If the precipitation upper surface 75 were parallel to the top surface 29 of rod 25, a precipitation reflection 73 would be received by transducer 21 in response to every one of the electrical drive pulses. In reality, wind, rainfall, and flowing water present a dynamically changing, turbulent surface 75 to the sensor. A substantial fraction of the precipitation reflections 73 are reflected in unintended directions and lost to the transducer 21. Consequently a diminished number of precipitation reflections or "return pulses" are actually received, compared to the number of electrical drive pulses applied to transducer 21. For instance, under very harsh conditions, as few as 65 pulses are sporadically received in a 10 second interval although about 10,000 drive pulses have been supplied. Because the surface 75 is turbulent, the time t between the first rod reflection and the precipitation reflection is unsteady and erratic in principle. The apparatus is sufficiently sensitive to produce differing individual values of depth over time corresponding to the values of time t. The apparatus advantageously organizes and interprets these differing individual values on a collective basis to achieve real time determination of the precipitation depth and trends therein even under adverse surface conditions.

For proper operation of the sensor 611 on a level pathway surface, it is preferable that the top surface 29 of aluminum rod 25 be within one degree (1°) of horizontal. On a sloping pathway surface from which water runs off, the sensor is mounted to coincide within one degree with the slope of the pathway surface. Installation is accomplished as follows: Dig a hole in the pathway and pour liquid epoxy into the hole to only partially fill the hole. Bury the cable leading to the sensor. Drill three holes in the epoxy after it cures into a solid platform in the bottom of the hole, and anchor three metal studs in the three holes. The three metal studs are each internally threaded to accept one screw apiece. The three screws act as an adjustable tripod to support the bottom of the potting compound 61 of FIG. 1. Adjust the screws by trial and error until the sensor has the desired orientation. Pour additional epoxy to fill the hole in the pathway by flowing epoxy around the studs and screws and beneath and around the potting compound 61 of the sensor itself. The epoxy cures solid in the pathway and the installation is complete. The sensor is no obstruction to aircraft or vehicles because it is totally embedded in the pathway.

The following Table is a list of constants which are useful in preparing embodiments of depth measuring apparatus and methods.

TABLE

| | |
|---|---|
| Velocity of Sound in water at 25° C. (77° F.) | 1496.7 m/sec<br>6.6814 × $10^{-7}$ sec/mm.<br>58925.197 inches/sec.<br>1.6971 × $10^{-5}$ sec/inch |
| Correction factor for speed of sound in water | −2.4 m/sec/°C. |
| Velocity of Sound in Aluminum | 6420 m/sec<br>252,756 inches/sec. |
| Frequency of clock 622 | 3,579,545 Hz. (counts/sec) or 2.793651 × $10^{-7}$ sec./count |
| Water depth in inches per count at 25° C. | 8.2308 × $10^{-3}$ inch/count |
| Water depth in inches per microsecond | 0.02933 inches/microsecond |

The pulse decoders 619 and 621 have identical circuits, and most of the schematic diagram of the circuit for pulse decoder 619 is shown in FIGS. 10A and 10B. The rest of the circuit for it is found in the areas marked 619 on FIGS. 9 and 13.

Referring to FIGS. 10A and 10B, a radio frequency (RF) amplifier 801, a video amplifier circuit 803, a transistor amplifer 805 (FIG. 10B), and another amplifier 807 are cascaded to constitute a broad band receiver with fully adequate gain and signal-to-noise ratio to amplify signal P supplied at the wiper of potentiometer 743 of FIG. 9. The coupling capacitors in the receiver are selected in value so that the cumulative effect of the several stages of amplification is a sharp cutoff high pass filter rolling off below about 1 MHz. Amplifiers 801, 803, 805 and 807 together constitute means connected to the transducer means for amplifying the first and second electrical signals corresponding to the first and second reflections, thereby to produce an amplifier output.

Figure 13:
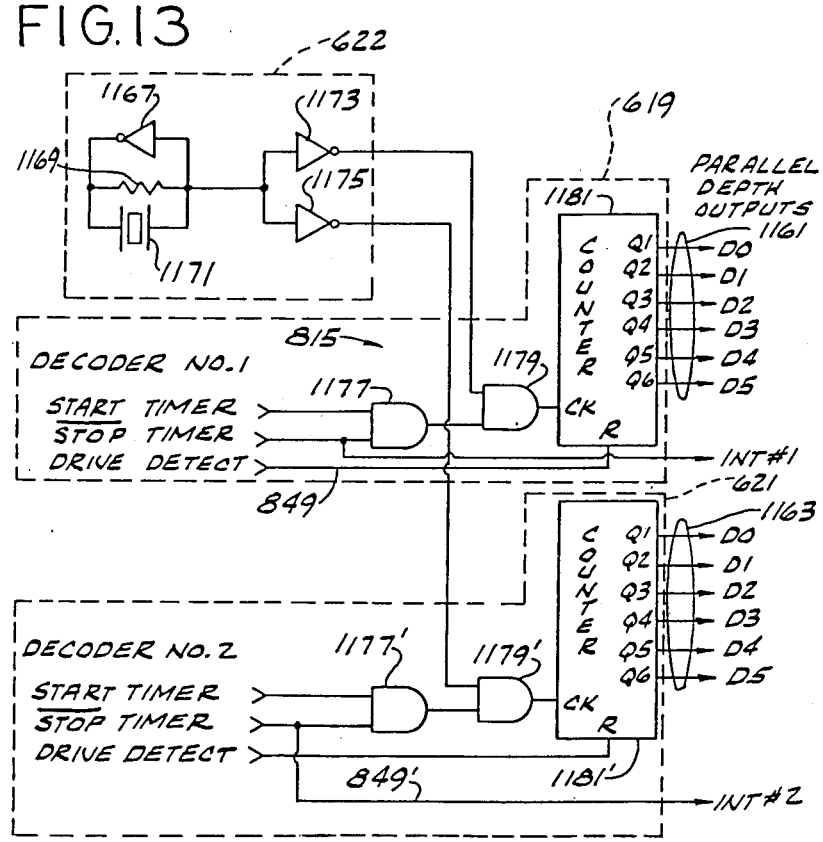
FIG. 13 is a schematic diagram of a clock circuit and counters for the inventive pulse decoders of FIGS. 8, 10A and 10B.

A circuit 811 of FIGS. 10A and 10B is connected to the output of amplifier 807 on a line 808 of FIG. 10B for initiating a first timing signal START TIMER-bar and its complement START TIMER upon the occurrence of the first electrical signal. A first comparing circuit 813 compares the amplifier 807 output with a threshold level which has a magnitude that decreases with time. More specifically, the threshold level exponentially decays to a preestablished adjustable magnitude. The operation of the first comparing circuit 813 is started upon an occurrence of the first timing signal START TIMER-bar. The first comparing circuit 813 initiates a second timing signal STOP TIMER-bar when the amplifier 807 output reaches the threshold level, and thus indicates the occurrence of the second electrical signal corresponding to the precipitation reflection. In FIG. 13, a counter circuit 815 shown within the dashed lines for pulse decoder 619 acts as means for generating a third electrical signal, which is a parallel digital signal on a set of six lines D0–D5, representing the depth of the precipitation as a function of the time interval between occurrences of the first and second timing signals START TIMER-bar and STOP TIMER-bar.

The first timing signal initiating circuit 811 of FIGS. 10A and 10B is now described in more detail. A pulse amplifier 821 has its input connected to signal P. The pulse amplifier 821 amplifies and inverts signal P and feeds it to a second comparing means comprised of a comparator 823.

The operation of the second comparing means is better understood by referring to FIG. 11. Signal P includes of an electrical drive pulse 831, a first electrical signal 833 corresponding to a first rod reflection, a second electrical signal 835 corresponding to a second reflection (precipitation reflection), and a signal 837 corresponding to a second rod reflection. Another electrical drive pulse 831' recurs after nominally 1000 microseconds. The magnitude of the negative going electrical drive pulses 831 and 831' exceeds the peak magnitudes of the signals 833, 835, and 837.

To detect the electrical drive pulses such as 831 and 831', a voltage divider 839 in FIG. 10A supplies a predetermined voltage which exceeds the amplified peak magnitudes of the signals 833, 835, and 837 but not the magnitude of the electrical drive pulses 831 and 831'. Thus, comparator 823 has its inverting (minus) input set sufficiently high in voltage by divider 839 so that only the drive pulses 831 and 831' (which are about 200 nanoseconds wide each) can pass to a first one-shot multivibrator 845. Each electrical drive pulse such as pulse 831 causes one-shot 845 to produce a DRIVE DETECT pulse of approximately 10 microseconds duration on a line 849 of FIGS. 10A and 10B.

The first timing signal initiating circuit 811 not only includes second comparing circuit 823 but also first, second and third one-shot multivibrators 845, 851, and 853. The second comparing circuit 823 triggers the first one-shot multivibrator 845 to produce a third timing signal (e.g. DRIVE DETECT) in response to each of the electrical drive pulses. The first one-shot multivibrator 845 triggers the second one-shot multivibrator 851 to produce a fourth timing signal X4 at the conclusion of the third timing signal DRIVE DETECT. The fourth timing signal X4 occupies an interval in which the first electrical signal (first rod reflection) is expected to occur. The amplifier 807 output line 808 and the fourth timing signal X4 are coupled to the third one-shot multivibrator 853 so that the first electrical signal triggers the third one-shot multivibrator 853 to produce the first timing signal START TIMER-bar.

The third one-shot multivibrator 853 produces the first timing signal START TIMER-bar as a pulse which is the complement of START TIMER pulse 855 of FIG. 11. The second one-shot multivibrator 851 acts as means for enabling the third one-shot multivibrator 853 to respond to the first electrical signal 833 in the amplifier output only during a predetermined time period defined by the width (nominally 10 microseconds) of X4 pulse 861 when the first reflection is expected to occur following another predetermined time period defined by the width of DRIVE DETECT pulses 865 and 865' subsequent to each of the electrical drive pulses 831 and 831'.

START TIMER pulse 855 and its complement act as a window defining another predetermined time period in which the second electrical signal 835 corresponding to the precipitation reflection is expected to occur. This window is made long enough to encompass the second rod reflection 837. By contrast with the circuit of FIGS. 4A and 4B which is preferably adjusted by means of variable resistor 391 to exclude the second rod reflection, the circuit of FIGS. 10A and 10B has a resistor 871 and a capacitor 873 associated with one-shot 853 selected in value so that the "window" or width of START TIMER-bar optionally does include the second rod reflection. The window width is about 25 microseconds, well in excess of the 16 microseconds between first and second rod reflections for a 2 inch rod. Then data associated with the second rod reflection can be used with data associated with the precipitation reflection for computing turbulence, as later described herein, and for other purposes.

As shown in FIG. 11, the first electrical signal 833 (first rod reflection) occurs a time interval 875 after electrical drive pulse 831. The length $t_1$ of the time interval 875 is given the formula $$t_1 = 2L/v_b \qquad (3)$$

where L is the length of rod 25, $v_b$ is the velocity of sound in the material of rod 25, and a factor of 2 accounts for round-trip travel between lower surface 81 and top surface 29 of rod 25. The signal 837 associated with the second rod reflection occurs a time interval 875' after the first electrical signal 833. Time interval 875' is equal to interval 875 because the travel time is the same for the second roundtrip in the rod as for the first such roundtrip to which interval 875 applies. The second electrical signal (precipitation reflection) occurs a time interval 877 after the first electrical signal. Time interval 877 has a length t given by Equation (1), and is the round trip travel time in the precipitation 28 itself, as already discussed.

In FIG. 10A, signal P at the wiper of potentiometer 743 of FIG. 9 is connected to a 1000 ohm resistor 881, which is connected in series with a 0.001 microfarad coupling capacitor 883 between the wiper and the base of an NPN transistor 885. NPN transistor 885 has its emitter connected by a resistor 887 to a nominally −5 volt negative supply, and has its collector connected by a resistor 889 to a nominally +5 volt positive supply. A resistor 891 is connected between transistor 885 collector and base.

A coupling capacitor 893 is connected between transistor 885 collector and the noninverting (+) input of comparator 823. A resistor 894 is connected between ground and the (+) input of comparator 823. Voltage divider 839, having two resistors 895 and 897 series connected between supply and ground, provides an approximately 12 to 1 division from the +5 volt supply to the inverting (−) input of comparator 823, and the inverting input is RF bypassed to ground by a capacitor 899. Low value resistors 901 and 903 connect the supply voltage pins of comparator 823 to the +5 volt and −5 volt supplies respectively.

The output of comparator 823 is connected to one input of an internal AND gate portion 905 of one-shot 845. The other input is tied high by the output of an internal inverter 907 portion of the one-shot 845, the inverter input being tied to ground. From a logic point of view, AND gate portion 905 passes the output of comparator 823 unaffected to the rest of one-shot 845, which produces a Q output high in response to any momentary high from comparator 823. Such a high occurs, due to an electrical drive pulse 831. A resistor 909 is connected between the Q output of one-shot 845 and the center conductor of a shielded line 849 for carrying the DRIVE DETECT pulse.

Each of the one-shots 845, 851, and 853 have a low-active Clear (CLR) pin which is kept inactive by connection to the +5 volt supply. Each of the one-shots 845, 851, and 853 have a Q output and a complementary output Q-bar, and pins designated R EXT and C EXT for connecting an external resistor and capacitor for determining the pulse width of the Q output high produced by each one shot. For one-shots 845 and 851 identical resistors 911 and 911' are connected between the R EXT pin and the +5 volts, and identical capacitors 913 and 913' are connected between the R EXT and C EXT pins.

The Q-bar output of one-shot 845 is connected to one input of an internal AND-gate portion 915 of one-shot 851. The other input is tied high by the output of an internal inverter 917 portion of the one-shot 851, the inverter input being tied to ground. From a logic point of view, AND gate portion 915 passes the Q-bar output of one-shot 845 unaffected to the rest of one-shot 851, which produces a Q output X4 high of 10 microsecond width in response to an input high. Output Q-bar from one-shot 845 goes high at a time 919 in FIG. 11 when output Q (DRIVE DETECT) goes low. As a result, the onset 920 of the Q output X4 of one-shot 851 occurs about 10 microseconds after the occurrence of electrical drive pulse 831, thereby providing a reasonable window pulse 861 for the first rod reflection.

The Q output of one-shot 851 is connected to one input of an internal AND-gate portion 921 of one-shot 853 (FIG. 10B), and when it is high the AND-gate 921 is enabled. The Q output of one-shot 853 supplies the START TIMER signal, and the Q-bar output supplies the complementary START TIMER-bar signal. An internal inverter portion 923 of one-shot 853 is connected between the output of a comparator 925 and the other input of the AND-gate portion 921. The noninverting (+) input of comparator 925 is connected by a resistor 927 to an output point 929 of amplifier 807.

The inverting (−) terminal of comparator 925 is connected to a switchable voltage divider consisting of three resistors 931, 933, and 935, and a transistor 937. Resistor 931 is connected between the inverting terminal and the +5 volt supply, and resistor 933 is connected between the inverting terminal and ground. Resistor 935 is connected between the inverting terminal and the transistor 937 collector. Transistor 937 has its emitter grounded, and its base connected to a normally high signal X3. Resistors 931, 933, and 935 form an approximately 7 to 1 voltage divider from the +5 volt supply to the inverting terminal of comparator 925 when transistor 937 is on, and provide an approximately 8 to 5 ratio when transistor 937 is off. This means that the reference voltage at the inverting terminal of comparator 925 is lower when transistor 937 is on. A capacitor 939 RF-bypasses the inverting terminal to ground.

Output point 929 of amplifier 807 is connected by a resistor 941 to the noninverting (+) input of a comparator 943. A threshold voltage is supplied to the inverting (−) input of the comparator 943 from a threshold voltage generating circuit 945. The supply voltage pins of comparator 943 are connected by low value resistors 947 and 949 to the +5 volt and −5 volt supplies. The output of comparator 943 is connected to one input of an internal AND-gate 951 of a one-shot multivibrator 953. The Q-bar output START TIMER-bar of one-shot 853 is coupled with inversion to the other input of the internal AND-gate 951 by an internal inverter 954 of one-shot 953. One-shot 953 has an output Q to which is connected an inverter 955 for supplying the second timing signal STOP TIMER-bar. The Clear (CLR) pin of one-shot 953 is tied high to keep it inactive. A resistor 957 is connected between an R EXT pin of one-shot 953 and the +5 volt supply, and a capacitor 959 is connected between the R EXT pin and a C EXT pin of the one-shot 953.

Figure 12:
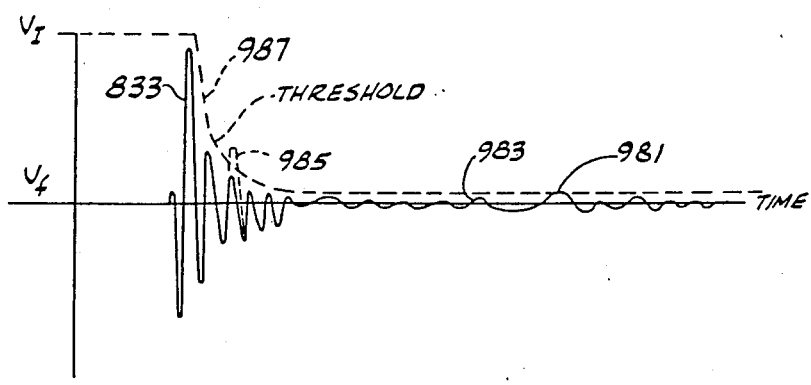
FIG. 12 is an enlarged graph of a first rod reflection graphed in FIG. 11, also showing an exponentially decaying threshold waveform utilized in the circuitry of FIG. 10B.

In first comparing circuit 813 circuit 945 generates an exponentially decaying electrical signal upon the occurrence of the first timing signal START TIMER-bar. The exponentially decaying electrical signal decreases to a magnitude greater than zero set on the potentiometer 971, the steepness or decay constant of the signal being set by the variable resistor 973. The operation of circuit 945 is shown in FIG. 12. The first electrical signal 833 corresponding to the first rod reflection is shown on a magnified scale compared to FIG. 11 and is comprised of decaying oscillations. The second electrical signal corresponding to the precipitation reflection is smaller in amplitude, and for some depths occurs after the first electrical signal has mostly died away, see numeral 981. For these depths the final value of threshold level $V_f$ should be sufficient to exclude noise 983 but not the second electrical signal 981.

When a precipitation reflection 981 is present, the signal voltage at the amplifier output point 929 of FIG. 10B exceeds the threshold level $V_f$ and comparator 943 senses the presence of the precipitation reflection. When, however, a precipitation reflection 985 occurs before the decaying oscillations in waveform 833 have died away, it might be disadvantageously ignored if the circuitry waits before applying a threshold at the level $V_f$. Accordingly, an exponentially decreasing threshold portion 987 is initiated at the level $V_I$ as soon as the first electrical signal 833 is detected. The exponentially decreasing threshold portion 987 is adjusted to just surmount and conform to an envelope of the magnitude of the first electrical signal 833. Then when a precipitation reflection 985 occurs, it sums with the first electrical signal, and a peak occurs which exceeds the exponentially decaying threshold 987. In this way the precipitation reflection 985 is detected, even though it is mixed up with the tail end of signal 833.

Threshold voltage generating circuit 945 has a capacitor 991. The adjustable resistor 973 is connected to the capacitor, and an adjustable voltage source including potentiometer 971 and a unity-gain operational amplifier 993 is connected to and feeds the adjustable resistor 973 for establishing the nonzero magnitude. An electronic switch 995 connects an initial voltage $V_I$, which exceeds the magnitude greater than zero, to the capacitor until the occurrence of the first timing signal START TIMER-bar. The capacitor 991 thereupon discharges through the resistor 973, and the voltage across the capacitor 991 comprises the exponentially decaying electrical signal.

Potentiometer 971 is connected between the +5 and −5 volt supplies. A pair of resistors 1001 and 1003 are connected between the wiper and the respective ends of potentiometer 971. Another resistor 1005 is connected between the wiper and the noninverting (+) input of operational amplifier 993. The noninverting input is RF-bypassed to ground by a capacitor 1007. The output of amplifier 993 is connected to the inverting (−) input to make its gain unity. The output of amplifier 993 is also connected to one end of variable resistor 973. Capacitor 991 is connected between the other end of variable resistor 973 and ground. Line 961 connects to capacitor 991 and variable resistor 973. The electronic switch 995 has a PNP transistor 1009 having its emitter connected to the +5 volts, its collector connected to line 961 and capacitor 991, and its base connected to the collector of an NPN transistor 1011. A resistor 1013 is connected between transistor 1009 emitter and base. The emitter of transistor 1011 is connected by a resistor 1015 to ground.

When the first timing signal START TIMER-bar goes low at the base of transistor 1011, transistor 1011 turns off transistor 1009 and releases the +5 volts (VI) from capacitor 991. Capacitor 991 decays in voltage exponentially through variable resistor 973 down to the preestablished level set by potentiometer 971. The initiation of the threshold voltage decay occurs at the same time as the first timing signal enables the internal AND gate 951 of one-shot 953.

The magnitude of the first and second electrical signals is a function of temperature, dirt loading, and other factors at sensor 611. Also, the gain of amplifiers 801, 803, 805, and 807 is subject to variation due to temperature changes, aging and other factors. A circuit 1021 of FIG. 10A periodically adjusts the degree of amplification provided by the amplifier 801 so that the peak value of the first electrical signal in the amplifier output is maintained substantially constant and simultaneously produces a fourth electrical signal (a parallel digital signal at Pulse Level outputs D0-D3) representing the peak value prior to amplification of the first electrical signal from said transducer means. Circuit 1021 adjusts the degree of amplification in discrete steps and produces the fourth electrical signal as a parallel digital signal representing each step reached at any given time.

Circuit 1021 includes an electronic switch 1023 having a plurality of switch sections connected to the amplifying means so that the degree of amplification depends on which switch sections are closed, and a counter 1025 coupled to the switch sections so that the switch sections are closed in different combinations depending on a value in the counter 1025. The counter is incremented in response to successive ones of the electrical drive pulses so that the degree of amplification provided by the amplifying means is increased from a relatively low initial value. A set of latches 1027 holds the value provided by the counter 1025 when the peak value of the first electrical signal in the amplifier output on line 808 of FIG. 10B first reaches a predetermined level.

To cause the amplifiers 801, 803, 805, and 807 to supply first electrical signal 833 with a constant peak magnitude, circuit 1021 adjusts the gain of amplifier 801 in less than 16 milliseconds at intervals of every four seconds. Counter 1025 has its low-active clock (CK) input connected to +5 volts by a resistor 1029. When each electrical drive pulse 831 triggers one-shot 845 its Q-bar output goes low. The cathode of a diode 1031 is connected to the Q-bar output of one-shot 845. A resistor 1033 is connected in parallel with diode 1031. A capacitor 1035 is connected between the clock input of counter 1025 and the anode of diode 1031. When the Q-bar output of one-shot 845 goes low, it suddenly pulls down the clock input of counter 1025 by means of capacitor 1035 and thereby clocks counter 1025 so that the count is incremented by one. Capacitor 1035 charges, and the clock input goes back high. When the Q-bar output of one-shot 845 again goes high, capacitor 1035 slowly discharges through resistors 1029 and 1033 because diode 1031 is reverse biased at this time. Counter 1025 counts up once per millisecond in response to one shot 845 until a count of 4096 is reached at output Q12 (Q12 amounts to frequency division by $2^{12}$ which is 4096).

An active-low clock (CK) input of a JK flip-flop 1041 is normally low because it is connected to the −5 volt supply by a resistor 1043. A capacitor 1045 is connected between the Q12 output of counter 1025 and the CK input of JK flip-flop 1041. Counter 1025 clocks JK flipflop 1041 on the falling transition of Q12. Inputs J and K are held respectively high and low. A Q output of JK flip-flop 1041 goes high when clocked and enables a set of four latches 1027.1, 1027.2, 1027.3, and 1027.4, an enable (E) pin of each of which is connected to the Q output of the flip-flop 1041. Next, the bits Q1, Q2, Q3, and Q4 at counter 1025 count up in binary form the numbers 0, 1, 2, 3, 4, 5, and so on, the bits of which are respectively supplied to the data (D) inputs of the latches and passed through to the Q outputs of the latches as long as they are enabled. The latches remain enabled until JK flip-flop 1041 becomes cleared by a signal X2 at its low active CLR input.

The counts from the latches 1027 sequentially activate four respective switch sections of analog switch circuit 1023 in permutations of switch closure corresponding to the count Q1-Q4 of counter 1025. The emitter of an NPN transistor 1051 in amplifier 801 is connected to the −5 volt supply by a resistor 1053, which without more would keep the gain of amplifier 801 relatively low. A set of four additional resistors 1055.1, 1055.2, 1055.3, and 1055.4 are respectively connected to a common line 1057 and oppositely connected respectively to the four switch sections of analog switch 1023. A coupling capacitor 1059 is connected between the emitter of transistor 1051 and the common line 1057. The four switch sections ground various combinations of the resistors 1055.1-.4 depending on which switch sections are closed. Since the resistors 1055.1-.4 when grounded are in RF parallel with the emitter resistor 1053 of amplifier 801, the gain is higher than with resistor 1053 alone. The values of resistors 1055.1-.4 are selected so that the gain of amplifier 801 is approximately proportional to the number represented in binary form by the count at outputs Q1-Q4 of counter 1025. Consequently, as the count rises, the gain of amplifier 801 rises and the peak value of the first electrical signal corresponding to the first rod reflection on the output line 808 of FIG. 10B rises.

When latches 1027 become enabled in FIG. 10A by the Q output of JK flip-flop 1041, a logically complementary signal X3 is provided at the Q-bar output through a resistor 1061 to the base of transistor 937 of FIG. 10B. Transistor 937 is turned off, and the reference voltage at the inverting (−) input of comparator 925 rises to its higher selection. As the counting process begins at Q1–Q4 of counter 1025 of FIG. 10A, the peak of the first electrical signal 833 is too low to turn on comparator 925. Subsequently, the count rises high enough so that the peak does turn on comparator 925.

When comparator 925 first responds to a rod reflection from amplifier 807 due to the digitally rising count increasing the gain of amplifier 801, then comparator 925 triggers one-shot 853. The Q-bar output START TIMER-bar of one-shot 853 in turn goes low. A capacitor 1065 on a line 1063 is connected between the low-active clear (CLR) input of JK flip-flop 1041 of FIG. 10A and the Q-bar output of one-shot 853. The falling transition of the Q-bar output of one-shot 853 supplies a sudden low pulse X2 which clears flip-flop 1041. The Q output of flip-flop 1041 goes low and disables the latches 1027. The outputs Q of the latches 1027 subsequently remain latched at that permutation of bits from Q1, Q2, Q3, and Q4 of counter 1025 which was just large enough in binary value to set the gain of amplifier 801 to the level at which first electrical signal 833 turned on comparator 925 of FIG. 10B.

When the Q output of JK flip-flop 1041 goes low as just described, the Q-bar output goes high and turns on transistor 937 of FIG. 10B. This causes the reference level for the comparator 925 to change to the lower selection to provide a substantial margin of sensitivity of comparator 925 to the first rod reflection. In this way the circuitry including comparator 925, transistor 937 and one-shot 853 acts as means for comparing the amplifier output with a first threshold level when the degree of amplification is being adjusted, and for comparing the amplifier output with a second threshold level which is lower in magnitude than the first threshold level after the degree of amplification has been adjusted, the first comparing means (e.g. comparator 925 and one-shot 853) producing a first timing signal (e.g., START TIMER-bar) upon the occurrence of the first electrical signal. Circuit 813 acts as second means for comparing the amplifier output with a third threshold level, the comparing operation of the second comparing means being started upon an occurrence of the first timing signal, the second comparing means initiating a second timing signal (e.g., STOP TIMER-bar) when the amplifier output reaches the third threshold level.

The outputs Q of latches 1027 are RF-bypassed to ground by a set of four capacitors 1069.1, 1069.2, 1069.3, and 1069.4. The binary value of the outputs Q just mentioned is inversely proportional to the level of the first electrical signal 833 in signal P. Circuit 1021 advantageously derives as a byproduct of its digital automatic gain controlling action, a binary representation of pulse level on the outputs D0 through D3 by complementing the outputs Q by means of a set of four inverters 1071.1, 1071.2, 1071.3, and 1071.4. Because the inverters complement the outputs Q, which are inversely proportional to pulse level, the parallel digital signal thereby produced is proportional to pulse level.

The set of pulse level bits on outputs D0–D3 is indicative of the pulse level of the first rod reflection 71. The pulse level is useful data for determining the nature of the precipitation 28 of FIG. 1 which is on the top surface 29 of the aluminum rod 25. If there is no precipitation 28 whatever, the first rod reflection 71 assumes a maximum value here indicated as 100%. The presence of water as the precipitation 28 permits some of the energy which would otherwise be reflected in first rod reflection 71 to be transmitted into the water. Accordingly, the first rod reflection 71 is reduced in level to approximately 80%. When the precipitation is ice, the coupling is even greater and the first rod reflection 71 is reduced to 60% approximately. Thus the pulse level parallel digital outputs D0–D3 advantageously provide information from which the type of precipitation 28 can be deduced.

An optional noise generator 1081 is connected by a switch 1083 to the wiper of potentiometer 743 of FIG. 9 to add noise to signal P. The noise is used to increase the sensitivity of the comparators and of the system in utilizing the depth data collectively in a manner more fully described herein in connection with FIGS. 21A and 21B.

A coupling capacitor 1085 is connected between the wiper of potentiometer 743 and the base of transistor 1051. Transistor 1051 collector is connected to the +5 volts by a resistor 1087, to transistor 1051 base by another resistor 1089, and to an input of amplifier 803 by means of a capacitor 1091 with a shielded line 1093. Video amplifier 803 has two inputs which are terminated with resistors 1095 and 1097 to ground. Supply pins of amplifier 803 are connected to the +5 and −5 volt supplies with resistors 1099 and 1101. A series-connected resistor 1103 and inductor 1105 provide compensation at two pins of the amplifier 803. Amplifier 803 has two balanced outputs through two capacitors 1107 and 1109 terminated in two resistors 1111 and 1113 to ground. The signal appearing across resistor 1111 is coupled as an output X1 by means of a capacitor 1115 to the base of an NPN transistor 1117 in amplifier 805. The emitter of transistor 1117 is connected by a resistor 1119 to a −12 volt supply and by a series-connected capacitor 1121 and resistor 1123 to ground to set the RF impedance in the emitter path. The collector of transistor 1117 is connected to transistor 1117 base by a resistor 1125, to a +12 volt supply by a resistor 1127, and to the base of another NPN transistor 1129 by a capacitor 1131. A resistor 1133 is connected between transistor 1129 base and ground, and another resistor 1135 is connected between transistor 1129 collector and the +12 volts. Transistor 1129 emitter is connected to the collector of another NPN transistor 1137 and through a capacitor 1139 to output point 929. Transistor 1137 emitter is connected to −12 volts by a resistor 1141. The transistor 1137 base is connected to ground by a parallel network of a resistor 1143, a capacitor 1145, and a series-connected resistor 1147 and capacitor 1149. A resistor 1150 is connected between output point 929 and ground.

FIG. 13 shows circuitry for providing parallel digital outputs on separate six-bit-wide data buses 1161 and 1163 which convey the depth data produced every millisecond by the pulse decoders 619 and 621. Clock circuit 622 has an inverter 1167. Between the input and output of the inverter 1167 is connected a parallel combination of a resistor 1169 and a frequency determining crystal 1171. The circuit oscillates at the standard television color burst frequency. Each of a pair of inverters 1173 and 1175 has an input connected to the input of inverter 1167, and each has an output connected to a respective decoder 619 and 621. Pulse decoder 619 has the START TIMER and STOP TIMER-bar lines connected to an AND gate 1177, the output of which is connected to and enables another AND gate 1179. AND gate 1179 has another input connected to the output of inverter 1173. The output of AND gate 1179 is connected to a clock (CK) input of a six-bit counter 1181. The six outputs Q1-Q6 of counter 1181 are connected to the six lines of bus 1161. The circuit of decoder 621 is identical to that of decoder 619, so its components are given identical numbers, but primed, in FIG. 13. The AND gates 1177 and 1179 are connected so that clock pulses are fed to the clock input of counter 1181 only during time interval 877 of FIG. 11 in each millisecond measurement cycle. Counter 1181 counts up clock pulses until a binary number represented by highs and lows on D0-D5 has been obtained corresponding to time interval 877.

Clock circuit 622 supplies clock pulses and counter 1181 counts them. The counting is initiated by the first timing signal START TIMER, terminated by the second timing signal STOP TIMER-bar and reset by DRIVE DETECT on line 849 in response to each of the electrical drive pulses. The third electrical signal of the depth measuring apparatus of FIG. 8 is thus the parallel digital signal produced by the counter when the counting is terminated by STOP TIMER-bar going low. Counting can only occur when AND gate 1179 is enabled by AND gate 1177. AND gate 1177 only provides an enabling high output when START TIMER is high and STOP TIMER-bar is high, and such condition only occurs during the time interval 877. It is evident that the depth measuring apparatus described thus far has a very high rate of data output, and it is necessary to consider the manner in which the large volume of resulting data can be handled. If each depth signal from counter 1181 were recorded separately and sequentially as one byte, then about 60,000 bytes would be needed to store a minute's samples from the sensor, because computer 639 is used more efficiently when it only needs to poll computer 627 about once a minute. If a serial line 633 with 300 baud capacity is to be used, the time required to transmit 60,000 bytes would be 36 minutes for that one minute of sensor data.

To overcome this problem, methods and apparatus are described herein in which it is not necessary to know the order in which the depth data are obtained, but only the distribution of the values. Accordingly, the computer equivalent of a histogram (bar graph) or frequency distribution of occurrences of samples in a range of depths is accumulated. Depths are assigned to a finite number of of depth intervals, and the data are encoded as a number of occurrences of measured depth in each depth interval. The amount of memory is reduced, because only 192 bytes are used to record 60,000 samples, which at 300 baud takes 4.7 seconds to transmit. It is noted that the number of samples recordable in this manner increases exponentially with added memory.

Figure 14:
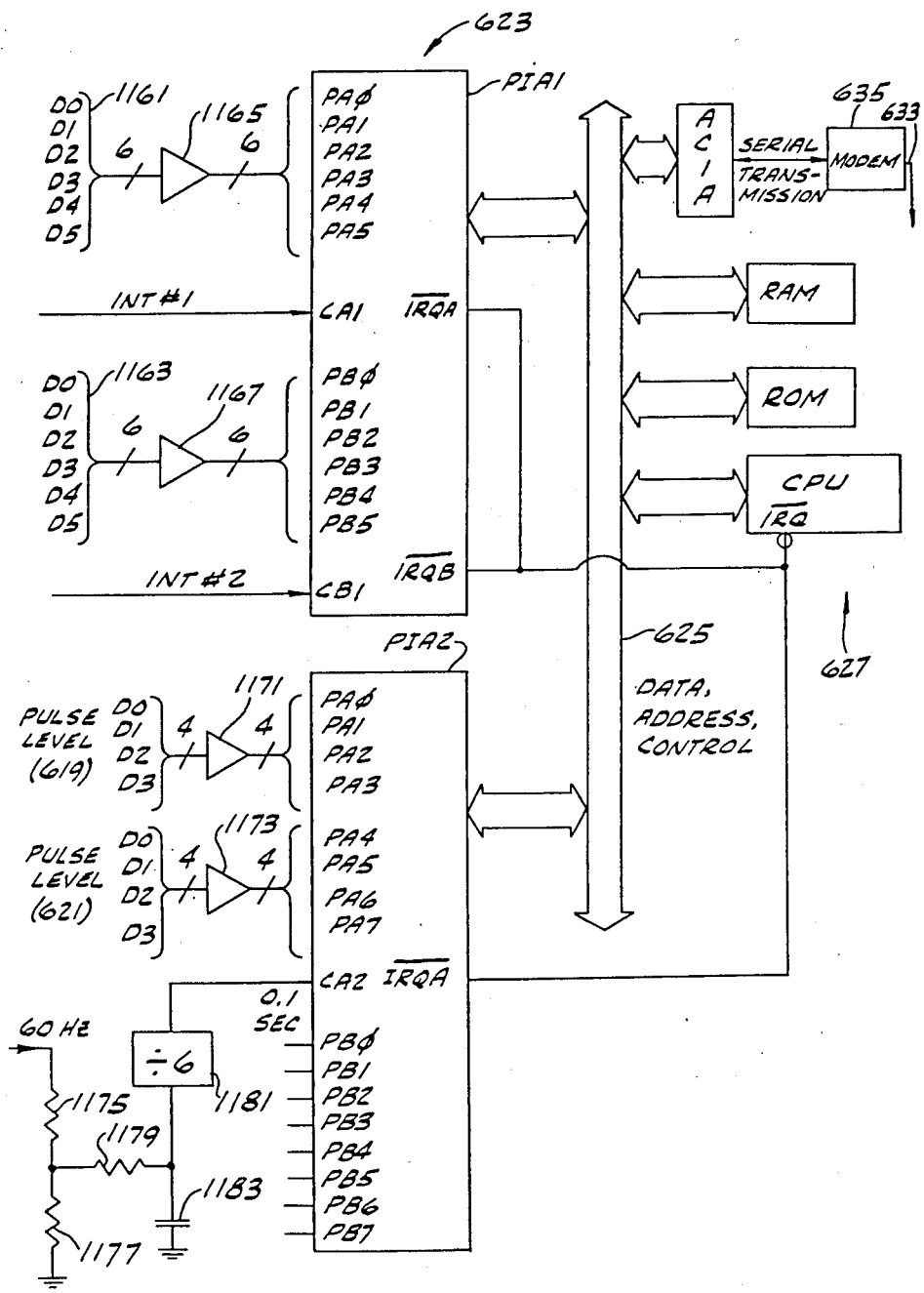
FIG. 14 is a schematic diagram of an interface circuit connected to a first computer of FIG. 8.

FIG. 14 shows a block diagram of interface 623. Interface 623 has first and second peripheral interface adapters PIA1 and PIA2. The six bit wide bus 1161 from pulse decoder 619 is connected to the first six input pins PA0-PA5 of the A input port of PIA1 by six noninverting buffers 1165 which are represented by a single buffer symbol. Bus 1163 is similarly connected to the first six input pins PB0-PB5 of the B input port of PIA1 by six noninverting buffers 1167. STOP TIMER-bar lines INT#1 and INT#2 of FIG. 13 are connected to the CA1 and CB1 pins of PIA1 respectively.

When second timing signal STOP TIMER-bar goes low in a pulse decoder such as 619, it stops the counting by counter 1181 of FIG. 13. STOP TIMER-bar by going low also provides an interrupt signal on INT#1 which is coupled to interrupt output IRQA-bar of PIA1. Interrupt output IRQA-bar of PIA1 is connected to the low-active IRQ-bar pin of the central processing unit (CPU) in computer 627. Similarly, STOP TIMER-bar for pulse decoder 621 couples an interrupt signal on INT#2 which is coupled to interrupt output IRQB-bar of PIA1. Interrupt output IRQB-bar is also connected to pin IRQ-bar of the CPU. It is to be understood that the STOP TIMER-bar signals from pulse decoders 619 and 621 are asynchronous because sensors 611 and 613 have independent thermistor-controlled time bases. An instance of an interrupt from IRQA-bar of IRQB-bar of PIA1 signals the CPU that one of the counters 1181 or 1181' holds digital depth data and is ready to supply it to the CPU.

Each A and B port of each peripheral interface adapter PIA1 and PIA2 is 8 bits wide. The A port of PIA2 has its first four bits PA0-PA3 allocated to the four pulse level lines D0-D3 (FIG. 10A) from pulse decoder 619, and has the second four bits PA4-PA7 allocated to the four corresponding pulse level lines D0-D3 from identical pulse decoder 621. Sets of 4 noninverting buffers 1171 and 1173 are respectively provided for the two sets of four pulse level lines D0-D3.

Once every tenth of a second, an interrupt is provided to a pin CA2 of PIA2. This interrupt is derived from the 60 Hz. frequency of a commercial alternating current power circuit such as a secondary of a small transformer (not shown). A voltage divider consisting of two series-connected resistors 1175 and 1177 is connected between the 60 Hz. voltage and ground. Another resistor 1179 is connected between the junction of resistors 1175 and 1177 and the clock input of a divide-by-six circuit 1181. A capacitor 1183 RF-bypasses the input of circuit 1181 to ground. Circuit 1181 divides the 60 Hz. power frequency down to 10 Hz., and its output is connected to input CA2 of PIA2, coupled to interrupt output IRQA-bar of PIA2 and then wire-ORed with IRQA-bar and IRQB-bar of PIA1 to the interrupt input IRQ-bar of the CPU.

Pins PB0-PB7 of PIA2 are used for adjusting the exponentially decreasing threshold of each pulse decoder, as discussed in more detail in connection with FIGS. 23 and 24.

The CPU of computer 627 is a Motorola MC6802, and PIA1 and PIA2 are each a Motorola 6821. Main bus 625 has data, address, and control lines to which a random access memory (8 chips of 2114 RAM), a read only memory (ROM: 3 chips of 2716 PROM) are attached as well as the CPU and PIA1 and PIA2. Chip select logic of conventional type is suppressed in the drawing for clarity. An asynchronous communications interface adapter (a type 6850 ACIA) is also connected to bus 625 to permit two-way serial transmission through modem 635 on serial line 633. The construction of computer 627 is of a type familiar to the skilled worker and does not require further elaboration.

The six-bit wide parallel digital signal produced by each counter such as 1181 of FIG. 13 constitutes a third electrical signal generated by each pulse decoder in response to the first and second electrical signals corresponding to the first rod reflection 71 and precipitation reflection 73. The third electrical signal represents the depth of the precipitation as a function of the time interval between occurrences of the first and second electrical signals. When the precipitation reflection 73 does not occur in a given measurement cycle, the third electrical signal generally represents the time interval between occurrences of the first and second rod reflections. Computer 627 accumulates respective totals of the number of times the third electrical signal from each sensor represents a value of depth lying within each one of a series of depth intervals. The third electrical signal from counter 1181 is a parallel digital signal representing a succession of binary numbers designating the depth intervals. The set of totals is called a "frequency distribution" or a "histogram" herein. On request from computer 639, computer 627 transmits one histogram every ten seconds for each sensor along serial line 633 to the second computer 639 which computes precipitation depth as a function of the totals in each histogram.

It is noted that the depth computation could be performed by computer 627 itself in an alternative circuit. However, in this preferred arrangement the separate computer 639 is used so that the apparatus can be scaled up to use many more sensors serviced by additional computers 627. Separate computer 639 then polls the additional computers too.

Figure 15:
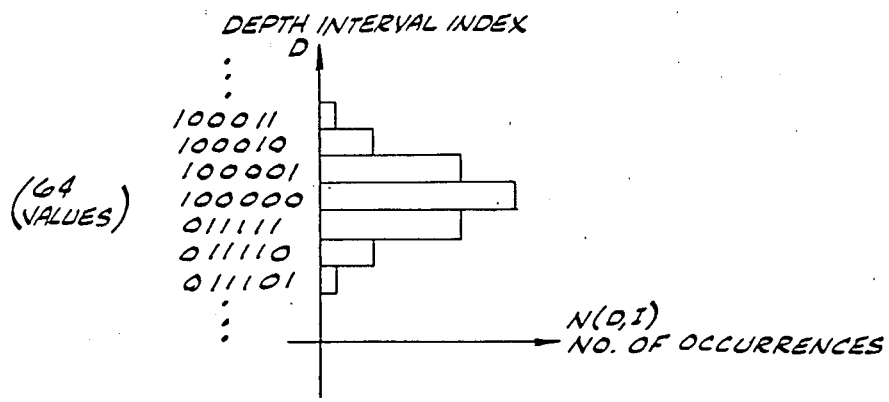
FIG. 15 is a frequency distribution histogram for illustrating operations according to an inventive method of the first computer of FIG. 8 in organizing precipitation depth measurement data.

FIG. 15 shows an example of a histogram which is stored in a transmit buffer of computer 627. Each sensor is identified by an index number I, which can be 1, 2, 3, etc. Corresponding to each sensor I is a set of 64 numbers which are accumulated totals N expressed in binary form and comprise its histogram. The accumulated totals are held in computer locations having 56 addresses here referred to by a set of depth interval index (D) numbers 0 to 55. The depth index D numbers 0 to 55 thus correspond to addresses in RAM holding the cumulative totals N(D,I) telling how many times a depth value lying in each one of 56 depth intervals has been received by computer 627. The 56 depth intervals (indexed from 0-55) represent 1/122 inch intervals of depth in the range 0 to 0.46 inch. For instance, the depth interval represented by binary 000000 is zero to 1/122 inch, 000001 is 1/122 to 2/122 inch, 000010 is 2/122 to 3/122 inch, 000011 is 3/122 to 4/122 inch, and so on up to 110111 which is 55/122 inch to 56/122 inch (0.46 inch). The last eight intervals from 111000 to 111111 (56 to 63 decimal) generally are more or less filled with accumulated totals of second rod reflections in the absence of precipitation reflections to an extent depending on the turbulence of the precipitation. If the sensor is dry, these last eight intervals 56-63 hold essentially all of the data, since there are no precipitation reflections to count.

FIG. 15 shows an example of a histogram for sensor I when the true depth of the precipitation is 0.262 inch (32/122 inch). The RAM of computer 627 constitutes a memory having areas designated by addresses for holding the totals, and the CPU constitutes a digital computer which is connected to the counting means (e.g. counter 1181) for incrementing the total in the respective area of the memory having an address corresponding to the binary number represented at any given time by the parallel digital signal from the counting means. Each accumulated total is represented by a 24 bit binary number held in three bytes of memory. The binary number represented by the parallel digital signal from each counter such as 1181, is the depth interval index D. The depth interval index D is used to compute the address in memory which holds an accumulated total which is to be incremented. In the example shown in FIG. 15, the precipitation is somewhat turbulent water and the largest accumulated total occurs at D index 100000 (32). Smaller totals occur at index D values of 011101 (29), 011110 (30), 011111 (31), 100001 (33), 100010 (34), and 100011 (35). The mean (average) of the distribution shown in FIG. 15 is 32/122 (0.262) inch. The totals may accumulate to values of several thousand when the precipitation upper surface 75 is reflecting most of the pulses of ultrasonic energy back to transducer 21. Consequently, more than 8 bits of memory are needed to hold each accumulated total.

Figure 16:
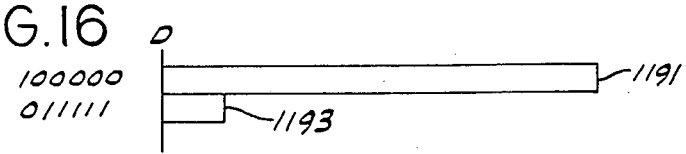
FIGS. 16 and 17 are histograms of depth measurement data for a precipitation layer which is not turbulent.
Figure 17:
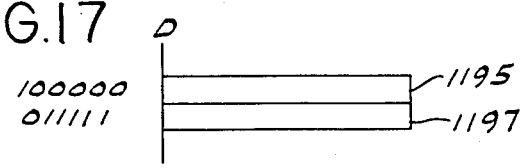

FIGS. 16 and 17 show two examples of histograms resulting from a perfectly level precipitation surface 75 having unchanging actual depth. Instead of just one accumulated total 1191 receiving all of the data in the histogram, a second accumulated total 1193 in an adjacent depth interval accumulates some of the precipitation data too. For another example, accumulated totals 1195 and 1197 of FIG. 17 are equal and also occur in adjacent depth intervals in the histogram. The reason for the second accumulated total in each histogram arises from the fact that the clock 622 is not synchronous with the thermistor-controlled repetition rate of the multivibrator 701 in each depth sensor 611 and 613 of FIG. 8. Consequently, the precise binary number at which counter 1181 is stopped can vary by one count.

The actual precipitation depth can be calculated to higher accuracy than might at first be supposed, considering the width of the depth intervals, by calculating the mean of the histogram according to the formula $$\text{Depth}(I) = C \frac{\sum_{D=0}^{55}[D \times N(D, I)]}{\sum_{D=0}^{55} N(D, I)} \quad (4)$$

where the factor C is a constant of proportionality in inches per count from the TABLE of constants. In words, the value of depth in inches is obtained by computing the mean value of depth index D in counts, and multiplying by the constant C in inches per count. The mean value of depth index D is computed as the sum of accumulated totals each weighted by the depth interval index D value to which they respectively pertain, and then dividing by a grand total of all the accumulated totals. When the depth is perfectly constant, as illustrated in FIGS. 16 and 17, the value of the mean represents the depth to high accuracy. Even trends in the value of the mean depth can be calculated accurately, because the accuracy of the mean is independent of the width of the depth intervals.

When the precipitation is turbulent and the histogram has a considerable spread (or statistical variance) as shown in FIG. 15, the accuracy of the mean depth calculation can exceed the accuracy of a depth estimation based on the peak value. It is to be noted, however, that depth estimation based on the peak value can be fully adequate for many purposes.

FIG. 18 shows a flow diagram of operations performed by the CPU of computer 627 on an interrupt basis for accumulating histograms for each sensor I. Operations commence upon an interrupt low occurrence at IRQ-bar of the CPU with a BEGIN 1201 and proceed to set a sensor identification index I to 1 at a step 1203. Since the interrupt could have occurred at any one or more of pins CA1 and CB1 of PIA1 and pin CA2 of PIA2, the CPU interrogates a status register in PIA1 to determine at a step 1205 if the interrupt is from line INT#1 from pulse decoder 619 and its sensor 611. If so, a table FREQ(I) having a number of entries in a RAM equal to the number of sensors is incremented by 1 at a step 1207 in the table entry for the first sensor 611. This table FREQ(I) is used to report how many electrical drive pulses are occurring in each sensor every ten seconds, and the information is used later in computer 639 to calculate the temperature at each sensor.

Next at a step 1209, a test is performed to determine whether a poll flag has been set in computer 627 by computer 639 indicating that computer 639 wants computer 627 to communicate histograms for all sensors, the table FREQ(I), and the pulse height data for all sensors. If the poll flag is set, computer 627 gets the pulse height data from bits PA0-PA3 of PIA2 and puts it in a transmit buffer at a step 1211 for subsequent transmission to computer 639. After step 1211 a step 1213 is reached. If the poll flag is not set, computer 627 branches from step 1209 directly to step 1213 and proceeds to get a value from PIA1 of depth interval index D for sensor I.

Next at a step 1215, the accumulated total at an address corresponding to depth index D is incremented by one in the histogram for sensor I. The histograms for all the sensors are respective areas in the transmit buffer which are continually updated as the depth data comes in from the sensors. Then whenever the computer 627 is polled by computer 639, the histograms for all the sensors are ready to send. At a rate of nominally 1000 interrupts per second by each sensor, each of the histograms is built up by the incrementing process of step 1215 over time until computer 639 next polls computer 627. In this way computer 627 accumulates respective totals of the number of times the third electrical signal (e.g. counter 1181 output) represents a value of depth lying within each one of a series of depth intervals.

Next in a step 1217, the sensor identification index I is incremented by one to identify the next sensor in turn. Then at a decision step 1219 index I is compared with a prestored number NS, such as 2, representing the number of sensors. If index I does not exceed NS, operations branch back to step 1205, where the interface 623 is interrogated to determine if the next sensor requested the interrupt. If so, operations proceed through steps 1207-1215 as just described.

If it is determined at step 1205 that a given sensor I did not request the interrupt, operations jump forward to step 1217. Index I is incremented at step 1217 and tested at step 1219. The process of servicing all sensors which requested an interrupt, and jumping past those that have not, continues until all the PIA ports for sensors have been interrogated. Then operations proceed forward from step 1219 to a step 1221.

In step 1221 PIA2 is interrogated to determine whether a one-tenth second pulse at pin CA2 of PIA2 requested the interrupt. If not, a RETURN 1223 is reached. If a tenth second pulse did request the interrupt, operations proceed from step 1221 to a step 1225, where the interrupt request (IRQ) flag in PIA2 is cleared. Then a time number NR is decremented by 1 at a step 1227. The time number NR is originally set at 100 (meaning 100 tenths of a second, or 10 seconds). Then a decision step 1229 is reached. If at step 1229, the number NR has not been finally decremented to zero, as it will be after 100 time pulse interrupts, then operations reach RETURN 1223.

If, on the other hand, NR is zero, the 10 seconds is over. It is time to update table FREQ(I) in the transmit buffer so that whenever a poll from computer 639 does come, the table FREQ(I) entries will be no more than 10 seconds old. Operations proceed from step 1229 to a step 1231 where NR is reset to 100. Also, a loop begins to put the temperature-related entries of table FREQ(I) in the transmit buffer. Index I is reset to 1 in step 1231. The value in entry I of FREQ(I) is obtained and saved in the transmit buffer in a step 1233. That value in entry I is cleared (reset to zero) in a step 1235. Index I is incremented in a step 1236. In a decision step 1237, the index I is compared with the number of sensors NS. Steps 1233, 1235 and 1236 are repeated until the table FREQ(I) is all put in the transmit buffer and cleared, whence operations go from step 1237 to RETURN 1223.

It is noted that FIG. 18 is a flowchart of an interrupt routine showing a method of operation of the CPU of computer 627 on interrupt. The main routine for the CPU is shown in FIG. 19. Operations commence at a START 1241 and proceed in a step 1243 to initialize the apparatus by clearing the RAM, doing input/output (I/O) housekeeping of a conventional nature, setting time number NR to 100, setting NS to the number of sensors, and clearing the IRQ flag.

The overall task of the main routine is to monitor the serial line 633 for a polling interrupt from the ACIA, which amounts to a request for information from computer 639, and to transmit back the information when the request is received. Such requests do not necessarily occur periodically. In the next step 1245, computer 627 reads a character received by its ACIA from line 633. If the character does not indicate a valid polling request, the poll flag is not set, and operations branch from a decision step 1247 back to step 1245 to continue monitoring the serial line 633. When a valid polling request is received, the poll flag is set, and operations proceed from step 1247 to a step 1249.

In step 1249 the contents of the transmit buffer are communicated to computer 639. For each sensor identification index I value from 1 to the number of sensors NS, a corresponding histogram N(D,I) is sent, a corresponding pulse height L(I) is sent, and a frequency entry FREQ(I) is sent. In this way, computer 627 completely responds to the polling request by supplying information from all of the sensors. Then it resets to zero all the accumulated totals corresponding to each of the depth index D values 0-63 in all of the histograms. Operations then proceed to a decision step 1251 to determine whether an OFF-ON switch of computer 627 is still on. If so, a branch occurs back to step 1245 to continue monitoring serial line 633 for the next polling request. If computer 627 is turned off, operations terminate at an END 1253.

A flow diagram of a method of operation for the main routine in computer 639 is shown in FIGS. 20A and 20B, which are respective top and bottom halves of one overall FIG. 20 diagram.

Operations commence at a START 1261 and proceed to initialization and housekeeping at a step 1263. The number of sensors NS is set. Pulse level comparison values L1 and L2 are prestored. When potentiometer 743 of FIG. 9 is used to set the pulse level to binary 1100 (12 decimal), L1 is pre- stored as 8 and L2 is 10 decimal. Sensor identification index I is set to one. A set of normalized histograms designated N1(D,I) equal in number to the number of sensors NS is prestored in memory.

The normalized histograms are used in an option later described herein in connection with FIGS. 21A, 21B, and 22 for taking noise into account and even using noise to advantage. The normalized histograms are histograms for the respective sensors when they are dry.

Also in step 1263, tables of data needed for interpreting measured depth information are also prestored in memory. For example, a table of minimum hydroplaning depths for different types of aircraft and their landing speeds is prestored at this time. Another table is prestored identifying all of the runways at an airport and specifying which sensors are located in what locations on each of the runways. In this way, when the depth measurements are calculated for the sensors, it can be determined by computer 639 which runways the depths apply to and whether a hydroplaning hazard might be presented to a given type of aircraft at a given landing speed on any of the runways. It is emphasized that the depth measuring apparatus should only be used in this aspect of its possible applications by authorized, qualified personnel at an airport in accordance with operating procedures which maximally contribute to air safety after being validated and authorized for the airport by appropriate authorities. Indeed, safety considerations should be regarded as paramount in all applications including highways, bridges, and buildings, as well as airports.

After step 1263, computer 639 in a step 1265 sends a polling request to computer 627 over line 633. It is contemplated that a large number of sensors will be used at any major airport. In such case, sets of three or four sensors are associated with a computer like computer 627 for accumulating histograms for them. Many computers 627 are provided to accommodate all of the sensors. Computer 639 polls each of the computers typified by computer 627. Computer 627 responds, and at a step 1267 computer 639 reads the table FREQ(I), all of the histograms N(D,I), and all the pulse levels L(I) respective to each of the sensors.

In a step 1269, the FREQ(I) table information is converted to temperature for the sensor I. First, the FREQ(I) entry is divided by 10 to obtain the average repetition rate on a pulses-per-second basis for sensor I. The thermistor 53 constitutes a temperature-sensitive electrical element connected to the oscillator (e.g., multivibrator 701) for varying the frequency of the oscillator as a function of temperature. The resistance of the thermistor is calculated from the constants for the multivibrator 701 circuit of FIG. 9 according to the formula:

$$R = [[1/(6.8 \times 10^{-8} f)] - 6999.3]/1.386 \text{ ohms} \quad (5)$$

Finally, the temperature of sensor I is calculated from the temperature versus resistance characteristic curve for the thermistor which, for the example thermistor 53, is given by the formula $$TEMP(I) = [[R - 12175]/(-70.608889)] + 32 \text{ (°F.)} \quad (6)$$

It will be recognized that when other circuits and other thermistors are used, the skilled worker develops or obtains the appropriate formulas to convert repetition rate to temperature. In this way interface 623, computer 627, and computer 639 constitute means for generating a signal representing a value of temperature as a function of the repetition rate of the emitted pulses.

Next in a step 1271 the pulse level L(I) for the sensor is corrected for temperature so that when it is subsequently compared with the prestored comparison levels L1 and L2 to identify the precipitation as ice or water, any temperature dependence will have been compensated. This operation involves looking up an entry in a prestored table, the entry being a number on the order of $-2$ to 2 corresponding to the temperature, and adding the number to the received pulse pulse level value L(I). In this way a pulse level value L(I) is varied as a function of the repetition rate of the emitted pulses, to correct for temperature variations.

The depth of precipitation at sensor I is calculated according to Equation (4) at a step 1273. The constant C is the water depth inches-per-count value for water in the TABLE, and is corrected subsequently in step 1273 by the ratio (2.14) of a value for ice to the value for water if the type of precipitation is subsequently determined to be ice. The constant C is corrected for temperature TEMP(I) using the correction constant given in the TABLE according to the formula $$C' = C \times [1 - [2.4(((TEMP-(I) - 32) \times 5/9) - 25)/1496.7]] \quad (7)$$

In this way computers 627 and 639 act as means for accumulating and computing, and computer 639 acts to electronically sum products of at least some of the respective totals times numbers identifying the respective depth intervals to which the totals relate, and divide by a summation of the totals to produce a signal representing a value proportional to precipitation depth. Additionally, computer 639 acts as means for correcting that value proportional to precipitation depth, for temperature variations.

In a step 1275 a quantitative measure of the turbulence of the precipitation is computed from the sensor I histogram N(D,I). Computer 639 generates a signal representing a value of precipitation turbulence at sensor I as a function of the ratio of the number of pulses emitted in a preestablished time period (e.g. 10 seconds) to the number of times that the third electrical signal has been produced in response to occurrences of the second reflection in the same time period. As one example, FREQ(I) can be used to look up a number of pulses emitted in a 10 second time period. A number of times that the third electrical signal has been produced in response to occurrences of the second reflection in that time period can be obtained by summing the accumulated totals in the histogram over the first 56 depth intervals. One of several formulas which can be used for quantifying the turbulence is $$TURBULENCE(I) = \left[ FREQ(I) / \left[ \sum_{D=0}^{55} N(D, I) \right] \right] - 1 \quad (8)$$

When the precipitation surface 75 is perfectly calm, the summation number of precipitation returns in Equation (8) is equal to the total number of emitted pulses FREQ(I). Then the computed turbulence is zero. As the surface becomes more turbulent, the number of precipitation returns falls off, and the computed turbulence rises. The computed turbulence can be further adjusted by a predetermined factor, or expressed by taking the logarithm of the ratio term in equation (8), as the skilled worker elects.

In a step 1277, computer 639 displays the sensor identification index I, the temperature sensed by the thermistor 53 in the sensor, and the time of day. The display occurs on video display unit 643 or on a printer (not shown). Additional relevant information derived from sensor I is generated and displayed in subsequent steps. Then the program loops back and performs the same procedure for the next sensor I until all of the sensors have been serviced.

After step 1277, operations proceed to a decision step 1279 where pulse level L(I) (optionally corrected for temperature in step 1271) is compared with the prestored value L1. If pulse level L(I) is less than or equal to L1, then operations go to decision step 1281, which determines whether the temperature is at or below freezing. If the temperature is at or below freezing, a message identifying the precipitation as ice is displayed in a step 1283, and the flow of operations next passes through a common point 1286 in FIG. 20B. If in step 1281 the temperature is above freezing, the pulse level determination of the precipitation as ice, implied by step 1279, is inconsistent with the measured temperature. A branch is made from step 1281 to write a message in a step 1285 saying "Abnormal Conditions" or the like. The message indicates inconsistent information, and the cause should be determined by personnel. In this way computer 639 acts as means for also generating a further signal indicating an abnormal condition when the temperature corresponding to a repetition rate of the emitted pulses is inconsistent with the icewater identification. Then operations proceed through common point 1286.

If pulse level L(I) equals or exceeds L1 in step 1279, then a branch is made to a decision step 1287 in FIG. 20A where pulse level L(I) is compared with the second, larger constant L2. If pulse level L(I) exceeds L2, then "No Precipitation" is displayed in a step 1289 because the sensor I is dry. Operations then proceed through common point 1286 of FIG. 20B. On the other hand, if pulse level L(I) is less than or equal to L2, then a decision step 1291 determines whether the temperature of sensor I is less than a prestored constant T1. Prestored constant T1 is set to a value which accounts for the temperature at which water is expected to freeze at the given location, taking into account the presence of salt, antifreeze agents and the like. If the temperature is less than this constant, then the temperature is inconsistent with the precipitation type being water. Consequently, step 1285 is reached and "Abnormal Condition" is displayed.

If the temperature is equal to or greater than T1, then computer 639 displays the precipitation type as water in a step 1293. Step 1293 also displays the calculated depth from step 1273 for sensor I, and the calculated turbulence from step 1275. In this way computer 639 also acts as means for comparing a fourth electrical signal representing the peak value of the first electrical signal corresponding to the peak value of the first rod reflection with at least one other signal representing at least one predetermined value to identify the precipitation as ice or water.

Step 1293 being completed, operations proceed to a step 1295 in FIG. 20B where the sensor depth value, histogram N(D,I), and the time of day are stored in storage unit 641 of FIG. 8. As time goes on, depth values for at least three different times of day $t_1$, $t_2$, and $t_3$ become stored. Then in a step 1297 the computer 639 computes a depth rate of change DRC according to a formula $$DRC(I) = [DH(I,t1) - DH(I,t3)]/(t1 - t3) \quad (9)$$

where t1 is the latest time of measurement, t3 is the time of measurement twice previously, DH(I, t1) is the latest depth measurement for sensor I and DH(I, t3) is the depth measurement two measurements previously. In words, the rate of change DRC is a change in depth divided by the length of time in which the change occurred.

Trends in the rate of change are expressed by the discrete, or numerical, second derivative with respect to time of the depth measurements, designated D2RC herein, and given by the formula $$D2RC(I) = \left[ \frac{DH(I, t1) - DH(I, t2)}{t1 - t2} - \frac{DH(I, t2) - DH(I, t3)}{t2 - t3} \right] / ((t1 - t3)/2) \quad (10)$$

where t2 is the time of the next prevous measurement and DH (I, t2) is the next previous depth measurement. In words, D2RC is the rate of change of DRC, i.e. a change in DRC divided by the length of time in which the change occurred.

In performing the DRC calculation in step 1297, computers 627 and 639 act as means coupled to the generating means (e.g. counter 1181) for producing a signal representing a rate of change of precipitation depth. Computer 627 accumulates a first set and subsequently accumulates a second set of respective totals of the number of times the third electrical signal represents a value of depth lying within each one of a series of depth intervals; and computer 639 computes the rate of change of precipitation depth as a function of the totals in the first and second sets (e.g. by deriving the mean of each set and using Equation (9)).

It is noted that more complex equations involving linear regression or other methods can be used to calculate DRC and D2RC.

Next in a decision step 1299, DRC is tested for a positive (+) sign to determine whether the depth is increasing. If not, then if the depth is constant a "Depth not changing" message is displayed. If the DRC is neither positive nor zero, it is decreasing, and a time-to-dry value TTD(I) is calculated as the ratio of the latest measured depth divided by DRC by a formula:

$$TTD(I) = DH(I)/DRC(I) \quad (11)$$

In this way computer 639 constitutes means coupled to the generating means (e.g. counter 1181) for producing a signal representing a rate of change of precipitation depth and an additional signal representing an estimated time when the precipitation depth will become nil, as a function of the depth and the rate of change of depth when the depth is decreasing.

If the depth is in excess of a hydroplaning depth DA, such as 0.15 inch, for most aircraft, a time-to-end-of-hazard estimate TTE(I) can be computed by a formula $$TTE(I) = (DH(I) - DA)/DRC(I) \quad (12)$$

The calculations of time-to-dry and time-to-end-of-hazard are made in a step 1301 whence operations flow through common point 1286.

If the depth is increasing (DRC positive) at step 1299, then operations proceed to a step 1303. In step 1303 a time-to-hazard TTH(I) is estimated if the depth is less than the hydroplaning depth DA for most aircraft, according to a formula:

$$TTH(I) = (DA - DH(I))/DRC(I) \tag{13}$$

By computing Equation (13) in step 1303 or Equation (12) in step 1301, computer 639 constitutes means coupled to the generating means (e.g. counter 1181) for producing a signal representing a rate of change of precipitation depth and an additional signal representing an estimated time when the precipitation depth will reach a predetermined depth value, as a function of the depth and the rate of change of depth. Then operations flow from step 1303 through common point 1286.

When operations flow through common point 1286 they reach a step 1305 where sensor identification index I is incremented by one. Then at a step 1307 index I is compared with the number of sensors NS. If the index I is less than or equal to NS, a branch is made back to step 1267 whence the next sensor I is read and calculations are made for it. After all of the sensors have been read and all the calculations have been made for them individually, operations pass from step 1307 to a step 1309 in which a statement that "the poll is complete" is displayed.

Next at a step 1311 calculations and displays interrelating the depth measurements from several sensors on each runway are made, utilizing the prestored runway sensor table from step 1263. The depth data can be used alone or with rainfall rate data from rainfall sensors (not shown) in equations for predicting the precipitation depth over the entire surface of each runway. A visual or graphic display of depths along a given runway is supplied at user option during step 1311 without necessarily indicating depth numbers as such, and such display is regarded as "displaying the computed value of precipitation depth" for the present purposes. The computer can be programmed to utilize the depth data from one, some, or all of the sensors on each runway.

Step 1311 utilizes a computation procedure which recognizes that the minimum hydroplaning depth increases as an aircraft slows down while landing. Accordingly, where it can be validated that there is no hydroplaning hazard when the depths along the runway are everywhere less than the corresponding minimum hydroplaning depth corresponding to the landing speed profile for a given aircraft, runway surface and other factors, there is no point in closing the runway even though the depth at one end of the runway may exceed the minimum hydroplaning depth corresponding to the velocity of the aircraft at the other end of the runway. See the graph near step 1311. In other words, a runway may present no hazard to landing from a particular direction. Also, a runway may present no hazard to landing by types of aircraft with low landing speeds. Accordingly, computer 639 keeps track of the types of aircraft and their landing speeds, the types of aircraft requesting clearance to land, and which runways have already been allocated by controllers to specific aicraft in response to their landing requests. In this way computer 639 supplies relevant information to the human operators of the apparatus about the overall condition of each runway and the suitability of each runway for use by specific aircraft.

In addition to relatively specific information on the runways supplied in step 1311, the computer 639 is also programmed to digest the mass of relevant information described above for use in displaying runway recommendation options in a step 1313. In step 1313 a display of recommended runways to close and recommended runways to allow clearance to particular aircraft requesting clearance is supplied for use by qualified personnel in forming their human judgments for communication to the aircraft in the air. For instance, when a first set of runways is safe for all aircraft and a second set of runways is safe only for small aircraft, the small aircraft should be given a lower priority for the first set of runways, thereby to maximize the traffic capacity for the airport as a whole.

In a step 1315, a test is made to determine whether the computer 639 off-on switch is ON. If not, an END 1317 is reached. If ON, the sensor identification index I is reset to 1 (one) in a step 1319. Then in a step 1321, keyboard input is made for the latest aircraft flight identifications and aircraft types for the flights currently requesting use of the airport. The computer 639 updates its file of aircraft which have not yet completed their landings and which are still requesting clearances. Then operations proceed back to step 1265 for the next poll request to be issued by computer 639 to computer 627. All of the aforementioned operations and steps are repeated continually for all the sensors, runways, and aircraft so that the depth measuring apparatus can be a useful part of the real time operations of the airport.

Figure 21A:
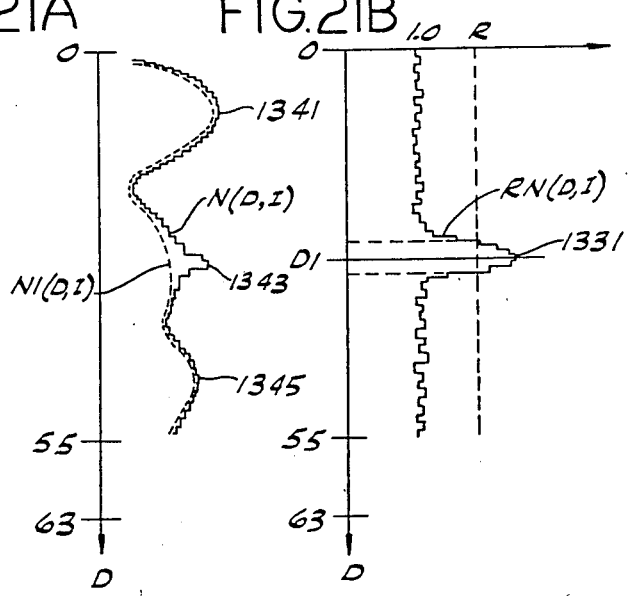
FIGS. 21A and 21B are graphs for describing a computerized method of the invention for reducing errors in interpreting the depth measurement data represented as a histogram.
Figure 21B:
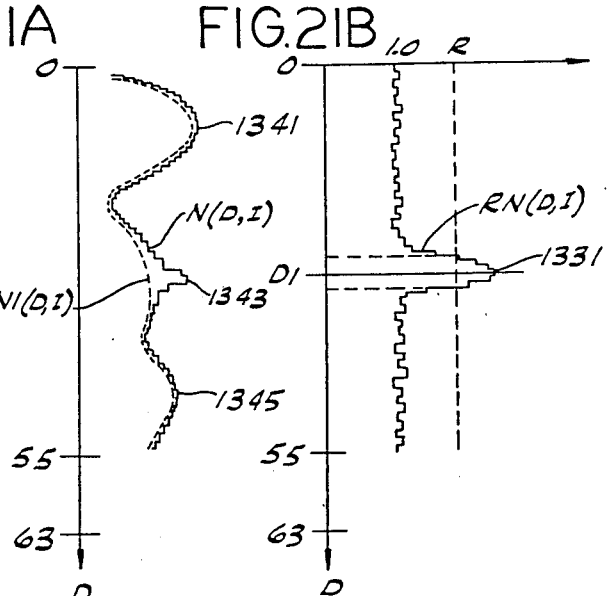

FIG. 21A shows a histogram N(D, I) similar to that shown in FIG. 15 except that the vertical axis of depth intervals D is not partially but instead completely shown from 0 to 63. Also, a substantial amount of noise has produced many bogus precipitation depth data. Histogram N(D,I) results from a wet sensor, for example. When the sensor is dry, another histogram N1(D,I) resulting from the noise itself, occurs. Histogram N1(D,I) is shown as a dashed line in FIG. 21A.

For many types of noise, the noise signal has a predictable histogram or frequency distribution, i.e. predictable statistics. Computer 639 interprets the depth data received in terms of its statistical properties. Consequently, computer 639 can be advantageously used to filter out noise that has predictable statistics. Furthermore, this capability also permits noise with known statistics to be introduced by a noise generator 1081 into amplifier 801 of FIG. 10A. The noise increases the sensitivity of the system by randomly varying, in effect, the threshold of the comparator 943 of FIG. 10B around the exponentially decaying curve 987 of Fig. 12. Also, the noise randomly varies, in effect, the constant threshold of comparator 925. Noise generator 1081 of FIG. 10A thus constitutes means for introducing noise into the third electrical signal generating means to cause the third electrical signal as a result of noise to represent values of depth lying within at least some of the depth intervals even when the sensor is dry. The true precipitation depth values which result from the increased sensitivity of the system can then be fitered out digitally by computer 639 because the noise has a known frequency distribution N1(D,I).

Computer 627 counts the respective number of times the third electrical signal represents a depth value lying within any one of a plurality of ranges (e.g. the depth intervals) thereby to produce the set of counts comprising a histogram of the third electrical signal. Computer 639 filters the histogram N(D,I) with a second histogram N1(D,I) comprising a set of prestored counts to obtain a further set of values RN(D,I) of FIG. 21B, including a maximum value 1331, and determines the precipitation depth by a procedure utilizing at least the maximum value.

In FIG. 21A, each distribution N(D,I) and N1(D,I) is normalized, which means that the accumulated totals in the first 56 depth intervals of each histogram are divided by the grand total of those accumulated totals. In each depth interval D, the value of N(D,I) is a number between zero and one, and the total of the normalized distribution values over the first 56 depth intervals is unity.

Figure 22:
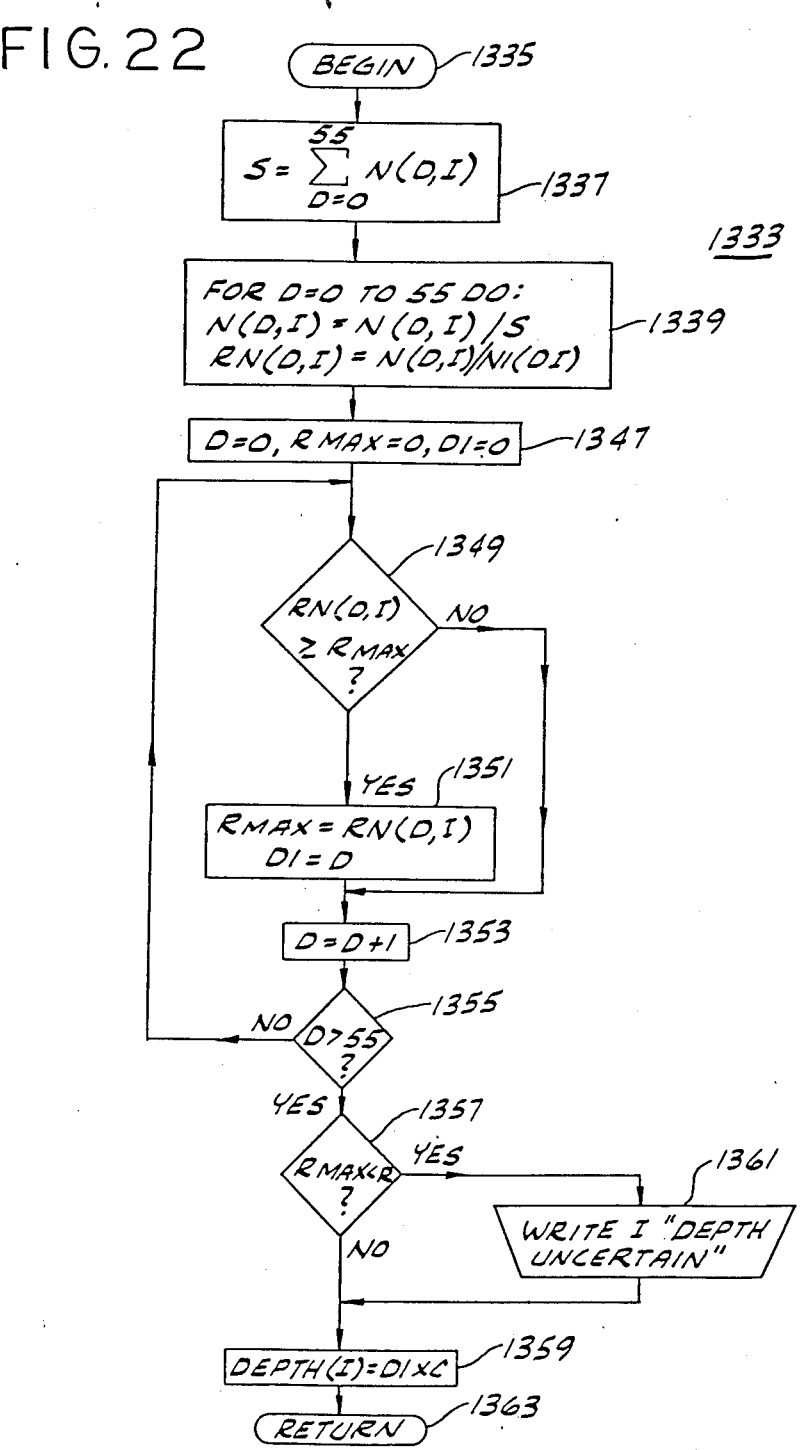
FIG. 22. is a flowchart of computer operations for implementing the inventive method described in connection with FIGS. 21A and 21B.

FIG. 22 shows a flow diagram of a procedure 1333 for accomplishing the filtering and for determining the precipitation depth. This procedure 1333 is programmed as a subroutine for computer 639 and is executed in substitution for step 1273 of FIG. 20A. Operations commence with a BEGIN 1335 and proceed in a step 1337 to form a sum S of the accumulated totals N(D,I) in the depth intervals 0 to 55. This step 1337 is needed because the histogram which arrives from computer 627 is not yet normalized. Then in a step 1339, the N(D,I) histogram is normalized, interval by interval, in each of the depth intervals 0 to 55 by dividing each accumulated total by the sum S from step 1337. Since the prestored noise histogram N1(D,I) is normalized before it is prestored, it does not need to be normalized at this time.

Also in step 1339, a ratio histogram RN(D,I) of the normalized histograms N(D,I) and N1(D,I) is produced interval by interval for depth intervals 0 to 55. For instance, RN(O,I) is the ratio of N(O,I)/N1(O,I), RN(1,I) is N(1,I)/N1(1,I); RN(2,I) is N(2,I)/N1(2,I), and so on, up to RN(55,I) which is N(55,I)/N1(55,I). When step 1339 is completed, a filtered histogram RN(D,I) is obtained and has the form shown in FIG. 21B. Most of the values in the filtered histogram are approximately unity, but a pronounced peak 1331 also occurs where the true precipitation reflections have occurred. By contrast, in FIG. 21A the histogram N(D,I) from computer 627 can illustratively have three peaks 1341, 1343, and 1345. Even though peak 1341 is the highest peak, the procedure of FIG. 22 correctly filters out and emphasizes peak 1343 to produce peak 1331 of FIG. 21B.

After step 1339 of FIG. 22 a peak-finding procedure is performed. Depth interval index D is set to zero, a maximum ratio variable RMAX is set to zero, and a true precipitation depth interval D1 is set to zero in a step 1347. Then starting with depth interval zero (0) and proceeding through depth interval 55, the height of peak 1331 and the depth interval D1 in which it occurs are identified in a series of steps 1349, 1351, 1353, and 1355. In decision step 1349 the value of RN(D,I) for a given depth interval D is compared with the current value of RMAX which is initially zero. If the RN(D,I) value exceeds RMAX, RMAX is updated in step 1351 with the RN(D,I) value, and the depth index D is "memorized" in D1. Then the depth index D is incremented in step 1353 to progress to the next D value in the distribution (working vertically downward from D=0 in FIG. 21B). At a decision step 1355 the D value is compared with 55, and until value 55 has been exceeded, a branch is made back to step 1349. In step 1349 a value of RN(D,I) which is less than RMAX is ignored by branching around step 1351 and going directly to step 1353 to increment the depth index D. As the loop is repeated, the procedure finds the peak 1331 value and stores it in RMAX, and also stores in variable D1 the depth value corresponding to peak 1331.

Now operations proceed from step 1355 to a decision step 1357 where RMAX is compared with a predetermined value R, which is suitably 3. If peak 1331 is sufficiently pronounced so that it equals or exceeds R, operations proceed directly to a step 1359 in which the depth for sensor I is calculated by multiplying the depth index value D1 by the constant C to convert value D1 to precipitation depth in inches. As in step 1273 of FIG. 20A, the constant C is corrected for temperature when desired.

If peak 1331 is less than R at step 1357, a branch is made to a step 1361 in which a message "DEPTH UNCERTAIN" is displayed to indicate that the precipitation reflections still do not stand out sufficiently compared to the noise to permit confident determination of precipitation depth. The depth calculation is then made at step 1359 anyway, whence a RETURN 1363 is reached.

It is noted that step 1273 of FIG. 20A can be written as a peak-finding routine operating on the unfiltered histogram but otherwise analogous to procedure 1333 of FIG. 22. Also, procedure 1333 can be written to calculate the mean of values near peak 1331 instead of doing a peak-finding routine. In any event, computers 627 and 639 work together as accumulating and computing means for accumulating totals and also holding a prestored set of respective totals of the number of times the third electrical signal represents a value of depth lying within each one of the series of depth intervals when the sensor is dry and noise has caused the comparing means to initiate the second timing signal (STOP TIMER-bar) in the absence of any second electrical signal corresponding to a second reflection, the accumulating and computing means comprising means for also correcting the set of accumulated totals with respect to the set of prestored totals and determining precipitation depth from the corrected totals.

Figure 23:
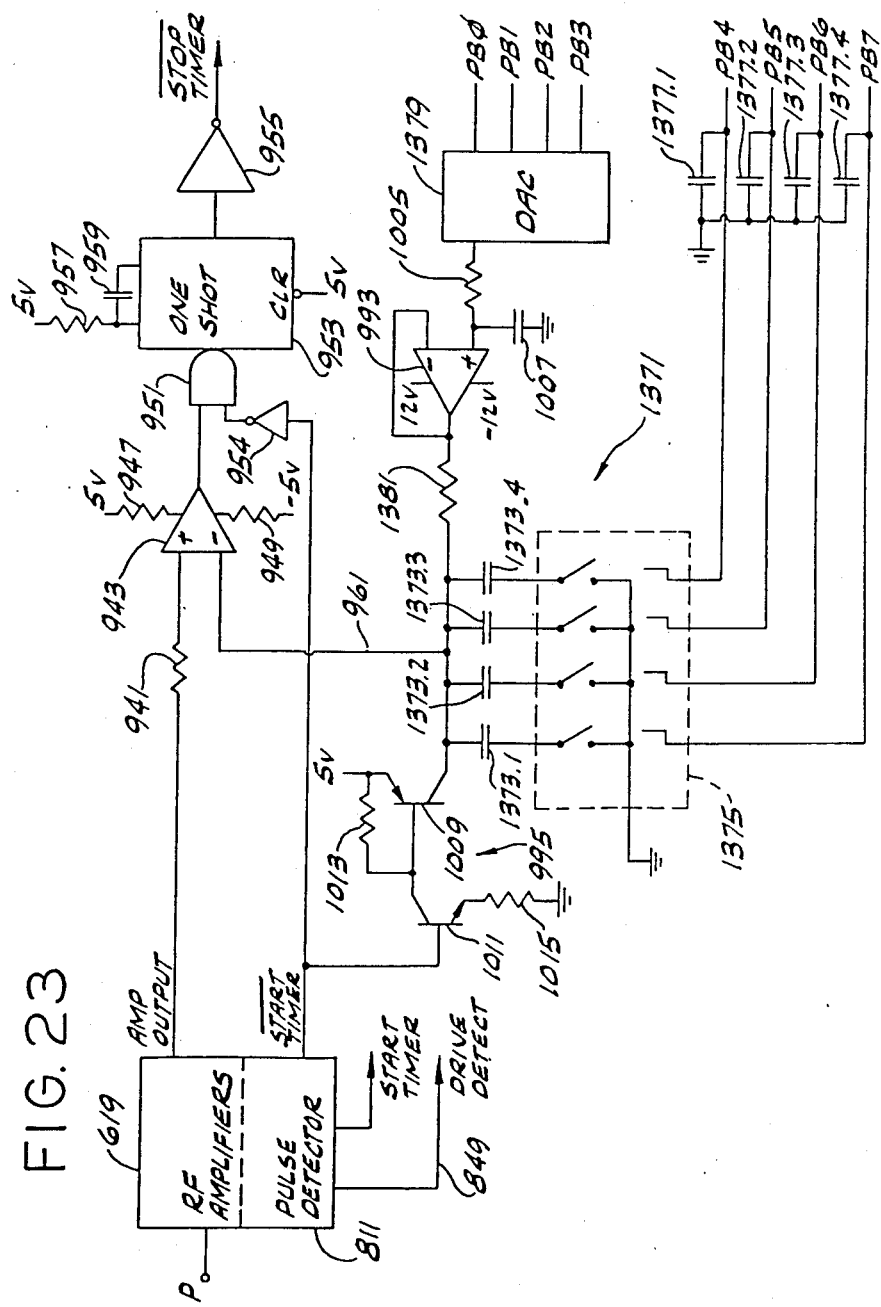
FIG. 23 is a schematic diagram of an inventive circuit for automatically adjusting the exponentially decaying threshold of FIG. 12.

FIG. 23 shows a circuit similar to that of FIGS. 10A and 10B, but which is adapted for being automatically occasionally adjusted so that the magnitude of the exponentially decaying electrical threshold signal on line 961 is maintained in excess of the magnitude of the decaying oscillations of the first electrical signal corresponding to the first rod reflection. When such circuit is used, computer 639 can then be programmed as in FIG. 24 as means fed by the third electrical signal from the generating means (e.g. counter 1181) for accomplishing the automatic occasional adjustment.

In FIG. 23 a circuit 1371 replaces circuit 945 of FIG. 10B as the means for generating the exponentially decaying electrical signal. Circuit 1371 includes a set of four capacitors 1373.1–1373.4 connected in common to line 961. The set of capacitors is selectively grounded by an electronic analog switch 1375 having four corresponding switch sections. Electronic switch 1375 constitutes a switching means responsive to a fourth electrical signal (the parallel digital signal on lines PB4–PB7 of PIA2 of FIG. 14) for selectively connecting the capacitors to form a network having a value of capacitance represented by the fourth electrical signal. In other words, the values of the capacitors are chosen so that the capacitance presented to line 961 is approximately proportional to the binary value represented by the highs and lows on the lines PB4-PB7. Lines PB4-PB7 are also RF-bypassed by four capacitors 1377.1-.4.

Circuit 1371 also has a digital-to-analog converter (DAC) 1379 for establishing a value of the magnitude greater than zero to which the threshold voltage on line 961 decays. DAC 1379 operates in response to a fifth electrical signal, which is a parallel digital signal on the four lines PB0-PB3 of PIA2 of FIG. 14. Resistor 1005, capacitor 1007, and unity-gain operational amplifier 993 together buffer the output of DAC 1379. A resistor 1381 is connected between the set of capacitors 1373.1-.4 and the buffered output provided by amplifier 993 for DAC 1379.

Transistor switching circuit 995 constitutes second switching means for coupling a voltage (e.g. the +5 volt supply) exceeding the magnitude greater than zero to which the voltage on line 961 decays, to the capacitor network until the occurrence of the first timing signal START TIMER-bar. The capacitor network 1373.1-.4 thereupon discharges through the resistor 1381 to generate the exponentially decaying electrical signal.

When computer 639 is programmed as described in connection with FIG. 24, it cooperates with computer 627 to act as a digital circuit for producing the fourth and fifth electrical signals in digital form for the first-named switching means 1375 and the digital-to-analog converter 1379. The digital circuit including computers 627 and 639 utilizes the third electrical signal from the generating means (e.g. output of counter 1181) in automatically occasionally adjusting the fourth and fifth signals so that the magnitude of the exponentially decaying electrical signal is substantially conformed to and in excess of the magnitude of the decaying oscillations of the first electrical signal (as shown in FIG. 12).

Figure 24:
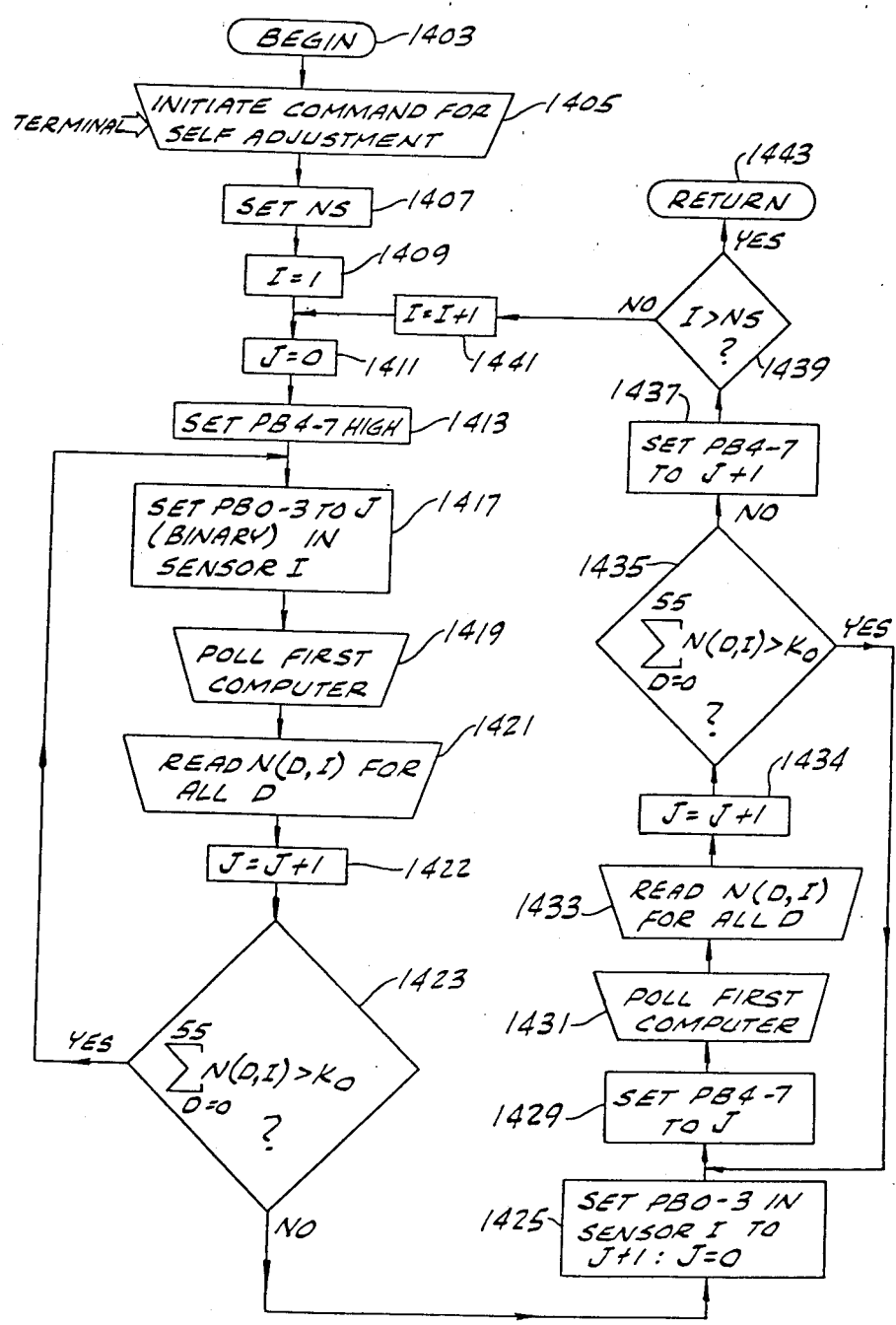
FIG. 24 is a flowchart of operations of the first computer in communicating with the circuit of FIG. 23.

In FIG. 24 operations in a maintenance routine 1401 for threshold adjustment of each sensor I commence with a BEGIN 1403 and proceed to monitor the terminal constituted by the video display unit keyboard 645 of FIG. 8. An operator calls the routine on a day when all the sensors are dry, and switches off the noise generator 1081 of FIG. 10A. Thus, a command for self-adjustment is read in at a step 1405. Then at a step 1407 the number of sensors NS is set, and at a step 1409 the sensor identification index I is set to 1. A threshold adjustment index J is initialized to zero at the next step 1411 and lines PB4-PB7 of PIA2 are set all high in a step 1413.

With lines PB4-PB7 all set high in step 1413, all of the capacitors 1373.1-.4 of FIG. 23 are connected to ground, and the time constant for decay of the threshold voltage on line 961 is at its maximum. The shape of the exponential decay 987 of FIG. 12 is raised up, and thus contributes negligibly to the number of any bogus precipitation reflections. The threshold voltage decays to the adjustable magnitude set by DAC 1379, which is controlled by the index J.

In a step 1417, lines PB0-PB3 of PIA2 are set in a pattern of highs and lows corresponding to a binary number equal to J. For example, if J is 1, then lines PB0-PB3 are set in the pattern 0001 (low, low, low, high). The output of the DAC 1379 is proportional to this binary number and correspondingly sets the threshold magnitude $V_f$ of FIG. 12.

At a step 1419, computer 639 polls computer 627 and obtains a histogram N(D, I) at a step 1421. In a step 1422, the index J is incremented by 1. In a decision step 1423, the grand total of the accumulated totals for the depth intervals 0 through 55 is compared with a prestored reference value $K_o$ to determine if too many bogus precipitation reflections are being counted with the threshold level set corresponding to index J. Since the noise generator 1081 is off, and the sensors are dry, there should not be any precipitation counts at all. Accordingly, the value $K_o$ can be set to zero or just a few counts.

If at step 1423, the bogus precipitation counts are excessive, a branch is made to back to step 1417 to raise the final value $V_f$ of the threshold voltage. Steps 1417, 1419, 1421, 1422 and 1423 are repeated until J has been incremented high enough to eliminate most or all of the bogus precipitation reflections due to circuit noise. Then operations proceed from step 1423 to a step 1425.

At step 1425, the voltage $V_f$ is adjusted by one more increment for good measure by setting lines PB0-PB3 of PIA2 leading to sensor I to a binary number equal to the index J finally reached, plus one. The PB0-PB3 lines are latched and index J is initialized to zero for use now in adjusting the decay constant. Then at step 1429, lines PB4-PB7 are set to J instead of being set all high as they were in step 1413. In FIG. 23, the electronic switch 1375 is set in a pattern corresponding to the binary number equal to J (e.g. for J=1, PB4-PB7 are 0001 and switch 1375 has only capacitor 1373.1 connected to ground. The threshold 987 falls steeply now, and many bogus precipitation counts are generated by the tail of first rod reflection 833.) Then in step 1431 of FIG. 24, computer 639 polls computer 627; and in a step 1433 computer 639 reads in a histogram N(D, I) supplied by computer 627. In a step 1434, index J is incremented by one.

In a step 1435, computer 639 computes a grand total of all of the accumulated totals in the histogram in depth intervals 0 to 55 as in step 1423, and again compares them with the constant $K_o$. If the bogus precipitation counts are excessive, a branch is made back to step 1429 to increase the capacitance presented to line 961 and increase the time constant of the decaying threshold to surmount the first electrical signal 833. Steps 1429, 1431, 1433, 1434 and 1435 are repeated as many times as needed to increase the time constant of the threshold voltage to a value at which the bogus precipitation counts are essentially eliminated. Then operations proceed from step 1435 to a step 1437 where lines PB4-PB7 are latched to the index J, plus one for good measure.

All the foregoing steps of the maintenance routine 1401 are repeated for every sensor I, so at a decision step 1439, sensor identification index I is compared with the number of sensors NS. If not all of the sensors have been serviced, index I is incremented by one at a step 1441 and operations continue on with step 1411. When all the sensors have been serviced, a branch is made from step 1439 to RETURN 1443. The exponentially decaying thresholds for all sensors are now completed in their adjustment, and if desired, noise generator 1081 of FIG. 10A can be switched on again.

Figure 25:
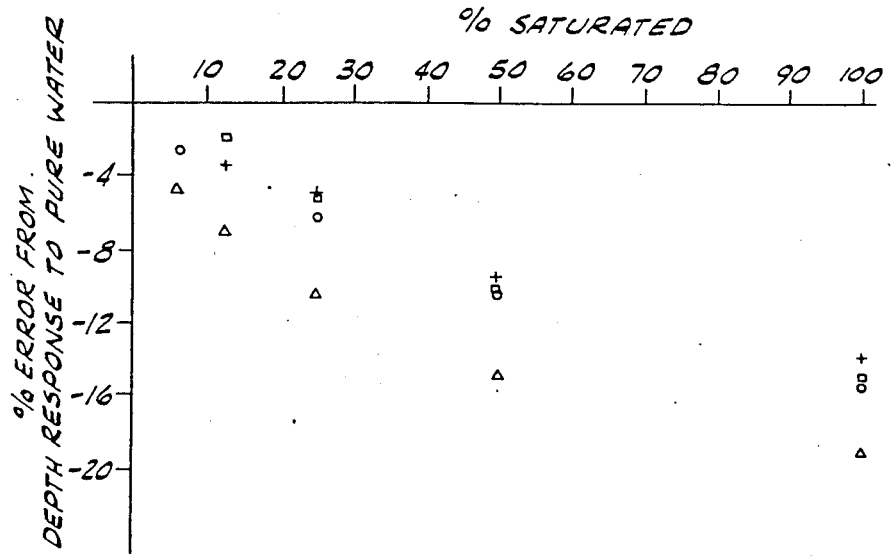
FIG. 25 is a graph of the effect of water impurities on depth measurements.

FIG. 25 is a graph of percentage departure in a measured depth value from the true depth value measured for pure water when various amounts of impurities are dissolved in the water. Even when the water is 100% saturated with impurities, the departure in the measured depth value is less than 20%. For most lesser concentrations the departure is less than 10%. The impurities are four pavement deicers in common use: salt (NaCl) (circles), an ethylene glycol based product called "UCAR" runway deicer from Union Carbide (squares), calcium chloride ($CaCl_2$) (triangles), and chemical-grade urea $NH_2CONH_2$ (+'s).

FIG. 26 is an alternative circuit 1451 for sensor 611. Like circuit 651 of FIG. 9, circuit 1451 constitutes an oscillator electrically connected to the sensor and physically associated with the sensor so that the sensor and the oscillator can be embedded together in the pathway. No connection need necessarily be made to ground the sensor of either FIG. 9 or FIG. 26 to earth at the pathway site. Circuit 1451 is similar to circuit 651 of FIG. 9 except that diode 723 and resistor 725 of FIG. 9 are replaced with a transistor 1453, a resistor 1455, a pair of paralleled power N-enhancement MOSFETs 1457 and 1459, and a resistor 1461. The supply voltage from pulse decoder 619 is increased from 12 to 90 volts. A zener diode 1463 between $V_{CC}$ pin 8 and ground in circuit 1451 maintains $V_{CC}$ at 12 volts. MULTIVIBRATOR 701 is suitably a CMOS version of type 555 timer, to reduce energy dissipation in resistor 715.

Resistor 1455 is connected at one end to the junction of inductor 713 and resistor 715. Resistor 1455 is oppositely connected to the drains of both power MOSFETs 1457 and 1459. Capacitor 727 is connected between the MOSFET drains and transducer 21. The sources of both power MOSFETs are connected to ground.

The OUTPUT pin 3 of multivibrator 701 is connected to the base of transistor 1453, the collector of which is connected to $V_{CC}$. The emitter of transistor 1453 is conected to both gates of the power MOSFETs 1457 and 1459, and also connected through a resistor 1461 to ground. As in FIG. 9, multivibrator 701 oscillates at a temperature controlled nominal 1 KHz. repetition rate and 50% duty cycle. When OUTPUT pin 3 is low, transistor 1453 is off, and both MOSFETs are off. Capacitor 727 charges to 90 volts through resistor 1455 at a slow enough rate to negligibly excite transducer 21. Then OUTPUT pin 3 goes high, turning transistor 1453 and the MOSFETs on. Most of the 90 volts across capacitor 727 is supplied as a negative electrical drive pulse across transducer 21. The electrical drive pulse is completed in about 200 nanoseconds even though 500 microseconds elapses before the capacitor 727 is allowed to once again charge. The ultrasonic energy emitted as a pulse from transducer 21 is much stronger when a supply voltage of 90 volts is used. Therefore, the reflections are much stronger too. The gain requirements in the pulse decoder 619 amplifier circuits are relaxed. The sensitivity of the system to noise from external sources, which may have erratic statistics, is advantageously reduced.

Depth information in the first computer 627 is stored in 24 bits (3 bytes) per address. To communicate each histogram rapidly to the second computer 639, the eight most significant bits (the eight bits starting with the most significant one-bit) are transmitted with a 4 bit code representing the position of a binary marking point. For example if the 8 most significant bits are a binary number A, and the position of the binary marking point is a number B (which is eight less than the position of the most significant bit), then the accumulated total number A,B which is transmitted is equal to $A \times 2^B$. Even if the most significant bit occurs at position 24, the binary marking point after the eighth bit in the 8 most significant bits occurs at position 16 (24-8). Consequently, 4 bits are sufficient to describe the position of the binary point since $2^4$ is 16. Moreover, the binary point position need be sent only once for an entire histogram when the binary point is set for the largest binary number therein, and the reduction in precision for smaller numbers in other depth intervals is acceptable. As an example, an entire histogram can be transmitted by 8 bits for each of the first 55 positions plus 4 bits for the binary point, plus 8 bits for the 3 positions 57–59 and 4 bits for their binary point, for a total of 472 bits. At a communication rate of 1200 baud (bits per second), an entire histogram can be polled faster than once per second.

The sensor operates satisfactorily even when contaminated with dirt on top surface 29. At an actual water depth of 0.10 inch, the depth is measured accurately when surface 29 is loaded with sand in amounts up to 0.08 grams/cm². The precipitation reflection is merely diminished somewhat in amplitude compared to its amplitude when top surface 29 is clean.

In practice, it is to be expected that surface 29 will become abraded when vehicles and aircraft pass over it. Accordingly, it is important to consider the accuracy of depth measurement under conditions of abrasion. There is no change in signal strength or time delay when the sensor is scored with 220, 100 and 40 grit sandpaper. When the sensor is gouged and pitted with a metal file with up to 50 micron deep scratches (an extent not expected in the runway environment) the amplitude of the precipitation pulse is reduced by 20% but the accuracy of depth measurement is not affected. On the other hand, light sanding of the surface 31 of the mounting block 27 with sandpaper promotes proper wetting near the aluminum rod 25 top surface 29 during rainstorms.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for determining the depth of precipitation accumulating on the surface of a pathway, comprising:

a sensor having an electrical transducer for emitting and sensing ultrasonic energy and having a body of material for propagating the ultrasonic energy therethrough, which body is to be embedded in the pathway with the top surface of the body being substantially flush therewith and exposed to the precipitation, said transducer being physically coupled to the body;

means for supplying electrical pulses to said transducer to cause it to emit pulses of ultrasonic energy, which are reflected as first and second reflections from the top surface of the body and from the upper surface of an accumulation of precipitation on the top surface of the body and are respectively returned to said transducer which in response to the reflected pulses produces corresponding first and second electrical signals;

means connected to said transducer for amplifying the first and second electrical signals corresponding to the first and second reflections, thereby to produce an amplifier output;

means connected to said amplifying means for initiating a first timing signal upon the occurrence of the first electrical signal;

means for comparing the amplifier output with a threshold level which has a magnitude that decreases with time, the operation of said comparing means being started upon an occurrence of the first timing signal, the comparing means initiating a second timing signal when the amplifier output reaches the threshold level; and means for generating a third electical signal representing the depth of the precipitation as a function of the time interval between occurrences of the first and second timing signals.

2. Apparatus as set forth in claim 1 wherein the first electrical signal corresponding to the first reflection is comprised of decaying oscillations and the comparing means comprises means for generating a decaying electrical signal upon the occurrence of the first timing signal, the decaying electrical signal decreasing to a magnitude greater than zero and thereby establishing the threshold level over time, and comparator means connected to said amplifying means and to said decaying electrical signal generating means for initiating the second timing signal when the amplifier output reaches the threshold level.

3. Apparatus as set forth in claim 2 further comprising means fed by the third electrical signal from the generating means for automatically adjusting the decaying electrical signal in magnitude so that the magnitude of the decaying electrical signal is maintained in excess of the magnitude of the decaying oscillations of the first electrical signal.

4. Apparatus as set forth in claim 1 wherein the comparing means comprises means for comparing the amplifier output with a threshold level which exponentially decays to a preestablished adjustable magnitude.

5. Apparatus as claimed in claim 1 wherein the comparing means comprises means for generating an exponentially decaying electrical signal upon the occurrence of the first timing signal, the exponentially decaying electrical signal decreasing to a magnitude greater than zero, and comparator means connected to said amplifying means and to said exponential electrical signal generating means.

6. Apparatus as claimed in claim 5 wherein said means for generating the exponentially decaying electrical signal comprises a capacitor, an adjustable resistor connected to the capacitor, an adjustable voltage source feeding the resistor for establishing the nonzero magnitude, and an electronic switch for connecting an initial voltage exceeding the magnitude greater than zero to the capacitor until the occurrence of the first timing signal, the capacitor thereupon discharging through the resistor, the voltage across the capacitor comprising the exponentially decaying electrical signal.

7. Apparatus as set forth in claim 5 wherein said means for generating the exponentially decaying electrical signal comprises a set of capacitors, switching means responsive to a fourth electrical signal for selectively connecting said capacitors to each other to form a network having a value of capacitance represented by said fourth electrical signal, a digital-to-analog converter for establishing a value of the magnitude greater than zero in response to a fifth electrical signal, a resistor connected between the capacitor network and the digital-to-analog converter, and second switching means for coupling a voltage exceeding the magnitude greater than zero to the capacitor network until the occurrence of the first timing signal, the capacitor network thereupon discharging through the resistor to generate the exponentially decaying electrical signal.

8. Apparatus as set forth in claim 7 further comprising a digital circuit for producing the fourth and fifth electrical signals in digital form for the first-named switching means and the digital-to-analog converter, the first electrical signal being comprised of decaying oscillations and the digital circuit utilizing the third electrical signal from the generating means in automatically adjusting the fourth and fifth signals so that the magnitude over time of the exponentially decaying electrical signal is substantially conformed to and in excess of the magnitude over time of the decaying oscillations of the first electrical signal.

9. Apparatus as set forth in claim 1 wherein said pulse supplying means comprises an oscillator electrically connected to said sensor and physically associated with said sensor so that said sensor and said oscillator can be embedded together in the pathway.

10. Apparatus as set forth in claim 9 wherein said pulse supplying means further comprises a temperature-sensitive electrical element connected to the oscillator for varying the frequency of the oscillator as a function of temperature.

11. Apparatus as set forth in claim 1 wherein said first timing signal initiating means includes a one-shot multivibrator for producing the first timing signal as a pulse and means for enabling said one-shot multivibrator to respond to the first electrical signal in the amplifier output only during a predetermined time period when the first reflection is expected to occur following another predetermined time period subsequent to each of the electrical pulses from said pulse supplying means.

12. Apparatus as set forth in claim 1 wherein and said first timing signal initiating means includes second comparing means, and first, second and third one-shot multivibrators, the second comparing means triggering the first one-shot multivibrator to produce a third timing signal in response to each of the electrical pulses, said first one-shot multivibrator triggering said second one-shot multivibrator to produce a fourth timing signal at the conclusion of the third timing signal, said fourth timing signal occupying an interval in which the first electrical signal is expected to occur, said amplifier output and said fourth timing signal being coupled to said third one-shot multivibrator so that said first electrical signal triggers said third one-shot multivibrator to produce the first timing signal.

13. Apparatus as set forth in claim 1 wherein said generating means includes means for producing clock pulses and means for counting the clock pulses, the counting being initiated by the first timing signal, terminated by the second timing signal and reset in response to each of the electrical pulses from said pulse supplying means, the third electrical signal being a parallel digital signal produced by the counting means when the counting is terminated by the second timing signal.

14. Apparatus as set forth in claim 1 further comprising means for periodically adjusting the degree of amplification provided by the amplifying means so that the peak value of the first electrical signal in the amplifier output is maintained substantially constant.

15. Apparatus as set forth in claim 14 wherein said adjusting means includes an electronic switch having a plurality of switch sections connected to said amplifying means so that the degree of amplification depends on which switch sections are closed, a counter coupled to the switch sections so that the switch sections are closed in different combinations depending on a value in said counter, said counter being incremented in response to successive ones of at least some of the electrical pulses so that the degree of amplification provided by said amplifying means is increased from a relatively low initial value, and means for holding the value provided by said counter when the peak value of the first electrical signal in the amplifier output first reaches a predetermined level.

16. Apparatus as set forth in claim 1 wherein the first electrical signal has a peak value and the apparatus further comprises means for deriving a signal representing the peak value of the first electrical signal.

17. Apparatus as set forth in claim 16 further comprising means for comparing the signal representing the peak value of the first electrical signal with at least one other signal representing at least one predetermined value to identify the precipitation as ice or water.

18. Apparatus as set forth in claim 17 wherein said comparing means comprises means for also varying as a function of the repetition rate of the emitted pulses one of the signals so compared, to correct for temperature variations.

19. Apparatus as claimed in claim 17 wherein said comparing means comprises means for also generating a further signal indicating an abnormal condition when the temperature corresponding to a repetition rate of the emitted pulses is inconsistent with the ice-water identification.

20. Apparatus as claimed in claim 16 further comprising means for sensing a temperature of the precipitation and means for determining whether the signal representing the peak value of the first electrical signal is between first and second values indicative of liquid water and not ice and generating a signal indicating an additional precipitation condition when the peak value is between the first and second values and the temperature sensed is less than a temperature value inconsistent with liquid water.

21. Apparatus as set forth in claim 1 further comprising
    means for accumulating respective totals of the number of times the third electrical signal represents a value of depth lying within each one of a series of depth intervals, and for computing precipitation depth as a function of the totals; and
    means for displaying the computed value of precipitation depth.

22. Apparatus as set forth in claim 21 further comprising means for holding a prestored set of respective totals of the number of times the third electrical signal represents a value of depth lying within each one of the series of depth intervals when the sensor is dry and noise has caused the comparing means to initiate the second timing signal in the absence of any second electrical signal corresponding to a second reflection, said accumulating and computing means comprising means for also correcting the set of accumulated totals with respect to the set of prestored totals and determining precipitation depth from the corrected totals.

23. Apparatus as set forth in claim 21 wherein said means for accumulating and computing comprises means for electronically summing products of at least some of the respective totals times numbers identifying the respective depth intervals to which the totals relate, and dividing by a summation of the totals to produce a signal representing a value proportional to precipitation depth.

24. Apparatus as set forth in claim 1 further comprising means for introducing noise into said amplifying means to increase the sensitivity of said initiating means and said comparing means.

25. Apparatus as set forth in claim 1 further comprising means for generating a signal representing a value of precipitation turbulence as a function of the ratio of the number of pulses emitted in a preestablished time period to the number of times that the third electrical signal has been produced in response to occurrences of the second reflection in the same time period.

26. Apparatus as set forth in claim 1 further comprising means for generating a signal representing a value of temperature as a function of the repetition rate of the emitted pulses.

27. Apparatus as set forth in claim 1 further comprising means coupled to said generating means for producing a signal representing a rate of change of precipitation depth.

28. Apparatus as set forth in claim 27 wherein said depth rate-of-change means comprises means for also accumulating a first set and subsequently accumulating a second set of respective totals of the number of times the third electrical signal represents a value of depth lying within each one of a series of depth intervals, and for computing the rate of change of precipitation depth as a function of the totals in the first and second sets.

29. Apparatus as set forth in claim 1 further comprising means coupled to said generating means for producing a signal representing a rate of change of precipitation depth and an additional signal representing an estimated time when the precipitation depth will become nil, as a function of the depth and the rate of change of depth when the depth is decreasing.

30. Apparatus as set forth in claim 1 further comprising means coupled to said generating means for producing a signal representing a rate of change of precipitation depth and an additional signal representing an estimated time when the precipitation depth will reach a predetermined depth value, as a function of the depth and the rate of change of depth.

31. Apparatus as claimed in claim 1 further comprising means for counting the respective number of times the third electrical signal represents a depth value lying within any one of a plurality of ranges thereby to produce a set of counts comprising a histogram of the third electrical signal, for filtering the histogram of the precipitation depth signal with a second histogram comprising a set of prestored counts to obtain a further set of values including a maximum value, and for determining the precipitation depth by a proceduure utilizing at least the maximum value.

32. Apparatus as claimed in claim 1 wherein said means for generating a third electrical signal representing the depth of the precipitation includes means for determining whether the precipitation is ice and for correcting the depth represented by the third electrical signal when the precipitation is ice.

33. Apparatus for determining the depth of precipitation accumulating on the surface of a pathway, comprising:
    a sensor having an electrical transducer for emitting and sensing ultrasonic energy and having a body of material for propagating the ultrasonic energy therethrough, which body is to be embedded in the pathway with the top surface of the body being substantially flush therewith and exposed to the precipitation, said transducer being physically coupled to the body;

means for supplying electrical pulses to said transducer to cause it to emit pulses of ultrasonic energy, which are reflected as first and second reflections from the top surface of the body and from the upper surface of an accumulation of precipitation on the top surface of the body and are respectively returned to said transducer which in response to the reflected pulses produces corresponding first and second electrical signals;

means connected to said transducer for amplifying the first and second electrical signals corresponding to the first and second reflections, thereby to produce an amplifier output;

means for genrating a third electrical signal representing the depth of the precipitation as a function of the time interval between occurrences of the first and second electrical signals; and means for periodically adjusting the degree of amplication provided by the amplifying means so that the peak value of the first electrical signal in the amplifier output is maintained substantially constant and for producing a fourth electrical signal representing the peak value prior to amplification of the first electrical signal from said transducer.

34. Apparatus as set forth in claim 33 further comprising first means for comparing the amplifier output with a first threshold level when the degree of amplification is being adjusted, and for comparing the amplifier output with a second threshold level which is lower in magnitude than the first threshold level after the degree of amplification has been adjusted, the first comparing means producing a first timing signal upon the occurrence of the first electrical signal, and second means for comparing the amplifier output with a third threshold level, the comparing operation of said second comparing means being started upon an occurrence of the first timing signal, the second comparing means initiating a second timing signal when the amplifier output reaches the third threshold level, said generating means comprising means for generating the third electrical signal as a function of the time interval between occurrences of the first and second timing signals.

35. Apparatus as set forth in claim 33 wherein said adjusting and producing means includes means for adjusting the degree of amplification in discrete steps and means for producing the fourth electrical signal as a parallel digital signal representing each step reached by said adjusting means at any given time.

36. Apparatus as set forth in claim 33 further comprising means for comparing the fourth electrical signal representing the peak value of the first electrical signal with at least one other signal representing at least one predetermined value to identify the precipitation as ice or water.

37. Apparatus as set forth in claim 33 wherein said adjusting and producing means includes an electronic switch having a plurality of switch sections connected to said amplifying means so that the degree of amplification depends on which switch sections are closed, a counter coupled to the switch sections so that the switch sections are closed in different combinations depending on a value in said counter, said counter being incremented in response to successive ones of at least some of the electrical pulses from said pulse supplying means so that the degree of amplification provided by said amplifying means is increased from a relatively low initial value, and means for holding the value provided by said counter when the peak value of the first electrical signal in the amplifier output first reaches a predetermined level.

38. Apparatus as set forth in claim 33 further comprising means for accumulating respective totals of the number of times the third electrical signal represents a value of depth lying within each one of a series of depth intervals, and for computing precipitation depth as a function of the totals; and means for displaying the computed value of precipitation depth.

39. Apparatus for determining the depth of precipitation accumulating on the surface of a pathway, comprising:

a sensor having an electrical transducer for emitting and sensing ultrasonic energy and having a body of material for propagating the ultrasonic energy therethrough, which body is to be embedded in the pathway with the top surface of the body being substantially flush therewith and exposed to the precipitation, said transducer being physically coupled to the body;

means for supplying electrical pulses to said transducer to cause it to emit pulses of ultrasonic energy, which are reflected as first and second reflections from the top surface of the body and from the upper surface of an accumulation of precipitation on the top surface of the body and are respectively returned to said transducer which in response to the reflected pulses produce corresponding first and second electrical signals;

means for generating a third electrical signal representing the depth of the precipitation as a function of the time interval between occurrences of the first and second electrical signals;

means for accumulating respective totals of the number of times the third electrical signal represents a value of depth lying within each one of a series of depth intervals, and for computing precipitation depth as a function of the totals; and means for displaying the computed value of precipitation depth.

40. Apparatus as set forth in claim 39 wherein said generating means includes means for producing clock pulses and means for counting the clock pulses, the counting being initiated in response to the first electrical signal, terminated in response to the second electrical signal and reset in response to each of the electrical pulses from said pulse supplying means, the counting means producing the third electrical signal in the form of a parallel digtial signal representing a succession of binary numbers designating the depth intervals.

41. Apparatus as set forth in claim 40 wherein said accumulating and computing means includes a memory having areas designated by addresses for holding the totals, and also includes a digital computer which is connected to said counting means for incrementing the total in the respective area of said memory means having an address corresponding to the binary number represented at any given time by the parallel digital signal from said counting means.

42. Apparatus as set forth in claim 39 wherein said accumulating and computing means comprises means for also holding a prestored set of respective totals of the number of times the third electrical signal as a result of noise represents a value of depth lying within each one of the series of depth intervals when the sensor is dry, and for also correcting the set of accumulated totals with respect to the prestored set and determining precipitation depth from the corrected totals.

43. Apparatus as set forth in claim 39 wherein said means for accumulating and computing comprises means for also electronically summing products of at least some of the respective totals times numbers identifying the respective depth intervals to which the totals relate, and dividing by a summation of the totals to produce a signal representing a value proportional to precipitation depth.

44. Apparatus as set forth in claim 39 further comprising means for introducing noise into said generating means to cause the third electrical signal as a result of noise to represent values of depth lying within at least some of the depth intervals even when the sensor is dry.

45. Apparatus as set forth in claim 39 wherein said accumulating and computing means comprises means for also generating a signal representing a value of precipitation turbulence as a function of the ratio of the number of pulses emitted in a preestablished time period to the number of times that the third electrical signal has been produced in response to occurrences of the second reflection in the same time period.

46. Apparatus as set forth in claim 39 wherein said generating means includes means connected to said transducer for amplifying the first and second electrical signals corresponding to the first and second reflections, thereby to produce an amplifier output, and means for comparing the amplifier output with a threshold level to produce a timing signal, said accumulating and computing means including a digital computer having at least one interrupt input to which the timing signal is coupled.

47. Apparatus as set forth in claim 39 wherein said accumulating and computing means comprises means coupled to said generating means for also producing a signal representing a rate of change of precipitation depth.

48. Apparatus as set forth in claim 39 wherein said accumulating and computing means comprises means for also subsequently accumulating a second set of respective totals of the number of times the third electrical signal represents a value of depth lying within each one of the series of depth intervals, and for also computing a rate of change of precipitation depth as a function of the first-named totals and of the totals in the second set.

49. Apparatus as set forth in claim 39 wherein said accumulating and computing means comprises means coupled to said generating means for also producing a signal representing a rate of change of precipitation depth and an additional signal representing an estimated time when the precipitation depth will become nil, as a function of the depth and the rate of change of depth when the depth is decreasing.

50. Apparatus as set forth in claim 39 wherein said accumulating and computing means comprises means coupled to said generating means for also producing a signal representing a rate of change of precipitation depth and an additional signal representing an estimated time when the precipitation depth will reach a predetermined depth value, as a function of the depth and the rate of change of depth.

51. A method for determining the depth of precipitation accumulating on the surface of a pathway, with a sensor having an ultrasonic transducer physcially coupled to a body of material for propagating ultrasonic energy therethrough, the body having a top surface, the method comprising the steps of:

embedding the body of material and the ultrasonic transducer in the pathway with the top surface of the body being substnatially flush therewith and exposed to the precipitation;

supplying electrical pulses to the ultrasonic transducer to cause it to emit pulses of ultrasonic energy, which are reflected as first and second reflections from the top surface of the body and from the upper surface of an accumulation of precipitation on the top surface of the body and are respectively returned to the transducer which in response to the reflected pulses produces corresponding first and second electrical signals;

generating a third electrical signal representing the depth ofthe precipitation as a function of the time interval between occurences of the first and second electrical signals;

accumulating respective totals of the number of times the third electrical signal represents a value of depth lying within each one of a series of depth intervals;

computing precipitation depth as a function of the totals; and displaying the computed value of precipitation depth.

52. A method as set forth in claim 51 further comprising the steps of:

holding a prestored set of respective totals of the number of times the third electrical signal, as a result of noise, represents a value of depth lying within each one of the series of depth intervals when the sensor is dry; and correcting the accumulated totals with respect to the set of prestored totals.

53. A method as set forth in claim 51 wherein said computing step comprises electronically summing products of at least some of the respective totals times numbers identifying the respective depth intervals to which the totals relate, and dividing by a summation of the totals to produce a signal representing a value proportional to precipitation depth.

54. A method as set forth in claim 51 further comprising the step of causing said third electrical signal to represent values of depth lying within at least some of the depth intervals even when the sensor is dry.

55. Apparatus as set forth in claim 51 further comprising the step of generating a signal representing a value of precipitation turbulence as a function of the ratio of the number of pulses emitted in a preestablished time period to the number of times that the third electrical signal has been produced in response to occurrences of the second reflection in the same time period.

56. A method as set forth in claim 51 further comprising the step of generating a signal representing a value of temperature as a function of the repetition rate of the emitted pulses.

57. A method as set forth in claim 51 further comprising the step of also producing a signal representing a rate of change of precipitation depth as a function of the totals.

58. A method as set forth in claim 57 wherein said depth rate-of-change step comprises the steps of subsequently accumulating a second set of respective totals of the number of times the third electrical signal represents a value of depth lying within each one of the series of depth intervals, and computing the rate of change of precipitation depth as a function of the accumulated totals and the second set of totals.

59. A method as set forth in claim 51 further comprising the step of producing a signal representing a rate of change of precipitation depth and an additional signal representing an estimated time when the precipitation depth will become nil, as a function of the depth and the rate of change of depth when the depth is decreasing.

60. A method as set forth in claim 51 further comprising the step of producing a signal representing a rate of change of precipitation depth and an additional signal representing an estimated time when the precipitation depth will reach a predetermined depth value, as a function of the depth and the rate of change of depth.

61. Apparatus for determining the depth of precipitation accumulating on the surface of a pathway, comprising:
   a sensor having an electrical transducer for emitting and sensing ultrasonic energy and having a body of material for propagating the ultrasonic energy therethrough, which body is to be embedded in the pathway with the top surface of the body being substantially flush therewith and exposed to the precipitation, said transducer being physically coupled to the body;
   means for supplying electrical pulses to said transducer to cause it to emit pulses of ultrasonic energy, which are reflected as a plurality of reflections from the top surface of the body and from the upper surface of an accumulation of precipitation on the top surface of the body and are respectively returned to said transducer which in response to the reflected pulses produces corresponding electrical signals;
   means for generating a third electrical signal representing the depth of the precipitation as a function of the time interval between occurrences of at least two of the electrical signals;
   means for accumulating respective totals of the number of times the third electrical signal represents a value of depth lying within each one of a series of depth intervals, and for computing precipitation depth as a function of the totals, and
   means for displaying the computed value of precipitation depth.

62. Apparatus for determining the depth of precipitation accumulating on the surface of a pathway, comprising:
   a sensor having an electrical transducer for emitting and sensing ultrasonic energy and having a body of material for propagating the ultrasonic energy therethrough, which body is to be embedded in the pathway with the top surface of the body being substantially flush therewith and exposed to the precipitation, said transducer being physically coupled to the body;
   means for supplying electrical pulses to said transducer to cause it to emit pulses of ultrasonic energy which are reflected as first and second reflections from the top surface of the body and from the upper surface of an accumulation of precipitation on the top surface of the body and are respectively returned to said transducer which, in response to the reflected pulses, produces corresponding first and second electrical signals, said pulse supplying means including an oscillator electrically connected to said transducer and a temperature-sensitive electrical element connected to said oscillator for varying the frequency of said oscillator as a function of temperature, said oscillator and temperature-sensitive element being physically associated with said sensor so that said sensor, said oscillator and said temperature-sensitive element can be embedded together in the pathway; and
   means for generating a third electrical signal representing the depth of the precipitation as a function of the time interval between occurrences of the first and second electrical signals and for generating a fourth electrical signal representing the temperature as a function of the frequency of said oscillator.

63. Apparatus as claimed in claim 62 wherein said generating means includes means for determining from the frequency of said oscillator whether the precipitation is ice and for correcting the depth represented by the third electrical singal when the precipitation is ice.

64. Apparatus for determining the depth of precipitation accumulating on the surface of a pathway, comprising:
   a sensor having an electrical transducer for emitting and sensing ultrasonic energy and having a body of material for propagating the ultrasonic energy therethrough, which body is to be embedded in the pathway with the top surface of the body being substantially flush therewith and exposed to the precipitation, said transducer being physically coupled to the body;
   means for supplying electrical pulses to said transducer to cause it to emit pulses of ultrasonic energy which are reflected as first and second reflections from the top surface of the body and from the upper surface of an accumulation of precipitation on the top surface of the body and are respectively returned to said transducer which, in response to the reflected pulses, produces corresponding first and second electrical signals, wherein the first electrical signal has a peak value;
   means for deriving another electrical signal representing the peak value of the first electrical signal; and
   means for generating an additional electrical signal representing the depth of the precipitation as a function of both the time interval between occurrences of the first and second electrical signals and the peak value represented by the electrical signal from said deriving means.

65. Apparatus as claimed in claim 64 wherein said generating means includes means for comparing the peak value represented by the electrical signal from said deriving means with a predetermined value to determine whether the precipitation is ice.

66. Apparatus as claimed in claim 64 further comprising means for sensing tenperature of said precipitation and wherein said generating means includes means for determining whether the peak value represented by the signal from said deriving means is between first and second values indicative of liquid water and not ice and producing a signal indicating an additional precipitation condition when the peak value is between the first and second values and the temperature sensed is less than a temperature value inconsistent with liquid water.

67. Apparatus as claimed in claim 64 wherein said generating means includes means for producing a further electrical signal representing a temperature of said precipitation as a function of the repetition rate of the emitted pulses.

68. Apparatus for determining the depth of precipitation accumulating on the surface of a pathway, comprising:

a sensor having an electrical transducer for emitting and sensing ultrasonic energy and having a body of material for propagating the ultrasonic energy therethrough, which body is to be embedded in the pathway with the top surface of the body being substantially flush therewith and exposed to the precipitation, said transducer being physically coupled to the body;

means for supplying electrical pulses to said transducer to cause it to emit pulses of ultransonic energy which are reflected as first and second reflections from the top surface of the body and from the upper surface of an accumulation of precipitation on the top surface of the body and are respectively returned to said transducer which, in response to the reflected pulses, produces corresponding first and second electrical signals;

means for generating a third electrical signal representing the depth of the precipitation as a function of the time interval between occurrences of the first and second electrical signals; and means connected to said generating means and responsive to said third electrical signal for producing a signal representing a rate of change of precipitation depth.

69. Apparatus as set forth in claim 68 wherein said rate of change means also comprises means for producing and additional signal representing an estimated time when the precipitation depth will reach a predetermined depth value from said signals representing the depth and the rate of change of depth of the precipitation.

70. Apparatus as set forth in claim 68 wherein said rate-of-change means also comprises means for accumulating a first set and subsequently accumulating a second set of respective totals of the number of times the third electrical signal represents a value of depth lying within each one of a series of depth intervals, and for computing the rate of change of precipitation depth as a function of the totals in the first and second sets.

* * * * *

UNITED STATES PATENT AND TRADEMARK OFFICE
CERTIFICATE OF CORRECTION

PATENT NO. : 4,679,160
DATED : July 7, 1987
INVENTOR(S) : Miles B. Whitener

It is certified that error appears in the above—identified patent and that said Letters Patent is hereby corrected as shown below:

Column 54, claim 12, line 34, "and said" should read --said--. Column 58, claim 39, line 32, "pulses produce corresponding" should read --pulses produces corresponding--. Column 60, claim 51, line 18, "depth ofthe" should read --depth of the--. Column 64, claim 69, line 9, "and additional signal" should read --an additional signal.

Signed and Sealed this

Eighth Day of November, 1988

Attest:

DONALD J. QUIGG

*Attesting Officer*  *Commissioner of Patents and Trademarks*